United States Patent
Kampranis et al.

(10) Patent No.: US 12,529,077 B2
(45) Date of Patent: Jan. 20, 2026

(54) PRODUCTION OF GERANYL DIPHOSPHATE-DERIVED COMPOUNDS

(71) Applicant: KOBENHAVNS UNIVERSITET, Copenhagen (DK)

(72) Inventors: Sotirios Kampranis, Hellerup (DK); Simon Dusseaux, Copenhagen (DK); Codruta Ignea, Montreal (CA); William Thomas Wajn, Frederiksberg (DK)

(73) Assignee: KØBENHAVNS UNIVERSITET, Københavns (DK)

( * ) Notice: Subject to any disclaimer, the term of this patent is extended or adjusted under 35 U.S.C. 154(b) by 358 days.

(21) Appl. No.: 17/917,244

(22) PCT Filed: Apr. 7, 2021

(86) PCT No.: PCT/DK2021/050098
§ 371 (c)(1),
(2) Date: Oct. 6, 2022

(87) PCT Pub. No.: WO2021/204338
PCT Pub. Date: Oct. 14, 2021

(65) Prior Publication Data
US 2023/0159960 A1 May 25, 2023

(30) Foreign Application Priority Data
Apr. 8, 2020 (DK) .............................. PA202070216

(51) Int. Cl.
*C12N 9/88* (2006.01)
*C12N 9/10* (2006.01)
*C12P 5/00* (2006.01)

(52) U.S. Cl.
CPC ............ *C12P 5/005* (2013.01); *C12N 9/1085* (2013.01); *C12N 9/88* (2013.01); *C12P 5/007* (2013.01); *C12Y 205/01029* (2013.01); *C12Y 402/03* (2013.01)

(58) Field of Classification Search
CPC  C12N 9/16; C12N 15/52; C12P 17/06; C12Y 205/01; C12Y 205/01029
See application file for complete search history.

(56) References Cited

U.S. PATENT DOCUMENTS 11,781,148 B2 * 10/2023 Aeling ...................... C12P 7/44
435/132
2013/0302861 A1  11/2013  Vainstein et al.
2015/0010978 A1  1/2015  Heaps et al.

FOREIGN PATENT DOCUMENTS

KR      101308971 B1   9/2013
KR      20190079575 A   7/2019
WO      1994024289 A1  10/1994
WO      2013102554 A1   7/2013

OTHER PUBLICATIONS

"Complete biosynthesis of cannabinoids and their unnatural analogues in yeast"; https://doi.org/10.1038/s41586-019-0978-9; Luo Xiaozhou et al; Published: Feb. 27, 2019.
"Molecular Characteristics and Extracellular Expression Analysis of Farnesyl Pyrophosphate Synthetase Gene in Inonotus obliquus"; Biotechnology and Bioprocess Engineering 21: 515-522 (2016) DOI 10.1007/s12257-016-0348-5; Received: May 26, 2016 / Accepted: Jun. 10, 2016; Yan Zheng-Fei et al.
"Synthesis of 11-carbon terpenoids in yeast using protein and metabolic engineering"; Published: Nov. 14, 2018; Codruta Ignea et al; https://doi.org/10.1038/s41589-018-0166-5; Nature Chemical Biology 14, 1090-1098.
"Transforming yeast peroxisomes into microfactories for the efficient production of high-value isoprenoids"; Dusseaux Simon et al; Dec. 2020.
"Cloning of a cDNA for rape chloroplast 3-isopropylmalate dehydrogenase by genetic complementation in yeast"; Plant Molecular Biology 18: 557-566, 1992.; Ellerstrom M et al.
"Improving yeast strains using recyclable integration cassettes, for the production of plant terpenoids"; Ignea et al. Microbial Cell Factories 2011, 10:4; http://www.microbialcellfactories.com/content/10/1/4; Thomas B.J. and R. Rothstein (1989).
"Engineering Monoterpene Production in Yeast Using a Synthetic Dominant Negative Geranyl Diphosphate Synthase"; pubs.acs.org/synthbio; ACS Synth. Biol. 3, 298-306.(53); Ignea C. et al (2014).

(Continued)

Primary Examiner — Tekchand Saidha
(74) Attorney, Agent, or Firm — McDonnell Boehnen Hulbert & Berghoff LLP

(57) ABSTRACT

Disclosed is yeast cells having peroxisomally localized GPP synthase and a peroxisomally localized enzyme that converts GPP into a monoterpenoids, cannabinoids, monoterpene indole alkaloids and prenylated aromatic compounds; or a precursor therefore, which yeast cells are capable of producing improved amounts of monoterpenoids, cannabinoids, monoterpene indole alkaloids and prenylated aromatic compounds, compared with the same yeast cells where the GPP synthase and the enzyme that converts GPP are located in the cytoplasm. Further disclosed is the use of the yeast cell for producing monoterpenoids, cannabinoids, monoterpene indole alkaloids and prenylated aromatic compounds.

20 Claims, 8 Drawing Sheets

Specification includes a Sequence Listing.

(56) References Cited

OTHER PUBLICATIONS

"Metabolic Engineering of *Saccharomyces cerevisiae* to Overproduce Squalene"; pubs.acs.org/JAFC; Cite This: J. Agric. Food Chem. 2020, 68, 2132-2138; Guo-Song Liu et al.

"The Small Subunit of Snapdragon Geranyl Diphosphate Synthase Modifies the Chain Length Specificity of Tobacco Geranylgeranyl Diphosphate Synthase in Planta"; The Plant Cell, vol. 21: 4002-4017, Dec. 2009, www.plantcell.org ä 2009 American Society of Plant Biologists; Irina Orlova et al.

"Elevated recombination rates in transcriptionally active DNA"; Cell, vol. 56, 619-630, Feb. 24, 1989, Copyright 1989 by Cell Press; Thomas B.J. and R. Rothstein (1989); Department of Genetics and Development Columbia University College of Physicians and Surgeons; New York, New York 10032.

"cDNA isolation, functional expression, and characterization of (+)-a-pinene synthase and ( ))-a-pinene synthase from loblolly pine (*Pinus taeda*): Stereocontrol in pinene biosynthesis"; Philips M. A. et al.(2003); Arch. Biochem. Biophys. 411, 267-276. (57).

"Plant Secondary Metabolism Engineering- USER cloning and USER fusion: The Ideal cloning techniques for small and big laboratories. In Fett-Neto A (eds.) Plant Secondaty Metabolism Engineering. Methods in Molecular biology (Methods and Protocols)", vil 643. Humana Press, Totowa, NJ. ; Nour-Eldin H.H et al (2010).

"The yeasts". 5th edition. A taxonomic study. Editors: Kurtzman, Fell, Boekhout. Elsevier, 2011—a book.

"Synthesis of 11-carbon terpenoids in yeast using protein and metabolic engineering. Nature Chemical Biology 14, 1090-1098." Ignea C et al (2018).

Wikipedia, "Branched pathways"; last edited May 23, 2025; last accessed Jul. 1, 2025, <https://en.wikipedia.org/wiki/Branched_pathways>).

Genscript, Biology Terms Dictionary, "branch-point"; last accessed Jul. 1, 2025, <https://genscript.com/biology-glossary/338/branch-point>).

* cited by examiner

Fig. 4 A-B
A
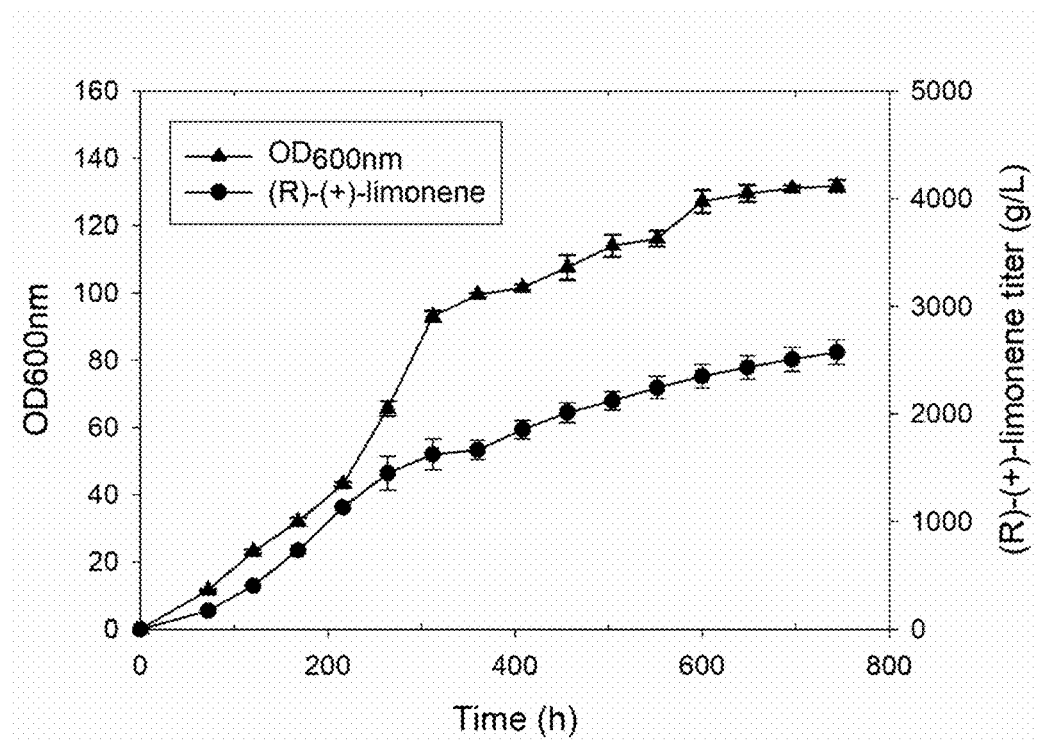
B
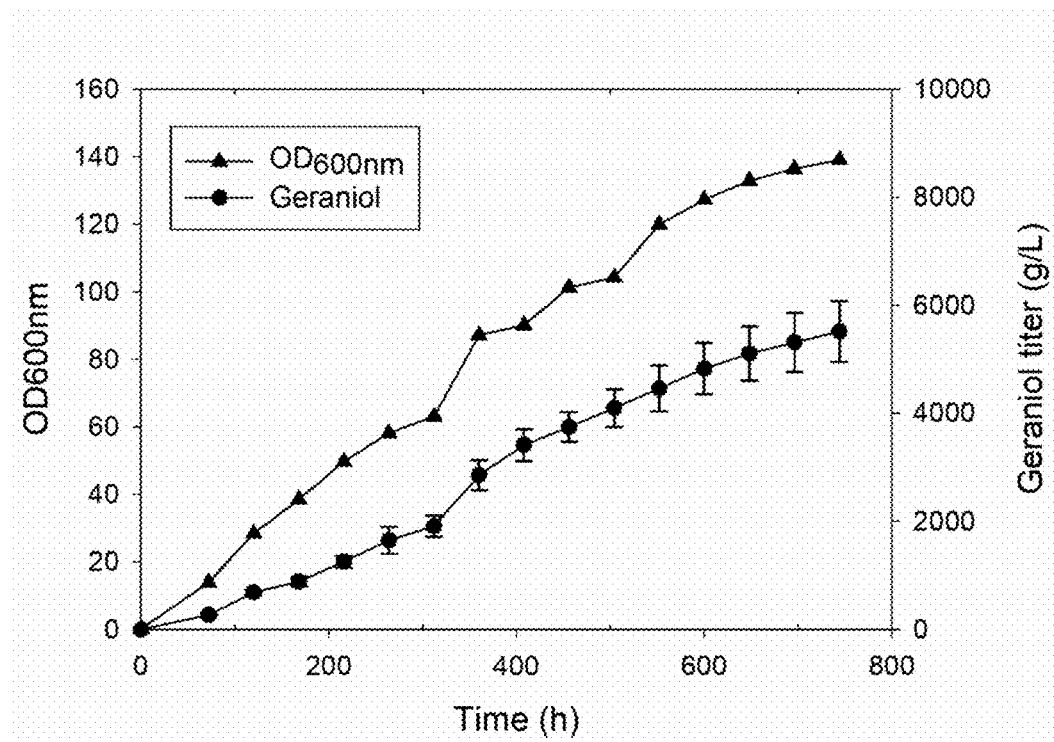

Fig. 6 a-b

Fig. 7 B-C
B
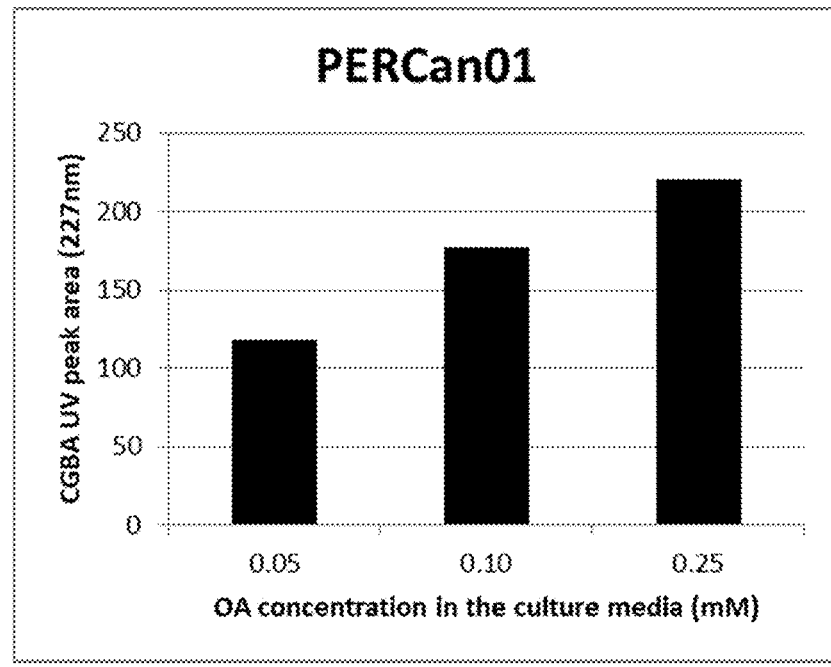
C
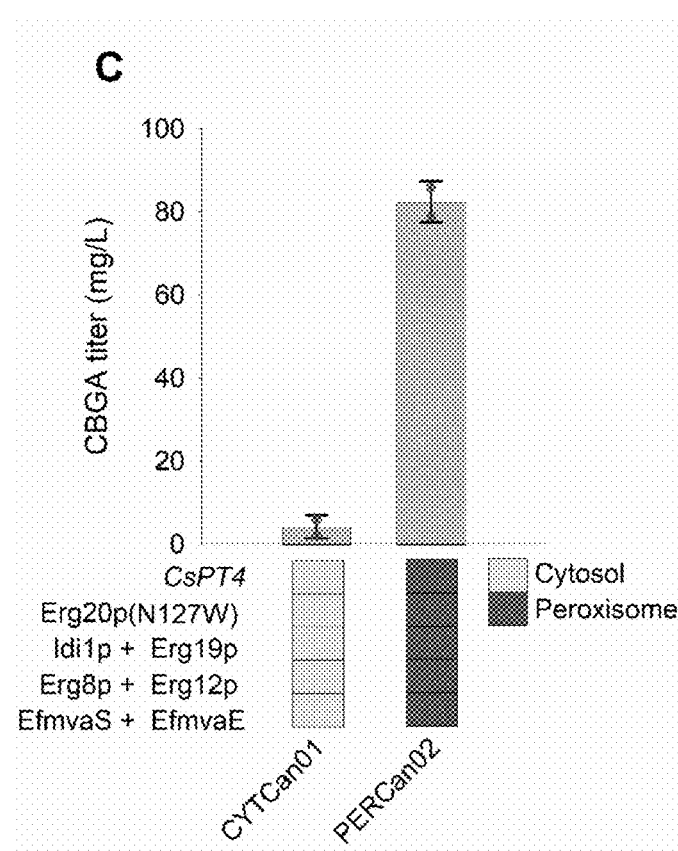

PRODUCTION OF GERANYL DIPHOSPHATE-DERIVED COMPOUNDS

REFERENCE TO SEQUENCE LISTING

The present application contains a sequence listing in computer readable form, which is incorporated by reference.

FIELD OF THE INVENTION

The present invention relates to the production of monoterpenoids, cannabinoids, iridoids, monoterpene indole alkaloids, and prenylated aromatic compounds in eukaryotic cells, such as yeast cells. The invention further relates to engineered yeast cells, particularly adapted to such production.

BACKGROUND OF THE INVENTION

Terpenes, terpenoids, derivatives thereof and other prenylated aromatic compounds are widely used e.g. as pharmaceuticals, cosmetics, nutraceuticals, flavors, fragrances and pesticides. Methods for increasing the production of these compounds in natural or engineered cells are abundant in the art.

Using engineered microorganisms for producing valuable molecules from renewable feedstock is a desirable alternative from conventional means of production. However, achieving economically viable yield, titers and productivity is a major roadblock towards industrialization. Obstacles often encountered arise from the standoff between the engineered pathway and the native metabolism that are pulling in opposite directions. Metabolism has evolved towards meeting the needs for growth and rerouting it can be challenging due to multiple layers of control, such as gene regulation, negative feedback loops at the enzyme level by downstream products, and efficient competing pathways.

Monoterpenes and other geranyl diphosphate (GPP)-derived compounds, which are widely used as flavors, fragrances, pesticides and could find applications as drop in jet fuel or biopolymers, are a prime example of these issues. On one hand, extraction from plant natural sources can hardly meet the increasing demands and represents an environmental challenge, whereas, on the other hand, production by microbial host leads to low yield and is hindered by native metabolism constraints.

Monoterpene production by engineered microbes relies on either the MEP pathway (mainly prokaryotes), the MVA pathway, or the alternative MVA pathway, all three leading to the formation of DMAPP and IPP, which are, in turn, condensed to form GPP. GPP is converted either into a wide array of monoterpenes by monoterpene synthases (MTSs) that rearrange the 10-carbons backbone of GPP into various monoterpenes or precursors thereof, or it is further elongated into FPP or GGPP by successive addition of IPP molecules to form sesquiterpenes and diterpenes respectively. GPP also serves as the precursor for the synthesis of a number of compounds that contain a terpene moiety, such as cannabinoids, iridoids, monoterpene indole alkaloids, prenylated aromatic compounds, and other meroterpenoids.

Yeast is considered a good host for terpene production because of its ease to be engineered, its native mevalonate pathway, and a good capacity to harbor functional cytochromes P450 in its endoplasmic reticulum (ER) membrane for terpene scaffold decoration. It has shown great capacity at producing sesquiterpenes, such as artemisinin and farnesene, at industrial scale. However, the production of monoterpenes has so far been far less successful.

This can be mainly explained by the rope-pulling game that is played at the GPP branch-point between native sterol biosynthesis and the heterologous pathway leading to monoterpenes, and which is largely in favor of the native metabolism. In wild-type yeast, there are no GPP-based compounds produced and the only purpose of GPP is to serve as an intermediate that is further elongated into FPP for the production of squalene in the sterol pathway. Because of this, no dedicated GPP synthase is present in yeast, and GPP is produced by a bi-functional GPP-FPP synthase, Erg20p, that has been shown to convert very efficiently GPP into FPP as soon as it is formed and channel it into sterol synthesis. Various strategies have been employed to down-regulate Erg20p, either by converting it into a strict GPP synthase, or by reducing its activity, but the intrinsic essentiality of sterol synthesis have rendered those attempts only moderate fruitful, while decreasing cells viability by posing a burden on sterol synthesis. Compartmentalization is a strategy used by eukaryotic cells to solve similar issues within their own metabolism. Organelles, such as mitochondria, peroxisomes, and the endoplasmic reticulum (ER), are designed to protect the rest of the cells from toxic compounds, isolate intermediates from competing pathways, shield enzymes from inhibitors, and, overall, provide a more suitable environment for a reaction to occur away from the main bulk of the metabolism.

An example of such a strategy has been reported recently, where geraniol production has been improved 11.5-fold by compartmentalizing an extra copy of the entire MVA pathway into the mitochondria together with a geraniol synthase, in comparison with the same modification in the cytosol.

While this proved to be a successful strategy, hijacking the mitochondria appeared to pose a metabolic burden to the strain with lower cells viability and growth. This can be attributed to the essential nature of the mitochondria as the powerhouse of the cells, which may hinder further engineering to reach the significantly higher titer needed for industrial application. These findings also showed that mitochondria might come with limitations on how far they can be engineered without compromising the integrity of the metabolism.

US 20150010978 discloses methods for producing terpenoids in a vast number of cells by transforming the cells with genes encoding enzymes involved in the biosynthesis of the terpenoids. The genes may be introduced into the genomes of chloroplasts for cells having chloroplasts. The exemplification discloses production of di-terpenes. KR20190079575A discloses a recombinant yeast wherein the number of peroxisomes is increased, leading to increased terpenoid production. Also disclosed is insertion of a heterologous geranylgeranyl pyrophosphate synthase.

US20130302861A1 discloses terpenoid production in yeast by localizing a terpene synthase to the mitochondria. The exemplification focuses on FPP-derived sesquiterpenes.

Guo-Song Liu et al (J. Agric. Food Chem. 2020, 68, 7, 2132-2138) reported the production of squalene, the FPP-based precursor of ergosterol, in yeast peroxisome demonstrating the functionality of the MVA pathway in this organelle. However, the resulting strain did not outperform its cytosolic counterpart, most probably due to the fact that the original pathway is already well-tuned and designed to efficiently produce squalene in the cytosol.

SUMMARY OF THE INVENTION

In a first aspect the invention relates to a yeast cell comprising a peroxisomally-localized enzyme catalyzing the formation of the branch point compound, which branch point compound can be converted in a prioritized pathway and in a non-prioritized pathway; and a peroxisomally-localized enzyme catalyzing the first step of the non-prioritized pathway. In a preferred embodiment, the invention relates to a yeast cell comprising a peroxisomally-localized GPP synthase and a peroxisomally-localized monoterpene synthase.

In a second aspect, the invention relates to a method for producing monoterpenoids, cannabinoids, iridoids, monoterpene indole alkaloids, and prenylated aromatic compounds using a yeast cell of the invention.

DESCRIPTION OF THE DRAWINGS

FIG. 4 shows graphs of the titer development in a fermentation of yeast according to the invention. FIG. 4A shows the production of (R)-(+)-limonene and FIG. 4B shows the production of geraniol. For further details, see example 4.

FIG. 6A shows (−)-limonene and trans-isopiperitenol production in strains CYTLim06, PERLim29 and PERLim30. FIG. 6B shows geraniol and 8-hydroxy-geraniol production in strains PER-MGer03 and PERGer04.

FIG. 7A shows CBGA production in strains PERMva01 and PERCan01 in culture supplemented with 0.5 mM OA. FIG. 7B shows CBGA production at different concentrations of OA added in the culture. FIG. 7C shows improved peroxisomal CBGA production by targeting CsPT4 to the peroxisome using an N-terminal targeting signal in strain PERCan02.

OVERVIEW OF SEQUENCE LISTING

Figure 1:
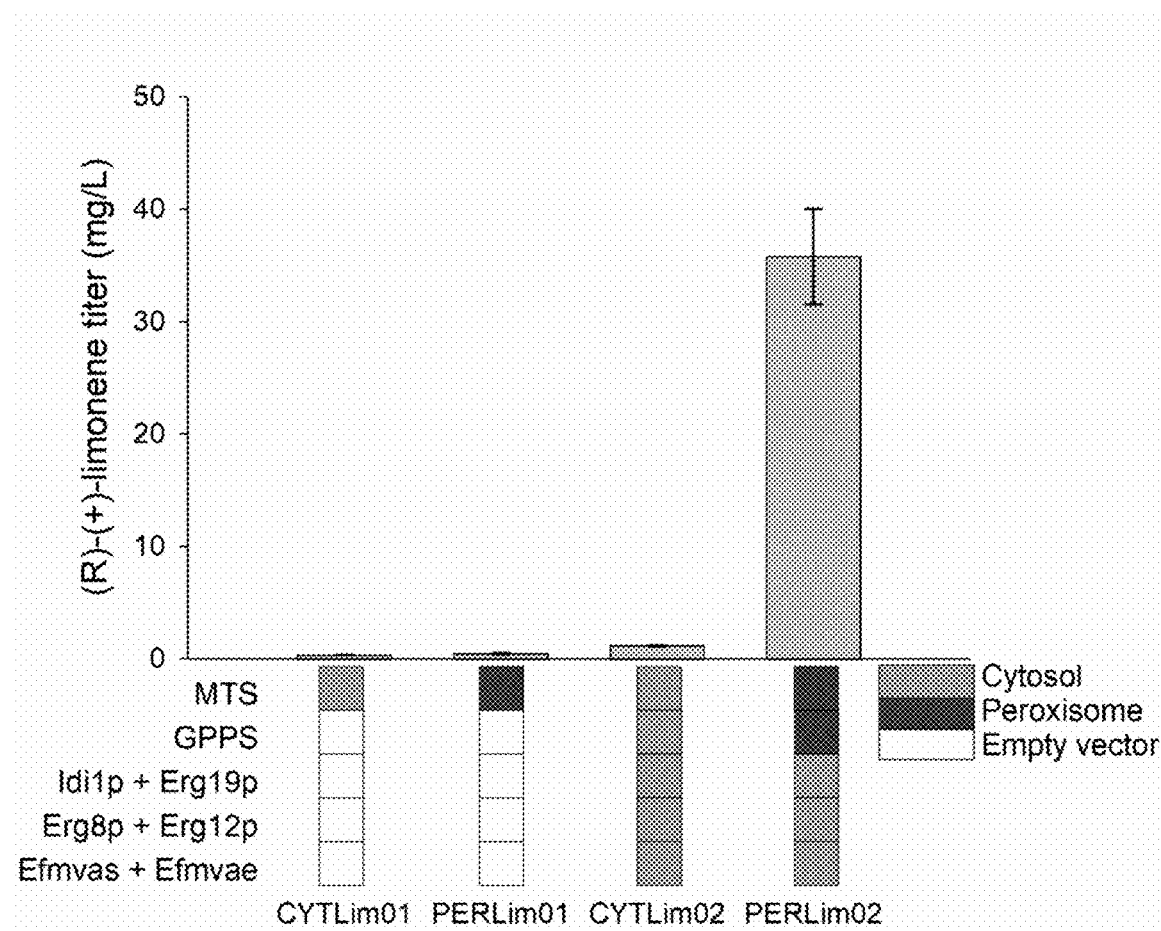
FIG. 1 shows a chart disclosing the limonene production in yeast, where the limonene synthase (MTS) and/or the GPP synthase were localized to either the cytoplasm or the peroxisomes. For further details, see example 1.

SEQ ID NO: 1 is the amino acid sequence of the engineered geranyl diphosphate synthase derived from the Saccharomyces cerevisiae Erg20p protein and indicated as Erg20p$^{N127W}$.

SEQ ID NO: 2: is the amino acid sequence of the geranyl diphosphate synthase derived from the Saccharomyces cerevisiae Erg20p protein and indicated as Erg20p$^{N127W}$, and provided with the SKL peroxisomal localization signal.

SEQ ID NO: 3: is the amino acid sequence of the (+)-limonene synthase derived from Citrus limon and encoded by the C/LimS gene.

SEQ ID NO: 4: is the amino acid sequence of the (+)-limonene synthase derived from Citrus limon and encoded by the C/LimS gene and provided with the SKL peroxisomal localization signal.

SEQ ID NO: 5: is the amino acid sequence of the camphene synthase derived from Solanum elaeagnifolium and encoded by the SeCamS gene.

SEQ ID NO: 6: is the amino acid sequence of the camphene synthase derived from Solanum elaeagnifolium and encoded by the SeCamS gene and provided with the SKL peroxisomal localization signal.

SEQ ID NO: 7: is the amino acid sequence of the α-pinene synthase derived from Pinus taeda and encoded by the PtPinS gene.

SEQ ID NO: 8: is the amino acid sequence of the α-pinene synthase derived from Pinus taeda and encoded by the PtPinS gene and provided with the SKL peroxisomal localization signal.

SEQ ID NO: 9: is the amino acid sequence of the sabinene synthase derived from Salvia pomifera and encoded by the SpSabS gene.

SEQ ID NO: 10: is the amino acid sequence of the sabinene synthase derived from Salvia pomifera and encoded by the SpSabS gene and provided with an SKL peroxisomal localization signal.

SEQ ID NO: 11: is the amino acid sequence of the geraniol synthase derived from Ocimum basilicum and encoded by the tObGES gene.

SEQ ID NO: 12: is the amino acid sequence of the geraniol synthase derived from Ocimum basilicum and encoded by the tObGES gene, and provided with the SKL peroxisomal localization signal.

SEQ ID NO: 13: is the amino acid sequence of the geranyldiphosphate:olivetolate geranyltransferase derived from Cannabis sativa and encoded by the CsPT4 gene.

SEQ ID NO: 14: is the amino acid sequence of the geranyldiphosphate:olivetolate geranyltransferase derived from Cannabis sativa and encoded by the CsPT4 gene, and provided with the SKL peroxisomal localization signal.

SEQ ID NO: 15: is the amino acid sequence of the fusion protein between having a GPP synthase domain (Erg20p$^{N127W}$) and a terpene synthase domain (C/LimS) linked by a 5×GS polypeptide and targeted to the peroxisome by a C-terminal PTS1

SEQ ID NO: 16: is the amino acid sequence of the fusion protein between having a terpene synthase domain (C/LimS) and a GPP synthase domain (Erg20p$^{N127W}$) linked by a 5×GS polypeptide and targeted to the peroxisome by a C-terminal PTS1

SEQ ID NO: 17: is the amino acid sequence of the geraniol 8-hydroxylase derived from Catharanthous roseus and encoded by the CrG8OH gene.

SEQ ID NO: 18: is the amino acid sequence of the cytochrome P450 reductase derived from Catharanthous roseus and encoded by the CrCPR gene.

SEQ ID NO: 19 is the amino acid sequence of the aromatic prenyltransferase AtaPT derived from Aspergillus terreus.

SEQ ID NO: 20 is the amino acid sequence of the 7-dimethylallyltryptophan synthase (7-DMATS) derived from Neosartorya fumigatus.

SEQ ID NO: 21 is the amino acid sequence of the phenylpropane-specific prenyltransferase AcPT1 derived from Artemisia capillaris.

SEQ ID NO: 22: is the amino acid sequence of the (R)-(+)-linalool synthase derived from Mentha citrata and encoded by the McLiS gene.

SEQ ID NO: 23: is the amino acid sequence of the (R)-(+)-linalool synthase derived from Mentha citrata and encoded by the McLiS gene and provided with the SKL peroxisomal localization signal.

SEQ ID NO: 24: is the amino acid sequence of the (S)-(−)-limonene synthase derived from *Mentha spicata* and encoded by the MsLimS gene.

SEQ ID NO: 25: is the amino acid sequence of the (S)-(−)-limonene synthase derived from *Mentha spicata* and encoded by the MsLimS gene and provided with the SKL peroxisomal localization signal.

SEQ ID NO: 26: is the amino acid sequence of the beta-myrcene synthase derived from *Ocimum basilicum* and encoded by the ObMyrS gene and provided with the SKL peroxisomal localization signal.

SEQ ID NO: 27: is the amino acid sequence of the limonene-3-hydroxylase derived from *Mentha spicata* and encoded by the MsLim3H gene.

SEQ ID NO: 28: is the amino acid sequence of the cytochrome P450 reductase derived from *Taxus cuspidata* and encoded by the tcCPR gene.

SEQ ID NO: 29: is the amino acid sequence of the geranyldiphosphate:olivetolate geranyltransferase derived from *Cannabis sativa* and encoded by the CsPT4 gene, and provided with the N-terminal peroxisomal localization signal.

Definitions and Abbreviations

Branch point molecule: A branch point molecule is according to the invention intended to mean a molecule in a biochemical pathway that can be converted into two or more different other molecules or pathways. An example is GPP that can be converted into FPP and thereby be directed into the synthesis of sesqui- and higher terpenes, or it can be converted into a monoterpene by a monoterpene synthase, into cannabinoids by a prenyltransferase enzyme, or into a prenylated aromatic compound by a corresponding prenyltransferase. For branch point molecules there will typical exist a favored or prioritized pathway, which in the natural yeast cells is favored due to e.g. biosynthetic need; and one or more other pathways that are non-prioritized.

DMAPP and IPP: Dimethylallyl pyrophosphate (or dimethylallyl diphosphate; DMAPP) and isopentenyl pyrophosphate (or isopentenyl diphosphate; IPP) are 5-carbon precursors which are used to make isoprenoids GPP: Geranyl diphopsphate (or geranyl pyrophosphate; GPP). GPP is formed by condensation of a DMAPP and an IPP molecule. GPP is a branch point molecule in isoprenoid synthesis and it can, by addition of an IPP molecule, be converted into FPP, and thereby be directed into the biosynthesis of sesqui-, di- or tri-terpenes or sterol synthesis, or it can, by the action of a monoterpene synthase, be directed into the synthesis of monoterpenoids, iridoids, and monoterpene indole alkaloids. Other prenyltransferases can also direct GPP towards the production of cannabinoids, prenylated aromatic compounds, or meroterpenoids in general.

FPP: Farnesyl pyrophosphate (or farnesyl diphosphate; FPP) is formed by condensing GPP with an IPP molecule. FPP is the precursor for the synthesis of sesquiterpenes, diterpenes, triterpenes and sterols.

GGPP: Geranylgeranyl pyrophopsphate (or geranylgeranyl diphosphate; GGPP). GGPP is formed by condensing an FPP with an IPP molecule. GGPP is precursor for the synthesis of diterpenes.

Higher terpenes: are in this application intended to mean molecules comprising more than 10 carbon atoms of isoprenoid structure. Examples include sesquiterpenes, diterpenes and triterpenes. Higher terpenes may include moieties not having the isoprenoid structure in addition to the terpene structure.

Monoterpenes: Monoterpenes (or monoterpenoids) are molecules comprising a 10-carbon isoprenoid structure. Monoterpenoids may, in addition to the 10-carbon isoprenoid structure, comprise moieties not having isoprenoid structure. Frequently, the biosynthesis of monoterpenoids involves several additional steps following the initial conversion of GPP to the basic monoterpene skeleton. These additional steps may be oxidations (e.g. catalyzed by a cytochrome P450 enzyme), reductions, isomerizations, acetylations, methylations, etc.

Iridoids: are a group of compounds found in plants and some animals, which are biosynthetically derived from 8-oxogeraniol.

Monoterpene indole alkaloids are a large and diverse group of plant chemical compounds derived from a unit of tryptamine and a 10-carbon or 9-carbon unit of terpenoid origin that is, in turn, derived from 8-oxo-geraniol.

Cannabinoids: are a group of compounds members of which were initially isolated from the plant *Cannabis sativa*. Many cannabinoids are bio-synthesized by the addition of GPP to olivetolic acid.

MEP pathway: The methylerythritol 4-phosphate (MEP) pathway forming IPP and DMAPP. The pathway is found e.g. in most bacteria, in algae and is the plastids of higher plants.

MVA pathway: The mevalonate pathway (MVA pathway) is an essential metabolic pathway present in eukaryotes and in some bacteria forming IPP and DMAPP starting from acetyl-CoA.

Alternative MVA pathway: The alternative MVA pathway is found in archaea and provides IPP and DMAPP, starting from acetyl-CoA but utilizing isopentenyl phosphate as intermediate.

Monoterpene synthases. The term includes any enzyme that is able to catalyze the rearrangement of GPP into monoterpenoids. Monoterpene synthases typically synthesize multiple products, but the diversity of products varies among terpene synthases. Some terpene synthases have high product specificity, catalyzing the synthesis of a limited number of products, and other terpene synthases have low product specificity, catalyzing the synthesis of a large variety of different terpenes. Examples of the products of monoterpene synthases include, but are not limited to, the following compounds: tricyclene, alpha-thujene, alpha-pinene, alpha-fenchene, camphene, sabinene, beta-pinene, myrcene, delta-2-carene, alpha-phellandrene, 3-carene, 1,4-cineole, alpha-terpinene, beta-phellandrene, 1,8-cineole, limonene, (Z)-beta-ocimene, (E)-beta-ocimene, gamma-terpinene, terpinolene, linalool, perillene, allo-ocimene, cis-beta-terpineol, cisterpine-1-ol, isoborneol, delta-terpineol, borneol, chrysanthemol, lavandulol, alpha-terpineol, nerol, geraniol. In addition to GPP, certain terpene synthases (or terpene synthase variants developed by protein engineering) have been reported to convert noncanonical prenyl diphosphate substrates, such as the 11-carbon substrate 2-methyl-GPP, to terpenes with non-canonical prenyl scaffolds (Ignea et al. 2018). In the context of this disclosure, enzymes that are able to convert non-canonical prenyl-diphosphates with carbon lengths that differ from 10 into non-canonical terpenoids with 8, 9, 11, or 12 carbons are also included in the definition of monoterpene synthases.

Prenyltransferases: Are enzymes that append a prenyl moiety to isoprenoid or non-isoprenoid skeletons. Many prenyltransferases that append a prenyl moiety to other isoprenoid chains are involved in the synthesis of the prenyl diphosphate precursors, such as GPP (GPP synthases), FPP (FPP synthases), GGPP (GGPP synthases) or geranylfarnesyl diphosphate synthases (GFPP synthases). These enzymes typically add IPP units to extend DMAPP to larger size prenyl-diphosphates in the trans-configuration. For this reason they are also called trans-polyprenyl synthases or trans-polyprenyltransferases. Several prenyltransferase enzymes exist that catalyze the cis-condensation and elongation of DMAPP with IPP. These enzymes are termed cis-prenyltransferase, or cis-polyprenyl diphosphate synthase, or cis-polyprenyltransferases, are responsible for the synthesis of neryl diphosphate, cis,cis-farnesyl diphosphate, and nerylneryl diphosphate.

Furthermore, certain isoprenoid prenyltransferases have been reported to condense two DMAPP molecules to lavandulyl diphosphate or chrysanthemyl diphosphate. Prenyltransferases that append a prenyl moiety to non-isoprenoid scaffolds add DMAPP, GPP, FPP or GGPP to non-isoprenoid compounds, including flavonoids, amino acid residues and peptides, aromatic compounds, and other chemical compounds in general. Such prenyltransferase enzymes are involved in the biosynthesis many different natural products including, but not limited to, cannabinoids, prenylated flavonoids, or other meroterpenoids. In the case of cannabinoid synthesis, this enzyme is a geranyldiphosphate:olivetolate geranyltransferase.

The prenylransferase may be part of separate polypeptides or fused into one polypeptide chain. The prenyltransferase may also be fused to a GPP synthase, a terpene synthase, or another non-terpene synthesizing protein. The prenyltransferase may also be fused to an enzyme that naturally localizes to the peroxisome matrix or its membrane in yeasts or in another organism, or that it is fused to a polypeptide chain that is itself fused to a peroxisomal targeting signal.

An aromatic prenyltransferase is selected among any enzyme with prenyltransferase activity, identified from any organism or engineered, that is able to transfer an isoprenoid moiety to another isoprenoid or non-isoprenoid compound. The prenylransferase may be part of separate polypeptides or fused into one polypeptide chain. The prenyltransferase may also be fused to a GPP synthase, a terpene synthase, or another non-terpene synthesizing protein. The prenyltransferase may also be fused to an enzyme that naturally localizes to the peroxisome matrix or its membrane in yeasts or in another organism, or that it is fused to a polypeptide chain that is itself fused to a peroxisomal targeting signal.

DETAILED DESCRIPTION OF THE INVENTION

The invention is based on the observation that in biochemical pathways branch points exist where branch point molecules can be diverted into different biochemical pathways and that the prioritized pathway leads to compounds that are mandatory for growth of the particular organism, whereas other pathways are not prioritized (designated non-prioritized pathway). It follows that special measures are required to make the cell prioritize a non-prioritized pathway.

According to the invention, the production of a compound of a non-prioritized pathway is increased by peroxisomal localization of an enzyme catalyzing the formation of the branch point compound and an enzyme catalyzing the first step of the non-prioritized pathway.

The enzyme catalyzing the formation of a branch point compound and the enzyme catalyzing the first step of the non-prioritized pathway may be present as separate molecules, they may be present as a single molecule comprising a domain catalyzing the formation of a branch point compound and another domain that catalyzes the first step of the non-prioritized pathway or they may even be present in form of a multidomain molecule that in addition to one or two of the two enzymatic activities comprise one or more additional domains with different function.

GPP is such a branch point molecule in terpene synthesis and it can be converted into monoterpenoid or compounds comprising a 10-carbon monoterpenoid structure attached to a non-prenyl moiety; into sesqui-, di- or tri-terpenoids or compounds comprising a 15-carbon sesqui-, 20-carbon di- or a 30-carbon tri-terpenoid structure; or into sterols.

In yeasts, sterols are essential for the growth and survival of the cells, therefore the conversion of GPP into FPP, and eventually into sterols, is prioritized.

Thus, in a first aspect, the invention relates to a yeast cell wherein an enzyme catalyzing the formation of GPP and an enzyme catalyzing the first step in a pathway starting from GPP and forming a monoterpenoid, cannabinoid, iridoid, monoterpene indole alkaloid, or a prenylated aromatic compound are localized to the peroxisomes.

Enzymes catalyzing the formation of GPP, also called GPP synthases, are known for the skilled person. The invention is not limited to any particular GPP synthase, so, in principle, any GPP synthase may be peroxisomally localized and used according to the invention. The GPP synthase may be a homologous GPP synthase, i.e. an enzyme originating from the same species as the host cell, it may be a heterologous enzyme, i.e. an enzyme that originate from a different species than the host cell, or it may even be a synthetic enzyme, i.e. an enzyme that does not occur in nature but is artificially created using techniques known in the art of genetic engineering. The GPP synthase can be a single subunit, or multi-subunit enzyme that is composed from identical or non-identical subunits (several such examples exist in nature and are known to the skilled person, i.e. the combination of the large with the small subunit of snapdragon GGPP synthase (Orlova I. et al 2009)). The subunit(s) of the GPP synthase may be part of separate polypeptides or fused into one polypeptide chain. The subunit(s) may also be fused to a terpene synthase, a prenyltransferase, or another non-terpene synthesizing protein. In particular, it may be fused to an enzyme that naturally localizes to the peroxisome in yeasts or in another organism, or that it is fused to a polypeptide chain that is, in turn, fused to a peroxisomal targeting signal.

An example of a preferred GPP synthase according to the invention is an engineered GPP synthase Erg20p$^{N127W}$ (SEQ ID NO: 1) which is the native *S. cerevisiae* GPP synthase containing the substitution N127W. The N127W substitution blocks the catalytic site of the enzyme to prevent further conversion of GPP into FPP by addition of an IPP molecule.

Other preferred GPP synthases includes polypeptides having, alone or in combination with other polypeptides, GPP synthase activity, said polypeptides originating from an organism that belongs to any of the kingdoms of life, i.e. Bacteria, Archaea, Protozoa, Chromista, Plantae, Fungi, or Animalia. Other preferred synthases include enzymes that have been engineered to have, alone or in combination with other polypeptides, GPP synthase activity, using protein engineering.

Enzyme catalyzing the first step in a pathway starting from GPP and forming a monoterpenoid, iridoid, cannabinoid, monoterpene indole alkaloid, a prenylated aromatic compound, or other meroterpenoids; are also known for the person skilled in the art. Non-limiting examples include monoterpene synthases, such as (+)-limonene synthase, (−)-limonene synthase, α-pinene synthase, 1,8-cineole synthase, sabinene synthase, camphene synthase, linalool synthase, myrcene synthase, or geraniol synthase, and prenyltransferases, such an geranyldiphosphate:olivetolate geranyltransferase, or a broad specificity aromatic prenyltransferase.

Examples of preferred monoterpene synthase according to the invention includes the (+)-limonene synthase derived from *Citrus limon* and having the amino acid sequence of SEQ ID NO: 3; the camphene synthase derived from *Solanum elaeagnifolium* and having the amino acid sequence of SEQ ID NO: 5; the (−)-limonene synthase derived from *Mentha spicata* and having the amino acid sequence of SEQ ID NO: 25; the (+)-linalool synthase derived from *Mentha citrata* and having the amino acid sequence of SEQ ID NO: 23; the myrcene synthase derived from *Ocimum basilicum* and having the amino acid sequence of SEQ ID NO: 26; the α-pinene synthase derived from *Pinus taeda* and having the amino acid sequence of SEQ ID NO: 7; the sabinene synthase derived from *Salvia pomifera* and having the amino acid sequence of SEQ ID NO: 9; and the geraniol synthase form *Ocimum basilicum* and having the amino acid sequence of SEQ ID NO: 11

Other preferred monoterpene synthases includes polypeptides having activity as beta-pinene synthase, (−)-limonene synthase, linalool synthase, myrcene synthase, bornyl diphosphate synthase, alpha-terpineol synthase, isoborneol synthase, tricyclene synthase, alpha-thujene synthase, alpha-fenchene synthase, delta-2-carene synthase, alpha-phellandrene synthase, 3-carene synthase, 1,4-cineole synthase, alpha-terpinene synthase, beta-phellandrene synthase, 1,8-cineole synthase, (Z)-beta-ocimene synthase, (E)-beta-ocimene synthase, gamma-terpinene synthase, terpinolene synthase, allo-ocimene synthase, cis-beta-terpineol synthase, cis-terpine-1-ol synthase, delta-terpineol synthase, borneol synthase, alpha-terpineol synthase, nerol synthase, 2-methylisoborneol synthase, 2-methylenebornene synthase, 2-methyl-2-bornene synthase, or beta-phellandrene synthase.

Prenyltransferases able to attach the geranyl moiety to a non-isoprenoid scaffold include the geranyldiphosphate:olivetolic geranyltransferase CsPT4 derived from *Cannabis sativa* and having the amino acid sequence of SEQ ID NO: 13, or the aromatic prenyltransferase AtaPT from *Aspergillus terreus* and having the amino acid sequence of SEQ ID NO: 19.

Other preferred prenyltransferases able to add the prenyl group to isoprenoid scaffolds include neryl diphosphate synthase, chrysanthemyl diphosphate synthase, or lavandulyl diphosphate synthase, while preferred prenyltransferases able to append the prenyl group to non-isoprenoid scaffolds include the 7-dimethylallyltryptophan synthase from *Aspergillus fumigatus* (7-DMATS) (SEQ ID NO: 20) and the phenylpropane-specific prenyltransferase AcPT1 from *Artemisia capillaris* (SEQ ID NO: 21).

In one preferred embodiment, a *Saccharomyces cerevisiae* cell is provided wherein a GPP synthase and a limonene synthase are localized to the peroxisomes. The inventors have found that this alone is sufficient to induce a 32-fold improvement in the monoterpene (limonene) production compared with the production obtained when these two enzymes are expressed in the cytosol, or only one of the two enzymes is present in the peroxisome and the other in the cytosol. Further, additional peroxisomal compartmentalization of the complete MVA pathway, comprised of EfmvaS, EfmvaE, Erg12p, Erg9p and Idi1p improved the monoterpene production by 14-fold, 17-fold, 17-fold, 20.5-fold, 22-fold, and 125 fold, respectively for camphene, pinene, (−)-limonene, (+)-linalool, sabinene and (+)-limonene, compared with an identical yeast cell where the enzymes are localized in the cytosol.

In another preferred embodiment, a *S. cerevisiae* cell is provided wherein a GPP synthase and a geraniol synthase are localized to the peroxisomes. The yeast cell produces improved level of geraniol, a precursor for iridoids and monoterpene indole alkaloids, compared with same cell wherein the enzymes are localized in the cytosol. In a further preferred embodiment, a *S. cerevisiae* cell is provided, wherein a GPP synthase and an olivetolic acid prenyltransferase are localized to the peroxisomes. The yeast cell is efficient in producing cannabigerolic acid, the precursor of several cannabinoid compounds.

In a further embodiment a *S. cerevisiae* cell is provided, wherein a GPP synthase and the aromatic prenyltransferase AtaPT, from *Aspergillus terreus* are localized to the peroxisomes. When provided with umbeliferone, quercetin, isoquercetin, resveratrol, or naringenin, the yeast cell afforded efficient synthesis of osthrutin, geranylated quercetin, geranylated isoquercetin, geranylresveratrol, and geranyl-naringenin respectively.

In a further embodiment, a *S. cerevisiae* cell is provided, wherein an isopentenyl diphosphate isomerase (IDI), which is a DMAPP synthesizing enzyme, and a terpene synthase catalyzing the synthesis of isoprene (isoprene synthase; ISPS) are localized to the peroxisomes. The yeast cell produced afforded efficient synthesis of isoprene. In a further embodiment, a *S. cerevisiae* cell is provided, wherein an isopentenyl diphosphate isomerase (IDI) and the lavandulyl diphosphate synthase from *Lavandula x intermedia* are localized to the peroxisomes. The yeast cell afforded efficient synthesis of lavandulol.

In a further embodiment, a *S. cerevisiae* cell is provided, wherein an isopentenyl diphosphate isomerase (IDI) and the chrysanthemyl diphosphate synthase from *Tanaceturn cinerariifolium* are localized to the peroxisomes. The yeast cell afforded efficient synthesis of chrysanthemol.

In a further embodiment, a *S. cerevisiae* cell is provided, wherein an isopentenyl diphosphate isomerase (IDI) and the 7-dimethylallyltryptophan synthase from *Aspergillus fumigatus* (7-DMATS) are localized to the peroxisomes. The yeast cell afforded efficient synthesis of prenyl-tryptophan.

In a further embodiment, a *S. cerevisiae* cell is provided, wherein an isopentenyl diphosphate isomerase (IDI) and the phenylpropane-specific prenyltransferase AcPT1 from *Artemisia capillaris* are localized to the peroxisomes. When provided with p-coumaric acid, the yeast cell afforded efficient synthesis of drupanin and artepillin C.

In a further embodiment, a *S. cerevisiae* cell is provided, wherein an isopentenyl diphosphate isomerase (IDI) and the O-prenyltrasferase AcaPT from *Antrodia camphorate* are localized to the peroxisomes. When provided with apigenin, kaempherol, daidzein, naringenin, genistein, isoliquiritigenin, equol, umbelliferone, curcumin, resveratrol, or diethylstilbestrol, the yeast cell afforded efficiently synthesis of 4'-dimethylallylapigenin, 4'-dimethylallyl-naringenin, 4'-dimethylallyl-kaempferol, 4'-dimethylallyl-daidzein, 7-dimethylallyl-daidzein, 7,4'-di-(dimethylallyl)-daidzein, 4'-dimethylallylgenistein, 7-dimethylallyl-genistein, 7,4'-di-(dimethylallyl)-genistein, 4-dimethylallylisoliquiritigenin, 4'-dimethylallyl-equol, 7-dimethylallyl-equol, 6-dimethylallyl-equol, 4'-dimethylallyl-daidzin, 7-dimethylallyl-umbelliferone, 8-dimethylallyl-curcumin, 8'-dimethylallyl-demethoxycurcumin, 8-dimethylallyl-demethoxycurcumin, 7-dimethylallyl-Ltryptophan, 4'-dimethylallyl-resveratrol, or 5-dimethylallyl-diethylstilbestrol.

Peroxisomal Localization

According to the invention, the expression peroxisomal localization or grammatically equivalent terms in connection with biosynthetic enzymes for the terpene pathways, is intended to mean that the enzymes in question are translocated to the peroxisomes or the peroxisome membrane after synthesis and that the enzymes thereafter exerts their catalytic functions in the peroxisomes.

Peroxisomal localization can be effectuated by providing the gene encoding the enzyme to be peroxisomally localized with a peroxisomal localization signal.

Peroxisomal localization and peroxisomal localization signals are known in the art e.g. in WO9424289A1 and KR101308971B1 (incorporated herein by reference); and such signals and methods known in the art are also useable according to the present invention.

A preferred peroxisomal localization signal is SKL (Ser-LysLeu) added to the C-terminus of the polypeptide to be peroxisomally localized or any C-terminal tripeptide with the canonical sequence (S/A/C)-(K/R/H)-(L/M).

For yeast, another preferred localization signal consists of the conserved peptide $(R/K)(L/V/I)-X_5-(H/Q)-(L/A/F)$ added to the N-terminus of the polypeptide to be peroxisomally localized.

An additional method to effectuate peroxisomal localization of a protein is to fuse said protein with another protein that is naturally found in the peroxisomes of yeasts or other organisms. A further method to achieve peroxisomal localization of a protein is to construct a protein fusion between said protein and another protein (or protein domain) that does not normally reside in the peroxisome but is engineered to localize to the peroxisome by the addition of a localization signal as described above.

The peroxisomally localized enzymes may be homogeneous, meaning that the peroxisomally localized enzyme is identically to enzyme naturally found in the cytoplasm of the host cell or it may be heterologous, meaning that it is different from the enzyme naturally found in the cytoplasm of the host cell.

According to the invention, peroxisomal localization of an enzyme means that a gene encoding the enzyme in question, provided with an encoded peroxisomal localization signal is introduced into the host cell. If the enzyme in question is an enzyme that is naturally found in the host cell, it is believed that the peroxisomally localized enzyme provides for the improved synthesis of monoterpenoids, cannabinoids, iridoids monoterpene indole alkaloids and other prenylated compounds according to the invention, whereas the naturally enzyme localized in the cytoplasm of the host cell provides for the normal biosynthesis of biomolecules necessary for survival and growth of the host cell. For example, if the enzyme in question is a GPP synthase, the peroxisomally localized GPP synthase will provide the improved synthesis of monoterpenoids, cannabinoids, iridoids, monoterpene indole alkaloids, and other prenylated compounds according to the invention and the natural GPP-synthesizing enzyme localized in the cytoplasm will secure that GPP is provided for the biosynthesis of required molecules e.g. sterols; necessary to secure survival and normal growth of the host cell.

If the selected host cell is a polyploid cell, e.g. a diploid or tetraploid cell; it may even be possible to provide for peroxisomal localization by gene editing techniques resulting that one or more allele of the gene encoding the enzyme in question is provided with a peroxisomal localization signal and leaving at least one allele unaltered. This will secure that the edited allele(s) provide for the peroxisomal localized enzyme, whereas the non-edited allele(s) provides for the natural enzyme localized in the cytoplasm.

Host Cells

The host cell is according to the invention a yeast cell, i.e. a eukaryotic single cellular organism; reviewed e.g. in: The yeasts. $5^{th}$ edition. A taxonomic study. Editors: Kurtzman, Fell, Boekhout. Elsevier, 2011.

Preferred host cells include cells belonging to the genera: *Saccharomyces, Pichia, Candida, Yarrowia*, Ogataea. More preferred, the host cells are selected among the species; *Saccharomyces cerevisiae, Pichia pastoris, Yarrowia lipolytica*, Ogataea polymorpha, *Candida albicans, Candida boidinii*.

The invention is not limited to any particular methods for providing the peroxisomal localization for the enzymes according to the invention. Any method known in the art for providing suitable genes, optimizing codon usage, providing suitable regulatory elements such as promoters, terminators, adenylation sites, introns, exons, enhancer elements, ribosome binding sites, Kozak sequences, transforming yeasts, etc. may be used according to the invention.

Production

The invention is also related to the production of monoterpenoids, cannabinoids, iridoids, monoterpene indole alkaloids and other prenylated compounds using a yeast cell of the invention.

According to the invention monoterpenoids, cannabinoids, iridoids, monoterpene indole alkaloids, and prenylated compounds may be produced using a method comprising the steps of:
  a. Providing a yeast cell according to the invention;
  b. Growing the yeast cell in a substrate supporting growth of the yeast cell; and
  c. When required, providing a co-substrate to be prenylated.
  d. Recovering the compound from the fermentation broth, or converting the compound to more complex products within the yeast cells by the action of additional native or heterologously expressed enzymes.

The compound provided by this method may even be further converted to more complex products within the yeast cells by the action of additional native or heterologously expressed enzymes.

Growing the yeast can in principle be done in any known method for growing yeast, but in order to facilitate the recovery it is preferred to grow the yeast cells in liquid medium in a container such as in shake-flasks or fermenters.

It is particular preferred to grow the yeast cells in a fermenter and the fermentation process may be performed as a batch fermentation, fed-batch fermentation, or a continuous fermentation, as known in the art.

The substrate supporting growth of the yeast cell may be any suitable medium comprising a carbon source, nitrogen source, minerals and nutritionals required by the particular yeast cell.

The substrate may be a complex substrate comprising ingredients that are not fully defined, or it may be a defined medium comprising only defined ingredients.

As examples of ingredients for a complex medium can be mentioned molasses, dextrins, hydrolysates of starch and/or proteins.

As examples of ingredients for a defined medium can be mentioned: glucose, sucrose, ammonia, salts, minerals and vitamins.

The fermentation process generates a fermentation broth comprising cells, water, product, remaining nutritionals and minerals and waste products generated by the cells.

The recovery of the monoterpenoids, cannabinoids, iridoids, monoterpene indole alkaloids, and other prenylated compounds from the fermentation broth is done using methods known in the art for recovering such compounds.

Materials and Methods

Genes Used:

TABLE 1

List of genes used in the study. Accession numbers are for Uniprot.org. Where unavailable a reference is cited.

| Gene | Origin | Function | Accession number/reference |
|---|---|---|---|
| EfmvaS | *Enterococcus faecalis* | HMG-CoA synthase | Q9FD71 |
| EfmvaE | *Enterococcus faecalis* | Acetyltransferase + HMG-CoA reductase | Q9FD70 |
| ERG8 | *S. cerevisiae* | Phosphomevalonate kinase | P24521 |
| ERG12 | *S. cerevisiae* | Mevalonate kinase | P07277 |
| ERG19 | *S. cerevisiae* | Diphosphomevalonate decarboxylase | P32377 |
| IDI1 | *S. cerevisiae* | Isopentenyl-diphosphate Delta-isomerase | P15496 |
| ERG20 | *S. cerevisiae* | Farnesyl pyrophosphate synthase | P08524 |
| ERG20$^{N127W}$ | *S. cerevisiae* | Geranyl pyrophosphate synthase | (Ignea et al 2014) |
| C/LimS | *Citrus limon* | (+)-limonene synthase | Q8L5K3 |
| PiPinS | *Pinus taeda* | α-pinene synthase | Q84KL3 |
| SpSabS | *Salvia pomifera* | Sabinene synthase | A6XH06 |
| SeCamS | *Solarium elaeagnifolium* | Camphene synthase | (Philips et al 2003) |
| CrG8OH | *Catharanthous roseus* | geraniol 8-hydroxylase | Q8VWZ7.1 |
| MsLim3H | *Mentha spicata* | Limonene-3-hydroxylase | Q6IV13.1 |
| CrCPR/POR | *Catharanthous roseus* | cytochrome P450 reductase | Q05001.1 |
| tcCPR/POR | *Taxus cuspidate* | cytochrome P450 reductase | AAT76449.1 |
| McLiS | *Mentha citrata* | (R)-(+)-linalool synthase | AAL99381.1 |
| MsLimS | *Mentha spicata* | (S)-(−)-limonene synthase | AAC37366.1 |
| ObMyrs | *Ocimum basilicum* | Myrcene synthase | Q5SBP1.1 |

Yeast Strains

The yeast strains used in this application were based on the EGY48 *Saccharomyces cerevisiae* strain disclosed in (Ignea et al (2011), Thomas B. J. and R. Rothstein (1989) and (Ellerstrom M et al (1992)), and modified according to Table 2.

Constructions of Plasmids:

Plasmids were generated using standard methods used within genetic engineering and known in the art. Detailed protocols for methods for plasmid constructions can be found in general handbooks containing methods for molecular cloning.

Plasmids designed to provide for peroxisomal localization of enzymes, named pPER includes the peroxisomal localization signal (-SKL) fused C-terminally to the amino acid sequence of the enzymes or an N-terminal peroxisomal localization signal, whereas plasmids designed to provide cytoplasmatic localization of enzymes (phytl) did not contain this signal.

Genes were amplified by PCR and placed under the control of the dual inducible promoter $P_{GAL1}$ and $P_{GAL10}$. Coding genes sequences were then ligated using USER cloning (Nour-Eldin et al (2010)) into the backbone of the pESC-URA, pESC-LEU, pESCTRP, and pESC-HIS, vectors (Agilent Technologies) to construct the plasmids listed in Table 3.

TABLE 2

Strains

| Strain | Genotype |
|---|---|
| EGY48 | MATα, ura3, his3, trp1, 6xLexA operators::LEU2 - Derivative of the U457 strain (W303-1A background) |
| PERLim06 | EGY48 - $P_{Gal1}$-Efmva-SKL-tPGI1, $P_{Gal10}$-EfmvaE-SKL-tCYC1, $P_{SED1}$-ERG12-SKL-tFBA1, $P_{Tdh3}$-ERG8-SKL-tPRM8, $P_{Fba1}$-ERG19-SKL-tSPG5, $P_{Cww12}$-IDI-SKL-tENO2, $P_{Tef1}$-ERG20$^{N127W}$-SKL-tTDH2, $P_{Pgk1}$-LimS-SKL-tADH1. |
| PERGer01 | EGY48 - $P_{Gal1}$-Efmva-SKL-tPGI1, $P_{Gal10}$-EfmvaE-SKL-tCYC1, $P_{SED1}$-ERG12-SKL-tFBA1, $P_{Tdh3}$-ERG8-SKL-tPRM8, $P_{Fba1}$-ERG19-SKL-tSPG5, $P_{Cww12}$-IDI-SKL-tENO2, $P_{Tef1}$-ERG20$^{N127W}$-SKL-tTDH2, $P_{Pgk1}$-tOBGES-SKL-tADH1. |
| CYTMva01 | EGY48 - $P_{Gal1}$-Efmva-tPGI1, $P_{Gal10}$-EfmvaE -tCYC1, $P_{SED1}$-ERG12 -tFBA1, $P_{Tdh3}$-ERG8 -tPRM8, $P_{Fba1}$-ERG19-tSPG5, $P_{Cww12}$-IDI-tENO2, |
| PERMva01 | EGY48 - $P_{Gal1}$-Efmva-SKL-tPGI1, $P_{Gal10}$-EfmvaE-SKL-tCYC1, $P_{SED1}$-ERG12-SKL-tFBA1, $P_{Tdh3}$-ERG8-SKL-tPRM8, $P_{Fba1}$-ERG19-SKL-tSPG5, $P_{Cww12}$-IDI-SKL-tENO2, |

TABLE 3

List of plasmids used in the study

| Plasmid | Description |
| --- | --- |
| pCYT01 | 2μ; TRP1; AmpR; $P_{Gal1}$-EfmvaS-tAHD1; $P_{Gal10}$-EfmvaE-tCYC1 |
| pCYT02 | 2μ; HIS3; AmpR; $P_{Gal1}$-ERG8-tAHD1; $P_{Gal10}$-ERG12-tCYC1 |
| pCYT03 | 2μ; LEU2; AmpR; $P_{Gal1}$-IDI-tAHD1; $P_{Gal10}$-ERG19-tCYC1 |
| pCYT04 | 2μ; URA3; AmpR; $P_{Gal1}$-C/LimS-tAHD1; $P_{Gal10}$-ERG20$^{N127W}$-tCYC1 |
| pCYT05 | 2μ; URA3; AmpR $P_{Gal1}$-PtPinS-tAHD1; $P_{Gal10}$-ERG20$^{N127W}$-tCYC1 |
| pCYT06 | 2μ; URA3; AmpR $P_{Gal1}$-SpSabS-tAHD1; $P_{Gal10}$-ERG20$^{N127W}$-tCYC1 |
| pCYT07 | 2μ; URA3; AmpR; $P_{Gal1}$-SeCamS -tAHD1; $P_{Gal10}$-ERG20$^{N127W}$-tCYC1 |
| pCYT08 | 2μ; HIS3; AmpR; $P_{Gal1}$-C/LimS-tAHD1 |
| pCYT09 | 2μ; TRP1; AmpR; $P_{Gal1}$-CYP71D95-tAHD1; $P_{Gal10}$-fcCPR-tCYC1 |
| pCYT10 | 2μ; TRP1; AmpR; $P_{Gal1}$-CYP71D95-tAHD1; $P_{Gal10}$-crCPR-tCYC1 |
| pCYT11 | 2μ; TRP1; AmpR; $P_{Gal1}$-CYP71D95-tAHD1; $P_{Gal10}$-hpCPR-tCYC1 |
| pCYT12 | 2μ; URA3; AmpR; $P_{Gal1}$-McLiS -tAHD1; $P_{Gal10}$-ERG20$^{N127W}$-tCYC1 |
| pCYT13 | 2μ; URA3; AmpR; $P_{Gal1}$-MsLimS -tAHD1; $P_{Gal10}$-ERG20$^{N127W}$-tCYC1 |
| pCYT14 | 2μ; URA3; AmpR; $P_{Gal1}$-CsPT4-tAHD1; $P_{Gal10}$-ERG20$^{N127W}$-tCYC1 |
| pPER01 | 2μ; TRP1; AmpR; $P_{Gal1}$-EfmvaS-SKL-tAHD1; $p_{Gal10}$-EfmvaE-SKL-tCYC1 |
| pPER02 | 2μ; HIS3; AmpR; $P_{Gal1}$-ERG8-SKL-tAHD1; $P_{Gal10}$-ERG12-SKL-tCYC1 |
| pPER03 | 2μ; LEU2; AmpR; $P_{Gal1}$-IDI-SKL-tAHD1; $P_{Gal10}$-ERG19-SKL-tCYC1 |
| pPER04 | 2μ; URA3; AmpR; $P_{Gal1}$-C/LimS-SKL-tAHD1; $P_{Gal10}$-ERG20$^{N127W}$-SKL-tCYC1 |
| pPER05 | 2μ; URA3; AmpR; $P_{Gal1}$-PtPinS-SKL-tAHD1; $P_{Gal10}$-ERG20$^{N127W}$-SKL-tCYC1 |
| pPER06 | 2μ; URA3; AmpR; $P_{Gal1}$-SpSabS-SKL-tAHD1; $P_{Gal10}$-ERG20$^{N127W}$-SKL-tCYC1 |
| pPER07 | 2μ; URA3; AmpR; $P_{Gal1}$-SeCamS-SKL-tAHD1; $P_{Gal10}$-ERG20$^{N127W}$-SKL-tCYC1 |
| pPER08 | 2μ; URA3; AmpR; $P_{Gal1}$-C/LimS-SKL-tAHD1 |
| pPER09 | 2μ; HIS3; AmpR; $P_{Gal1}$-ERG8-SKL-tAHD1 |
| pPER10 | 2μ; HIS3; AmpR; $P_{Gal1}$-ERG12-SKL-tAHD1 |
| pPER11 | 2μ; LEU2; AmpR; $P_{Gal1}$-ERG20$^{N127W}$-SKL-tAHD1 |
| pPER12 | 2μ; LEU2; AmpR; $P_{Gal1}$-C/LimS-SKL-tAHD1 |
| pPER13 | 2μ; URA3; AmpR; $P_{Gal1}$-ObGES-SKL-tAHD1; $P_{Gal10}$-ERG20$^{N127W}$-SKL-tCYC1 |
| pPER14 | 2μ; URA3; AmpR; $P_{Gal1}$-CsPT4-SKL-tAHD1; $P_{Gal10}$-ERG20$^{N127W}$-SKL-tCYC1 |
| pPER15 | 2μ; URA3; AmpR; $P_{Gal1}$-ERG20$^{N127W}$-5GS-CILimS-SKL-tAHD1 |
| pPER16 | 2μ; URA3; AmpR; $P_{Gal1}$- C/LimS -5GS- ERG20$^{N127W}$ -SKL-tAHD1 |
| pPER17 | 2μ; URA3; AmpR; $P_{Gal1}$-crG8OH-tAHD1; $P_{Gal10}$-crCPR-tCYC1 |
| pPER18 | 2μ; URA3; AmpR; $P_{Gal1}$-McLiS-SKL -tAHD1; $P_{Gal10}$-ERG20$^{N127W}$-SKL-tCYC1 |
| pPER19 | 2μ; URA3; AmpR; $P_{Gal1}$-MsLimS-SKL -tAHD1; $P_{Gal10}$-ERG20$^{N127W}$-SKL-tCYC1 |
| pPER20 | 2μ; URA3; AmpR; $P_{Gal1}$-ObMyrS-SKL -tAHD1; $P_{Gal10}$-ERG20$^{N127W}$-SKL-tCYC1 |
| pPER21 | 2μ; URA3; AmpR; $P_{Gal1}$-MsLim3H-tAHD1; $P_{Gal10}$-tcCPR-tCYC1 |
| pPER22 | 2μ; URA3; AmpR; $P_{Gal1}$-PTS2-CsPT4-tAHD1; $P_{Gal10}$-ERG20$^{N127W}$-SKL-tCYC1 |

Designation of Strains Harboring Plasmids used in this Application

Plasmids (Table 3) were then used to transform yeast cells (Table 2) using the lithium acetate/PEG method. Transformants were selected by their respective auxotrophy on the corresponding minimal media.

TABLE 4

Strains harboring episomal vectors used in the study

| Parent | Strain | Plasmids |
| --- | --- | --- |
| EGY48 | CYTLim01 | pCYT08 |
| EGY48 | CYTLim02 | pCYT01, pCYT02, pCYT03, pCYT04 |
| EGY48 | PERLim01 | pPER08 |
| EGY48 | PERLim02 | pCYT01, pCYT02, pCYT03, pPER04 |
| EGY48 | PERLim03 | pCYT01, pCYT02, pPER03, pPER04 |
| EGY48 | PERLim04 | pCYT01, pPER02, pPER03, pPER04 |
| EGY48 | PERLim05 | pPER01, pPER02, pPER03, pPER04 |
| PERLim06 | PERLim07 | pPER01, pPER02, pPER03, pPER04 |
| PERLim06 | PERLim08 | pPER11 |
| PERLim06 | PERLim09 | pPER04 |
| PERLim06 | PERLim10 | pPER15 |
| PERLim06 | PERLim11 | pPER16 |
| EGY48 | CYTCam01 | pCYT07 |
| EGY48 | CYTPin01 | pCYT05 |
| EGY48 | CYTSab01 | pCYT06 |
| EGY48 | CYTCam02 | pCYT01, pCYT02, pCYT03, pCYT07 |
| EGY48 | CYTPin02 | pCYT01, pCYT02, pCYT03, pCYT05 |
| EGY48 | CYTSab02 | pCYT01, pCYT02, pCYT03, pCYT06 |
| EGY48 | CYTLin01 | pCYT01, pCYT02, pCYT03, pCYT12 |
| EGY48 | CYTLim04 | pCYT01, pCYT02, pCYT03, pCYT13 |
| EGY48 | CYTLim06 | pCYT01, pCYT02, pPER21, pCYT13 |
| CYTMva01 | CYTCan01 | pCYT01, pCYT02, pCYT03, pCYT14 |
| EGY48 | PERCam01 | pPER07 |
| EGY48 | PERPin01 | pPER05 |
| EGY48 | PERSab01 | pPER06 |
| EGY48 | PERCam02 | pPER01, pPER02, pPER03, pPER07 |
| EGY48 | PERPin02 | pPER01, pPER02, pPER03, pPER05 |
| EGY48 | PERSab02 | pPER01, pPER02, pPER03, pPER06 |
| EGY48 | PERLin01 | pPER01, pPER02, pPER03, pPER18 |
| EGY48 | PERLim27 | pPER01, pPER02, pPER03, pPER19 |
| EGY48 | PERLim29 | pPER01, pPER02, pPER19, pESC-Leu |
| EGY48 | PERLim30 | pPER01, pPER02, pPER19, pPER21 |
| EGY48 | PERMyr01 | pPER01, pPER02, pPER03, pPER20 |
| PERGer01 | PERGer02 | pPER01, pPER02, pPER03, pPER13 |
| PERGer01 | PERGer03 | pPER01, pPER02, pPER13, pESC-Leu |
| PERGer01 | PERGer04 | pPER01, pPER02, pPER13, pPER17 |
| PERMva01 | PERCan01 | pPER01, pPER02, pPER03, pPER14 |
| PERMva01 | PERCan02 | pPER01, pPER02, pPER03, pPER22 |

Culture Conditions

The yeast cells were first cultured on selective minimal media with glucose at 30° C. overnight. Complete minimal media consisted of 0.13% w/v dropout powder, 0.67% w/v yeast nitrogen base without amino acids with ammonium sulphate (YNB+AS), 2% w/v glucose. Dropout powder was purchased to lack leucine, histidine, uracil and tryptophan. When required, these four nutrients were added at 0.01-0.02% w/v. Cells were then harvested by centrifugation to remove medium and resuspended in selective minimal production media with an initial $OD_{600nm}$ around 0.5. This media was used to induce galactose promoters, with additional raffinose as an alternative carbon source. Media composition: 0.13% w/v dropout powder, 0.64% w/v YNB+AS, 2% galactose, 1% w/v raffinose. When appropriate, the same four nutrients as above were added at 0.01-0.02% w/v.

Isopropylmyristate (IPM) was added as an overlay corresponding to 10% of the culture volume. The cultures were grown at 30° C., 150 rpm, for the indicated time, the cells were then harvested by centrifugation, and the IPM phase recovered and analyzed using GCFID and/or GC-MS.

EXAMPLES

Example 1: Peroxisomal Co-Localization of a GPP Synthase and a Terpene Synthase Improves Terpene Production Yeast Strain Construction The *Saccharomyces cerevisiae* strains used were derived from the strain EGY48 (Mat α, ura3, trp1, his3, 6×LexA operators::LEU2). An engineered GPP synthase, ERG20$_{N127W}$ from *S. cerevisiae*, and a monoterpene synthase (MTs) characterized as a limonene synthase, C/LimS from *Citrus limon*, were expressed under the control of the P$_{GAL1}$-P$_{GAL10}$ promoter.

First, the C/LimS was expressed in the cytosol of the strain EGY48 (strain CYTLim01) As shown in FIG. 1, this strain produced only 0.31 mg/L of limonene. A very similar result was observed when targeting C/LimS to the peroxisome by addition of the C-terminal PTS1 SKL (strain PERLim01). Indeed, although GPP could be translocated from the cytosol into the peroxisome, the naturally very low cytosolic GPP pool is most likely to result in a very limited transport of this molecule into other compartments.

Overexpressing the entire MVA pathway in the cytosol using the *Enterococcus faecalis* EfmvaE and EfmvaS genes (equivalent to Erg10p, Erg13p and HmgRp in yeast), Erg8p, Erg12p, Erg9p, Idi1p and Erg20p$^{N127W}$ (as a GPP synthase) resulted in a 3.6-fold increase in limonene production to 1.12 mg/L (Strain CYTLim02).

However, by only targeting the GPP synthase ERG20p$^{N127W}$ and C/LimS to the peroxisome (strain PERLim02) the limonene production was improved drastically by 32 fold, compared to CYTLim02, to reach 35 mg/L. This indicates that the precursors IPP and/or DMAPP can be transported into the peroxisome and can be converted to GPP in this organelle.

The significant increase in limonene production also shows that the peroxisome is effectively able to act as a barrier and protect this newly formed GPP from the cytosolic ERG20p, thus allowing its uptake by C/LimS.

The results are also shown in FIG. 1.

Figure 2:
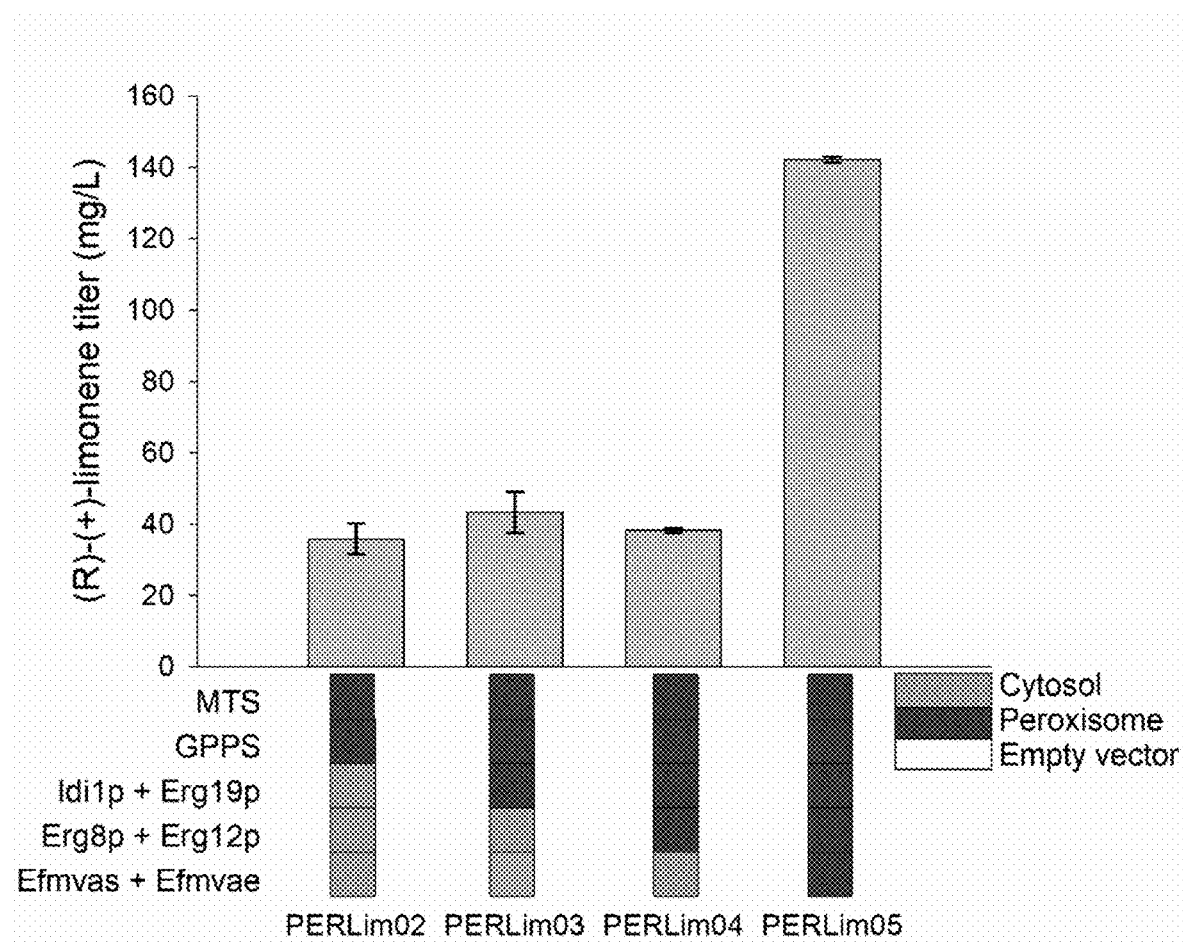
FIG. 2 shows a chart disclosing the effect of localizing genes of the MVA pathway together with the limonene synthase (MTS) and the GPP synthase to the peroxisomes. For further details, see example 2.

Example 2: Localization of the Mevalonate Pathway into Peroxisomes Enhances Production of Terpenoids To assess the possibility of harvesting peroxisomal acetyl-CoA for GPP production in this organelle, the eight MVA pathway enzymes were targeted to the peroxisome by addition of a C-terminal peroxisomal targeting signal of type 1 (PTS1) composed of the tripeptide SKL (see sequences part). Although the presence of the GPP synthase Erg20p$^{N127W}$ and C/LimS was sufficient to observe a notable jump in limonene production, stepwise localization of additional enzymes of the MVA pathway to the peroxisome improved limonene production only slightly when the pathway was not complete in this organelle. However, when all eight enzymes were peroxisomally targeted, an additional 4-fold increase in limonene production to 141 mg/L was observed (FIG. 2).

Moving the entire pathway from acetyl-CoA to limonene from the cytosol (strain CYTLim02) to the peroxisome (strain PERLim05) gives an overall 125-fold improvement in the production.

Figure 3:
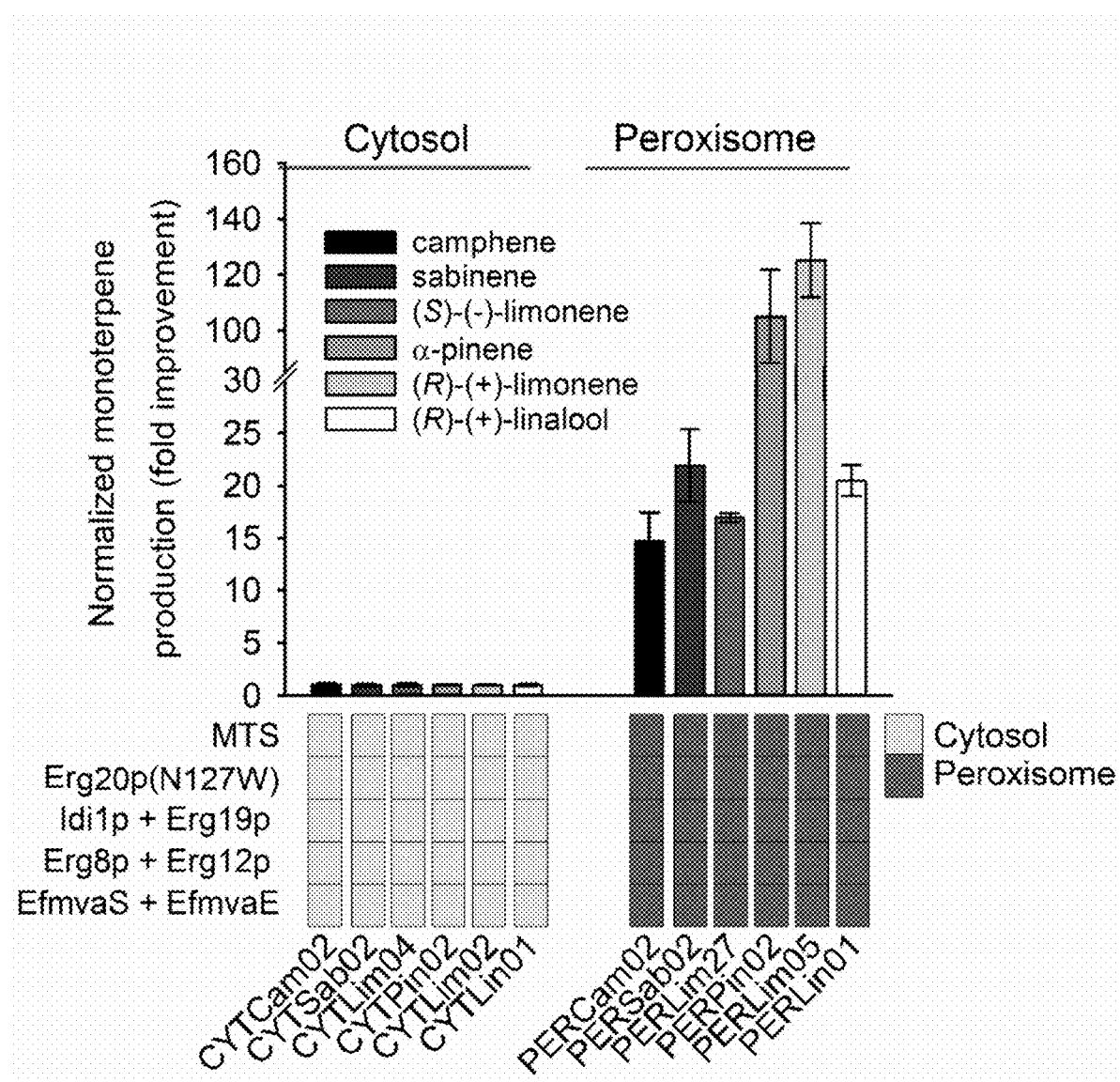
FIG. 3 shows a chart disclosing improved production of six monoterpenoids, camphene, sabinene, (S)-(−)-limonene, alpha-pinene, (R)-(+)-limonene and (R)-(+)-linalool, by peroxisomal localization of the respective synthases. For further details, see example 3.

Example 3: Expanding the Invention to Other Monoterpenoids. Construction of a Yeast Strain for Improved Camphene, Pinene, (S)-(−)-Limonene, (R)-(+)-Limonene, (R)-(+)-Linalool and Sabinene Production Using the Peroxisome In order to assess whether the peroxisome-linked improvements reported in examples 1 and 2 were specific to limonene production or were applicable to monoterpenes in general, we targeted five additional MTPs either to the cytosol or to the peroxisome, along with Erg20p$^{N127W}$, with overexpression of the rest of the MVA pathway. A camphene synthase (SeCamS), a (S)-(−)-limonene synthase (MsLimS), a (R)-(+)-limonene synthase (C/LimS), a (R)-(+)-linalool synthase (McLiS), an alpha-pinene synthase (PtPinS), and a sabinene synthase (SpSabS), were chosen and evaluated by determining the production titer of their major product. The same positive effect of peroxisome targeting of these five monoterpene synthase (MTSs) together with a GPP synthase (Erg20p$^{N127W}$) was observed with an improvement of 14-fold (PERCam02 vs CYTCam02), 17-fold (PERPin02 vs CYTPin02), 22-fold (PERSab02 vs CYTSab02), 17-fold (PERLim27 vs CYTLim04), 125-fold (PERLim05 vs CYTLim02) and 20.5-fold (PERLin01 vs CYTLin01), for camphene, pinene, sabinene, (S)-(−)-limonene, (R)-(+)-limonene and (R)-(+)-linalool respectively, compared to the corresponding cytosolic expression of the same enzymes (FIG. 3).

Example 4: Improved Monoterpene Production Using an Optimized Buffered Synthetic Minimal Media A synthetic minimal defined media was used in order to assess production in an industrially relevant media. This synthetic minimal defined media was composed of the following: 5 g/L (NH$_4$)$_2$SO$_4$; 3 g/L KH$_2$PO$_4$; 1 g/L MgSO$_4$*7H$_2$O; 0.0064 g/L D-biotin; 0.03 g/L nicotinic acid; 0.1 g/L thiamin HCL; 0.04 g/L D-panthothenic acid; 0.08 g/L myo-inositol; 0.02 g/L pyridoxine; 0.067 g/L tritriplex III; 0.067 g/L (NH$_4$)$_2$Fe(SO$_4$)$_2$.6H$_2$O; 0.0055 g/L CuSO$_4$; 0.02 g/L ZnSO$_4$; 0.02 g/L MnSO$_4$; 0.00125 g/L NiSO$_4$; 0.00125 g/L CoCL$_2$; 0.00125 g/L boric acid; 0.00125 g/L KI and 0.00115 Na$_2$MoO$_4$. The pH is hereby buffered with MES at a starting value of 6.3.

Strains PERLim05, PERGer02, PERPin02 and PERLin01 were used to determine monoterpene production levels in this medium. Additionally, a strain named PERMyr01, producing beta-myrcene, was constructed by introducing the beta-myrcene synthase ObMyrS together with the GPP synthase ERG20N127 and the rest of the MVA pathway targeted to the peroxisome by fusion with the C-terminal tri-peptide SKL (SEQ ID NO: 26). All strain were cultivated in shake flask for 72h at 30 degrees with 10% isopropyl myristate overlay. The synthetic minimal defined medium described previously was used and supplemented with 4% galactose for growth and gene inductions.

Strain PERLim05 produces 770 mg of limonene/L of culture, strain PERGer02 produces 1681 mg of geraniol/L of culture, strain PERPin02 produces 250 mg of alpha-pinene/L of culture, strain PERLin01 produces 547 mg of linalool/L of culture and strain PERMyr01 produces 251 mg of myrcene/L of culture. This represents a 5.4-fold, 5.2-fold, 5.1-fold and 2.9-fold improvement for strains PERLim05, PERGer02, PERPin02 and PERLin01 respectively, compared to the same strains cultivated in the un-buffered complete media used in example 3.

Example 5: High Levels of (+)-Limonene and Geraniol Production by a Combined Strategy of Genomic Integration and Plasmid-Based Expression of the MVA Pathway Genes Together with a GPPS and LimS or GES A single copy of each gene of the MVA pathway targeted to the peroxisome was integrated into the genome of strain EGY48 together with ERG20p$^{N127W}$ and C/LimS/tObGES giving strain PERLim06 and strain PERGer01. Furthermore, an additional copy of each gene of the MVA pathway, Erg20p$^{N127W}$ and C/LimS or tObGES were introduced on plasmids in strains PERLim06 and strain PERGer01 giving strains PERLim07 and PERGer02, respectively.

In order to determine the maximum limonene and geraniol titer achievable by compartmentalizing the pathway into the peroxisome, semi-continuous fed-batch experiment were carried out with strains PERLim07 and PERGer02. The cultures were fed every 48 h with 40 g/L galactose and 20 g/L raffinose and the pH was adjusted to 4.5. The IPM layer was also harvested every 48h to measure monoterpenes production.

Fed batch flask culture with strains PERLim07 and PERGer02 resulted on a continuous accumulation of limonene and geraniol that was proportional, to a great extent, to the amount of biomass formed. After 700 h, titers of 2575 mg of limonene/L of culture (FIG. 4A) and 5516 mg of geraniol/L of culture (FIG. 4B) were determined.

Example 6: Peroxisomal Localization of a Fusion Protein Comprising of a GPP Synthase Domain and a Terpene Synthase Domain Increases Terpenes Production The possibility of using a single polypeptide having both a GPP synthase and a terpene synthase activity is investigated in this example of the present invention. Such a bifunctional enzyme could be already found in nature or synthetically created. For exemplification purpose, we created such a polypeptide by fusing a GPP synthase domain and a terpene synthase domain together and targeted it to the peroxisome.

Figure 5:
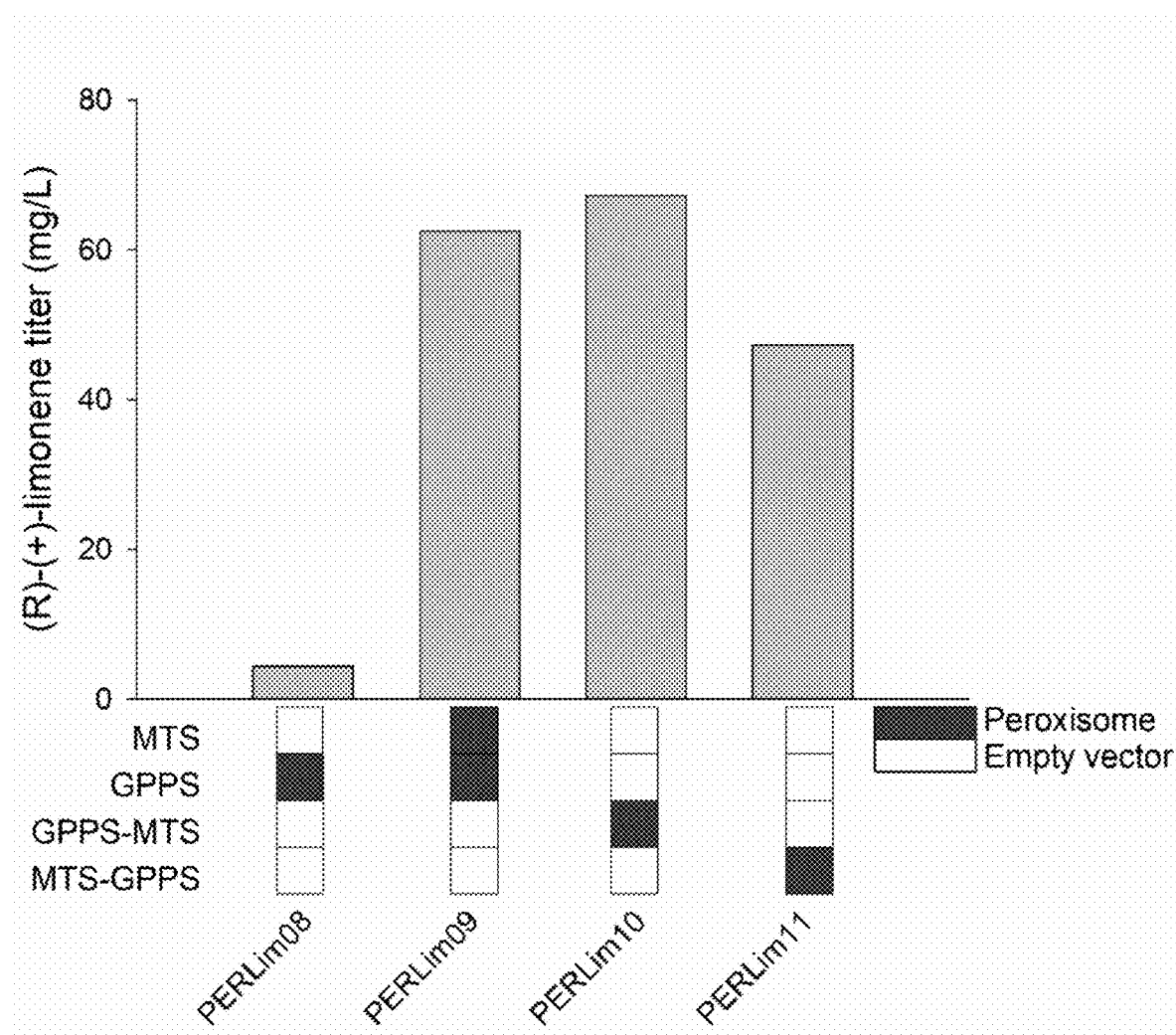
FIG. 5 shows a chart disclosing the effect of localizing a bi-functional GPP synthase/terpene synthase enzyme (GPP synthase—terpene synthase fusion) to the peroxisome on terpene production. For further details, see example 5.

To do so, the GPP synthase Erg20p$^{N127W}$ was fused to the terpene synthase C/LimS by a linker polypeptide comprised of five glycine-serine repeats (5×GS). The GPP synthase domain can be at the N-terminal end of the protein and the terpene synthase domain at the C-terminal end of the protein. Alternatively, the terpene synthase domain can be at the N-terminal end of the protein and the GPP synthase domaine at the C-terminal end of the protein. In this example, both these configurations were tested. Construction of those two synthetic enzymes gave two new polypeptides described in SEQ ID NO 15 and SEQ ID NO 16. Both sequences were subsequently introduced into an expression vector for yeast to give plasmids pPER15 and pPER16 and the strain PERLim06 was transformed with either one of the two plasmids to give PERLim10 and PERLim11. After culturing PERLim10 and PERlim11 for 72 h at 30° C. with an IPM overlay, limonene production was measured and compared to the one of strains PERLim08 and PERlim09. As seen in FIG. 5, limonene production obtained by peroxisomally targeting one or the other bifuctional GPP-terpene synthase fusion (PERLim10 and PERLim11) is similar or better compared to the production observed when peroxisomally targeting a GPP synthase and a terpene synthase as separate enzyme (PERLim09). Furthermore, a 16-fold and an 11-fold improvement in limonene production are observed when the bifuctional GPP-terpene synthase is targeted to the peroxisome compared with targeting only the GPP synthase activity to the peroxisome (PERLim08).

Example 7A: Efficient Production of Trans-Isopiperitenol, Precursor of Menthol

Figure 6:
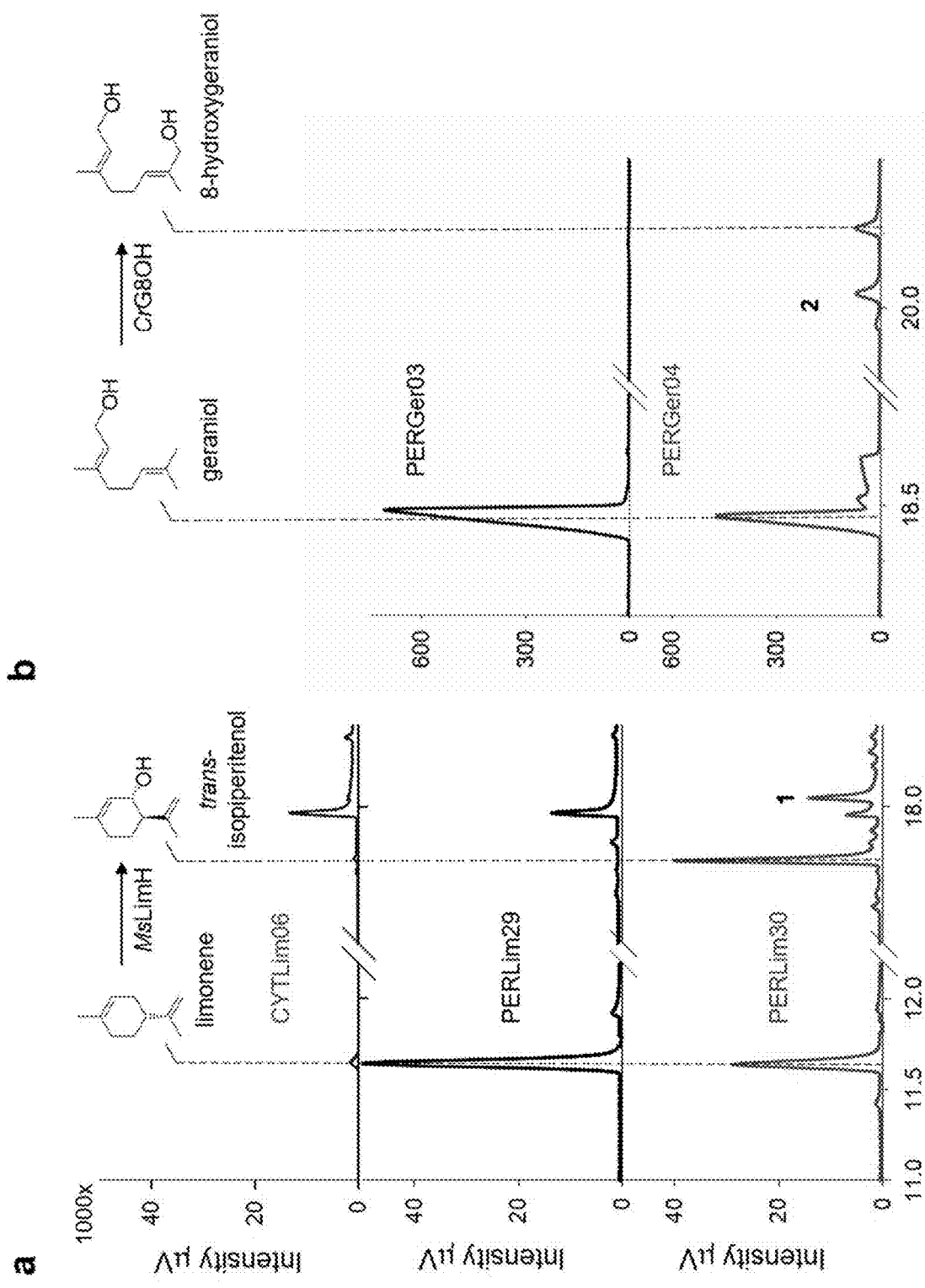
FIG. 6 shows a graph disclosing the production of trans-isopiperitenol and 8-hydroxygeraniol.

We further evaluated the contribution of the present invention in the production of trans-isopiperitenol, which is the precursor of the high-value compound menthol. We introduced the limonene-3-hydroxylase from *Mentha spicata* (MsLim3H; Q6IV13.1) into strain PERLim27, together with the cytochrome P450 reductase (tcCPR/POR) from *Taxus cuspidata* to give strain PERLim30 or an empty vector (pESC-Leu) to give PERLim29. As a comparison we introduced the limonene-3-hydroxylase from *Mentha spicata* (MsLim3H; Q6IV13.1) into strain CYTLim04, together with the cytochrome P450 reductase (tcCPR/POR) from *Taxus cuspidata* to give strain CYTLim06. After 72h of growth in complete minimal media, production of trans-isopiperitenol was evaluated by GC-FID of the culture extracts. As shown in FIG. 6A, both (−)-limonene and trans-isopiperitenol could be extracted from the strain PERLim30, while only limonene was detected in strain PERLim29 lacking the limonene-3-hydroxylase MsLim3H and the cytochrome P450 reductase tcCPR (FIG. 6A). Reduction of the (−)-limonene recovered from the PERLim30 culture compared to PERLim29 is in accordance to a 37% conversion into trans-isopiperitenol (19.24 mg/L) (FIG. 6A). However when limonene production was done in the cytosol in strain CYTLim06, only 0.28 mg/L trans-isopiperitenol was obtained, corresponding to a limonene conversion of only 14%. These results demonstrate that increased limonene production in the peroxisome allow for a significant amount of it being channeled through the endoplasmic reticulum (ER), where it can be hydroxylated by MsLim3H.

Example 7B: Efficient Production of 8-Hydroxygeraniol, Precursor of Iridoids and Monoterpene Indole Alkaloids We further evaluated the contribution of the present invention in the production of 8-hydroxygeraniol, which is the precursor of large groups of high-value compounds, including the iridoids and the monoterpene indole alkaloids. We introduced the geraniol 8-hydroxylase from *Catharanthous roseus* (CrG8OH; CYP76B6) into strain PERGer02, together with the cytochrome P450 reductase (C/CPR/POR) from the same species to give strain PERGer04 or an empty vector (pESC-Leu) to give PERGer03. After 72h of growth in complete minimal media, production of 8-hydroxy-geraniol was evaluated by GC-FID of the culture extracts. As shown in FIG. 6B, both geraniol and 8-hydroxygeraniol could be extracted from the strain PERGer04, while only geraniol was detected in strain PERGer03 lacking the geraniol 8-hydroxylase CrG8OH and the cytochrome P450 reductase CrCPR (FIG. 6B). Reduction of the geraniol recovered from the PERGer04 culture compared to PERGer03 is in accordance to a partial conversion into 8-hydroxy-geraniol (FIG. 6B). These results demonstrate that increased geraniol production in the peroxisome allow for a significant amount of it being channeled through the endoplasmic reticulum (ER), where it can be hydroxylated by CrG8OH.

Example 8: Efficient Production of Cannabinoids by Targeting a GPP Synthase and a Geranyldiphosphate:Olivetolate Geranyltransferase to the Peroxisome The invention was evaluated for its applicability in the production of another group of GPP-derived high-value compounds, beyond monoterpenoids and monoterpene indole alkaloids, that of cannabinoids. In the cannabinoid biosynthetic pathway, olivetolic acid (OA) is prenylated by GPP to form cannabigerolic acid (CBGA) via the action of a dedicated geranyltransferase. CBGA represents a key step in the pathway because it is the last common precursor to various types of cannabinoids, such as tetrahydrocannabinolic acid (THCA) and cannabidiolic acid (CBDA). In yeast, this prenylation step represents a major bottleneck in the process of producing high titers of cannabinoids because of the limited pool of GPP in the cytosol.

In this example, the GPP synthase Erg20p$^{N127W}$ and the geranyldiphosphate:olivetolate geranyltransferase CsPT4, from *C. sativa*, were targeted to the yeast peroxisome, using the C-terminal targeting signal SKL, for CBGA production. Both genes were introduced into the strain PERMva01 under the control of the inducible promoters P$_{GAL1}$ and P$_{GAL10}$, to give strain PERCan01. After 72h of growth in complete minimal media under galactose-induced conditions and supplemented with various concentration of olivetolic acid (0.05 mM, 0.1 mM, 0.25 mM or 0.5 mM), production of CBGA was analyzed by LC-MS. Cells were disrupted and CBGA extracted from the cell fraction (pellet) using ethyl acetate/formic acid (0.05% v/v) in a 1:1 ratio and glass bead beating. The organic layer was separated by centrifugation and evaporated using a SpinVac. The remaining dry fraction was dissolved in methanol and filtered through a 0.22 µm pore size PVDF filter. Samples were diluted 10 times prior to LC-MS analysis.

Figure 7:
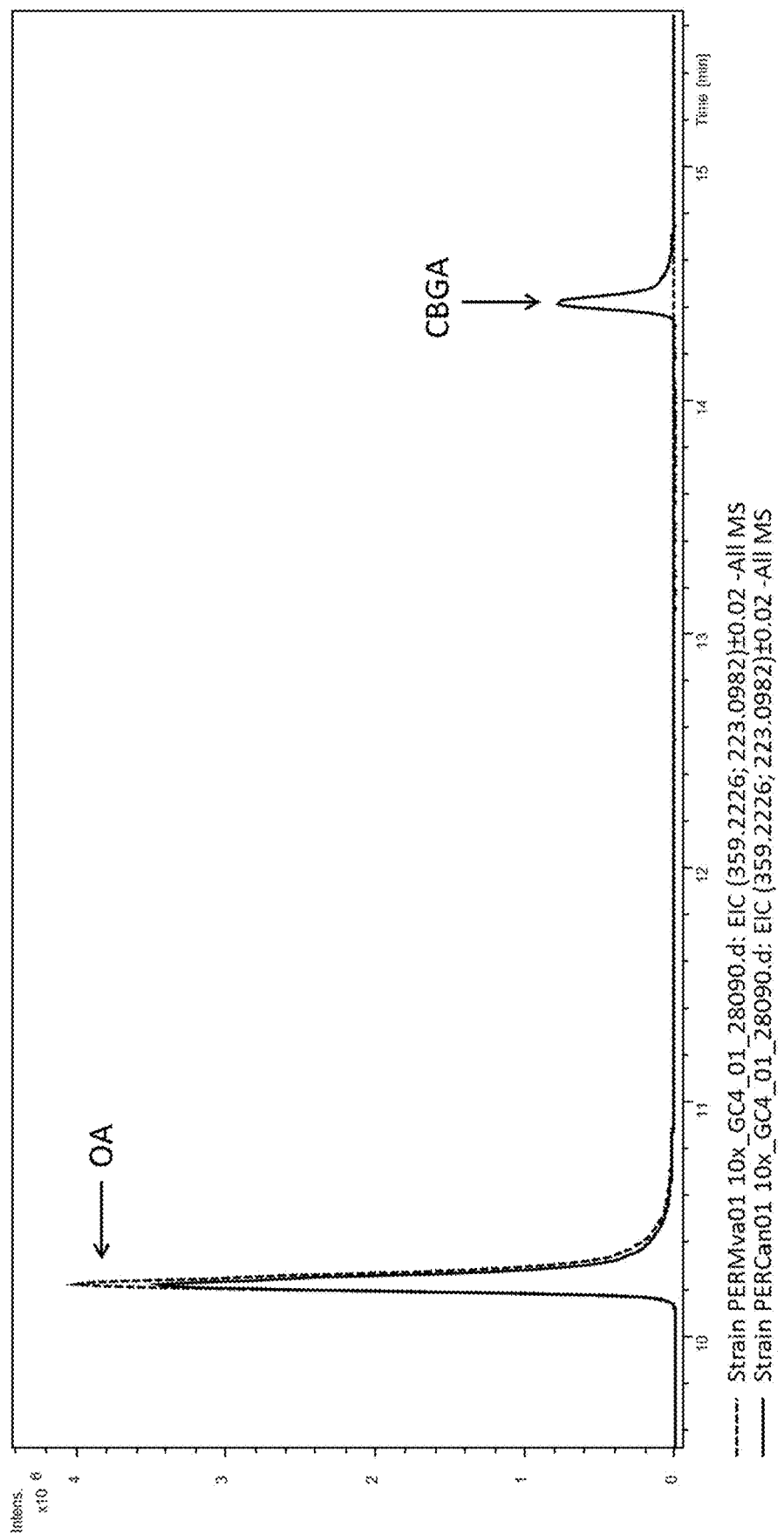
FIG. 7 shows a graph disclosing the production of cannabinoid precursors.

As shown in FIG. 7A, both OA and CBGA could be extracted from the strain PERCan01, while only OA was detected in strain PERMva01 lacking the GPP synthase ERG20p$^{N127W}$ and the geranyldiphosphate:olivetolate geranyltransferase CsPT4. Reduction of the OA recovered inside the cells in PERCan01 compared to PERMva01 is in accordance to a partial conversion into CBGA. These results demonstrate that 1) OA can be transported and/or diffuse into the peroxisome, 2) CsPT4 is active in the peroxisome and 3) the pool of GPP is sufficient in the peroxisome to allow efficient OA prenylation.

Additionally, an alternative N-terminal peroxisomal targeting signal was examined for CsPT4 (SEQ ID NO: 29). PTS2-CsPT4 was introduced in strain PERMva01 together with the GPP synthase Erg20p$^{N127W}$-SKL giving both enzymes peroxisomal localization. This new strain called PERCan02 was assessed as previously for OA consumption and CBGA production. For comparison, CsPT4 and Erg20p$^{N127W}$ were introduced in strain CYTMva01 to give strain CYTCan01 for cytosolic CBGA production. As shown in FIG. 7B, strain PERCan02 produced 82.3 mg/L CBGA, 19.5-fold more than strain CYTCan01 with only 4.2 mg/L CBGA.

REFERENCES

Ellerstrom M et al (1992): Cloning of a cDNA for rape chloroplast 3-isopropylmalate dehydrogenase by genetic complementation in yeast. Plant Mol Biol, 18, 557-560.

Ignea C. et al (2011): Improving yeast strains using recyclable integration cassettes for the production of plant terpoenoids. Microb. Cell. Fact, 10, 4 (3)

Ignea C. et al (2014): Engineering monoterpene production in yeast using a synthetic dominant negative geranyl diphosphate synthase. ACS Synth. Biol. 3, 298-306.(53)

Ignea C. et al (2018): Synthesis of 11-carbon terpenoids in yeast using protein and metabolic engineering. Nature Chemical Biology 14, 1090-1098.

Nour-Eldin H. H et al (2010): USER cloning and USER fusion: The Ideal cloning techniques for small and big laboratories. In Fett-Neto A (eds.) Plant Secondary Metabolism Engineering. Methods in Molecular biology (Methods and Protocols), vil 643. Humana Press, Totowa, N.J.

Orlova I et al. (2009): The Small Subunit of Snapdragon Geranyl Diphosphate Synthase Modifies the Chain Length Specificity of Tobacco Geranylgeranyl Diphosphate Synthase in Planta. Plant Cell; 21, 4002-4017.

Philips M. A. et al (2003): cDNA isolation, functional expression, and characterization of (+)-α-pinene synthase and (−)-α-pinene synthase form lobolly pine (*Pinus taeda*): Stereocontrol in pinene biosynthesis. Arch. Biochem. Biophys. 411, 267-276. (57)

Thomas B. J. and R. Rothstein (1989): Elevated recombination rates in transcriptionally active DNA. Cell 56, 619-630 (4)

The invention claimed is:

1. A recombinant host cell comprising,
a peroxisomally-localized enzyme catalyzing the formation of a branch point compound, which branch point compound can be converted in a prioritized pathway and in a non-prioritized pathway, wherein the enzyme catalyzing the formation of a branch point compound is a GPP synthase; and
a peroxisomally-localized enzyme catalyzing the first step of the non-prioritized pathway, wherein the enzyme catalyzing the first step of the non-prioritized pathway is selected among a terpene synthase, a prenyltransferase, or another isoprenoid or non-isoprenoid prenyltransferase; and
wherein the cell is capable of producing monoterpenoids, cannabinoids, iridoids, monoterpene indole alkaloids, and/or prenylated aromatic compounds at a level that is at least two-fold higher compared to a cell having the enzyme catalyzing the formation of the branch point compound and the enzyme catalyzing the first step of the non-prioritized pathway localized in the cytosol.

2. The recombinant host cell of claim 1, wherein the host cell is a yeast cell.

3. The recombinant host cell of claim 2, wherein the host cell is a yeast cell belonging to one of the genera: Saccharomyces, Pichia, Candida, Ogatea, or *Yarrowia*.

4. The recombinant host cell of claim 3, wherein the yeast is selected among the species: Saccharomyces cerevisiae, Pichia pastoris, Candida albicans, Candida boidinii, Ogatea polymorpha, or *Yarrowia lipolytica*.

5. The recombinant host cell of claim 1, wherein peroxisomal localization is provided by inserting a peroxisomal localization signal in the genes encoding the respective enzymes.

6. The recombinant host cell of claim 1, wherein the second enzyme is (+)-limonene synthase, (−)-limonene synthase, alpha-pinene synthase, 1,8-cineole synthase, sabinene synthase, camphene synthase, or geraniol synthase, beta-pinene synthase, linalool synthase, myrcene synthase, bornyl diphosphate synthase, alpha-terpineol synthase, isoborneol synthase, tricyclene synthase, alpha-thujene synthase, alpha-fenchene synthase, delta-2-carene synthase, alpha-phellandrene synthase, 3-carene synthase, 1,4-cineole synthase, alpha-terpinene synthase, beta-phellandrene synthase, (Z)-beta-ocimene synthase, (E)-beta-ocimene synthase, gamma-terpinene synthase, terpinolene synthase, allo-ocimene synthase, cis-beta-terpineol synthase, cis-terpine-1-ol synthase, delta-terpineol synthase, borneol synthase, alpha-terpineol synthase, nerol synthase, 2-methylisoborneol synthase, 2-methylenebornene synthase, 2-methyl-2-bornene synthase, or beta-phellandrene synthase.

7. The recombinant host cell of claim 1, wherein the second enzyme is capable of accepting non-canonical isoprenoid substrates with 9, 11, or 12 carbon atoms.

8. The recombinant host cell of claim 1, wherein the second enzyme is selected among an aromatic prenyltransferase and geranyldiphosphate: olivetolate geranyltransferase.

9. The recombinant host cell of to claim 1, wherein the enzyme catalyzing the formation of the branch point compound, and the enzyme catalyzing the first step of the non-prioritized pathway are selected among:
(a) an enzyme capable ofable to synthesize DMAPP, and an enzyme with isoprene synthase activity;
(b) an enzyme capable ofable to synthesize DMAPP, and an enzyme with prenyltransferase activity similar to lavandulyl diphosphate synthase from *Lavandula* x *intermedia* or chrysanthemyl diphosphate synthase from *Tanacetum cinerariifolium*;
(c) an enzyme capable of synthesize DMAPP, and an enzyme with C-prenyltransferase activity similar to 7-DMATS or AcPT1 from *Artemisia capillaris*; or
(d) an enzyme capable of synthesize DMAPP, and an enzyme with O-prenyltransferase activity similar to AcaPT from *Antrodia camphorata*.

10. The recombinant host cell of claim 9, wherein:
(a) the enzyme capable of synthesize DMAPP is isopentenyl diphosphate isomerase (IDI);
(b) the enzyme with prenyltransferase activity is lavandulyl diphosphate synthase from *Lavandula* x *intermedia* or chrysanthemyl diphosphate synthase from *Tanacetum cinerariifolium*;
(c) the enzyme with C-prenyltransferase activity is 7-DMATS or AcPT1 from *Artemisia capillaris*; or
(d) the enzyme with O-prenyltransferase activity is AcaPT from *Antrodia camphorata*.

11. A method for producing a compound selected from the group consisting of: a monoterpenoid, a cannabinoid, a monoterpene indole alkaloid, and a prenylated aromatic compound, comprising the steps of:
a. providing a host cell according to claim 1;
b. fermenting the host cell in a substrate supporting growth of the host cell;
C. when required, providing the host cell with the substrate to be prenylated, and
d. recovering the compound from the fermentation broth.

12. The method of claim 11, wherein the substrate to be prenylated is selected from the group consisting of: olivetolic acid, olivetolic acid derivatives, and p-coumaric acid.

13. The method of claim 11, further comprising the step of:
e. converting the compound of step d. to more complex products within the yeast cells by the action of additional native or heterologously expressed enzymes.

14. The method of claim 11, wherein the compound is selected from the group consisting of: sabinene, alpha-pinene, beta-pinene, camphene, (+)-limonene, (−)-limonene, geraniol, linalool, myrcene, 1,8-cineole, borneol, bornyl diphosphate, alpha-terpineol, isoborneol, tricyclene, alpha-thujene, alpha-fenchene, delta-2-carene, alpha-phellandrene, 3-carene, 1,4-cineole, alpha-terpinene, beta-phellandrene, (Z)-beta-ocimene, (E)-beta-ocimene, gamma-terpinene, terpinen-4-ol, terpinolene, allo-ocimene, cis-beta-terpineol, cis-terpine-1-ol, delta-terpineol, alpha-terpineol, nerol, 2-methylisoborneol, 2-methylenebornene, 2-methyl-2-bornene, beta-phellandrene, 2-methyllimonene, 2-methylmyrcene, 2-methylgeraniol, 2-methyllinalool, cannabigerolic acid, cannabiberolic acid analogs, prenyl tryptophan, artepillin C, drupanin, osthrutin, geranyl-resveratrol, geranylated quercetin, geranyl-naringenin, geranyl-isoliqiritigenin, isobavachalcone, isoprene, lavandulol, chrysanthemol dimethylallyltryptophan, 4'-dimethylallyl-apigenin, 6-prenyl-apigenin, 4'-dimethylallyl-naringenin, 4'-dimethylallyl-kaempferol, 4'-dimethylallyl-daidzein, 7-dimethylallyl-daidzein, 7,4'-di-(dimethylallyl)-daidzein, 4'-dimethylallyl-genistein, 7-dimethylallyl-genistein, 7,4'-di-(dimethylallyl)-genistein, 4-dimethylallyl-isoliquiritigenin, 4'-dimethylallyl-equol, 7-dimethylallyl-equol, 6-dimethylallyl-equol, 4'-dimethylallyl-daidzin, 7-dimethylallyl-umbelliferone, 8-dimethylallyl- curcumin, 8'-dimethylallyl-demethoxycurcumin, 8-dimethylallyl-demethoxycurcumin, 4'-dimethylallyl-resveratrol, and 5-dimethylallyl-diethylstilbestrol.

15. A recombinant yeast host cell comprising,
   a peroxisomally-localized enzyme catalyzing the formation of a branch point compound, which branch point compound can be converted in a prioritized pathway and in a non-prioritized pathway, wherein the enzyme catalyzing the formation of a branch point compound is a GPP synthase; and
   a peroxisomally-localized enzyme catalyzing the first step of the non-prioritized pathway, wherein the enzyme catalyzing the first step of the non-prioritized pathway is a terpene synthase selected from the group consisting of: geraniol synthase, linalool synthase, and myrcene synthase; and
   wherein the cell is capable of producing monoterpenoids, cannabinoids, iridoids, monoterpene indole alkaloids, and/or prenylated aromatic compounds at a level that is at least two-fold higher compared to a cell having the enzyme catalyzing the formation of the branch point compound and the enzyme catalyzing the first step of the non-prioritized pathway localized in the cytosol.

16. The recombinant yeast cell of claim 15, wherein the yeast cell is a *S. cerevisiae* cell, wherein a GPP synthase and a geraniol synthase are localized to the peroxisomes.

17. The recombinant yeast cell of claim 15, wherein the yeast cell is a *S. cerevisiae* cell, wherein a GPP synthase and an olivetolic acid prenyltransferase are localized to the peroxisomes.

18. The recombinant yeast cell of claim 15, wherein the yeast cell is selected from the group consisting of:
   (a) a *S. cerevisiae* cell, wherein a GPP synthase and an aromatic prenyltransferase AtaPT from *Aspergillus terreus* are localized to the peroxisomes;
   (b) a *S. cerevisiae* cell, wherein an isopentenyl diphosphate isomerase (IDI), and a terpene synthase catalyzing the synthesis of isoprene are localized to the peroxisomes;
   (c) a *S. cerevisiae* cell, wherein an isopentenyl diphosphate isomerase (IDI) and a lavandulyl diphosphate synthase from *Lavandula* x *intermedia* are localized to the peroxisomes;
   (d) a *S. cerevisiae* cell, wherein an isopentenyl diphosphate isomerase (IDI) and a chrysanthemyl diphosphate synthase from *Tanacetum cinerariifolium* are localized to the peroxisomes;
   (e) a *S. cerevisiae* cell, wherein an isopentenyl diphosphate isomerase (IDI) and a 7-dimethylallyltryptophan synthase from *Aspergillus fumigatus* (7-DMATS) are localized to the peroxisomes;
   (f) a *S. cerevisiae* cell, wherein an isopentenyl diphosphate isomerase (IDI) and a phenylpropane-specific prenyltransferase AcPT1 from *Artemisia capillaris* are localized to the peroxisomes; and
   (g) a *S. cerevisiae* cell, wherein an isopentenyl diphosphate isomerase (IDI) and the O-prenyltrasferase AcaPT from *Antrodia camphorata* are localized to the peroxisomes.

19. The recombinant host cell of claim 1, wherein the first enzyme harbors a mutation in an active site, and wherein the mutation prevents the conversion of GPP into FPP (farnesyl diphosphate) or GGPP (geranyl geranyl diphosphate).

20. The recombinant host cell of claim 1, wherein the host cell is the *S. cerevisiae* cell.

* * * * *

SEQUENCE LISTING

<160> NUMBER OF SEQ ID NOS: 29

<210> SEQ ID NO 1
<211> LENGTH: 352
<212> TYPE: PRT
<213> ORGANISM: Saccharmyces cerevisiae

<400> SEQUENCE: 1

Met Ala Ser Glu Lys Glu Ile Arg Arg Glu Arg Phe Leu Asn Val Phe
1               5                   10                  15

Pro Lys Leu Val Glu Glu Leu Asn Ala Ser Leu Leu Ala Tyr Gly Met

```
                    20                  25                  30

Pro Lys Glu Ala Cys Asp Trp Tyr Ala His Ser Leu Asn Tyr Asn Thr
                35                  40                  45

Pro Gly Gly Lys Leu Asn Arg Gly Leu Ser Val Val Asp Thr Tyr Ala
            50                  55                  60

Ile Leu Ser Asn Lys Thr Val Glu Gln Leu Gly Gln Glu Glu Tyr Glu
65                  70                  75                  80

Lys Val Ala Ile Leu Gly Trp Cys Ile Glu Leu Leu Gln Ala Tyr Phe
                85                  90                  95

Leu Val Ala Asp Asp Met Met Asp Lys Ser Ile Thr Arg Arg Gly Gln
                100                 105                 110

Pro Cys Trp Tyr Lys Val Pro Glu Val Gly Glu Ile Ala Ile Trp Asp
            115                 120                 125

Ala Phe Met Leu Glu Ala Ala Ile Tyr Lys Leu Lys Ser His Phe
                130                 135                 140

Arg Asn Glu Lys Tyr Tyr Ile Asp Ile Thr Glu Leu Phe His Glu Val
145                 150                 155                 160

Thr Phe Gln Thr Glu Leu Gly Gln Leu Met Asp Leu Ile Thr Ala Pro
                165                 170                 175

Glu Asp Lys Val Asp Leu Ser Lys Phe Ser Leu Lys Lys His Ser Phe
                180                 185                 190

Ile Val Thr Phe Lys Thr Ala Tyr Tyr Ser Phe Tyr Leu Pro Val Ala
                195                 200                 205

Leu Ala Met Tyr Val Ala Gly Ile Thr Asp Glu Lys Asp Leu Lys Gln
                210                 215                 220

Ala Arg Asp Val Leu Ile Pro Leu Gly Glu Tyr Phe Gln Ile Gln Asp
225                 230                 235                 240

Asp Tyr Leu Asp Cys Phe Gly Thr Pro Glu Gln Ile Gly Lys Ile Gly
                245                 250                 255

Thr Asp Ile Gln Asp Asn Lys Cys Ser Trp Val Ile Asn Lys Ala Leu
                260                 265                 270

Glu Leu Ala Ser Ala Glu Gln Arg Lys Thr Leu Asp Glu Asn Tyr Gly
                275                 280                 285

Lys Lys Asp Ser Val Ala Glu Ala Lys Cys Lys Lys Ile Phe Asn Asp
            290                 295                 300

Leu Lys Ile Glu Gln Leu Tyr His Glu Tyr Glu Glu Ser Ile Ala Lys
305                 310                 315                 320

Asp Leu Lys Ala Lys Ile Ser Gln Val Asp Glu Ser Arg Gly Phe Lys
                325                 330                 335

Ala Asp Val Leu Thr Ala Phe Leu Asn Lys Val Tyr Lys Arg Ser Lys
                340                 345                 350

<210> SEQ ID NO 2
<211> LENGTH: 353
<212> TYPE: PRT
<213> ORGANISM: Saccharmoyces cerevisiae

<400> SEQUENCE: 2

Met Ala Ser Glu Lys Glu Ile Arg Arg Glu Arg Phe Leu Asn Val Phe
1               5                   10                  15

Pro Lys Leu Val Glu Glu Leu Asn Ala Ser Leu Leu Ala Tyr Gly Met
                20                  25                  30

Pro Lys Glu Ala Cys Asp Trp Tyr Ala His Ser Leu Asn Tyr Asn Thr
                35                  40                  45
```

-continued

```
Pro Gly Gly Lys Leu Asn Arg Gly Leu Ser Val Val Asp Thr Tyr Ala
    50                  55                  60

Ile Leu Ser Asn Lys Thr Val Glu Gln Leu Gly Gln Glu Glu Tyr Glu
 65                  70                  75                  80

Lys Val Ala Ile Leu Gly Trp Cys Ile Glu Leu Leu Gln Ala Tyr Phe
                 85                  90                  95

Leu Val Ala Asp Asp Met Met Asp Lys Ser Ile Thr Arg Arg Gly Gln
                100                 105                 110

Pro Cys Trp Tyr Lys Val Pro Glu Val Gly Ile Ala Ile Trp Asp
            115                 120                 125

Ala Phe Met Leu Glu Ala Ala Ile Tyr Lys Leu Leu Lys Ser His Phe
        130                 135                 140

Arg Asn Glu Lys Tyr Tyr Ile Asp Ile Thr Glu Leu Phe His Glu Val
145                 150                 155                 160

Thr Phe Gln Thr Glu Leu Gly Gln Leu Met Asp Leu Ile Thr Ala Pro
                    165                 170                 175

Glu Asp Lys Val Asp Leu Ser Lys Phe Ser Leu Lys Lys His Ser Phe
                180                 185                 190

Ile Val Thr Phe Lys Thr Ala Tyr Tyr Ser Phe Tyr Leu Pro Val Ala
            195                 200                 205

Leu Ala Met Tyr Val Ala Gly Ile Thr Asp Glu Lys Asp Leu Lys Gln
    210                 215                 220

Ala Arg Asp Val Leu Ile Pro Leu Gly Glu Tyr Phe Gln Ile Gln Asp
225                 230                 235                 240

Asp Tyr Leu Asp Cys Phe Gly Thr Pro Glu Gln Ile Gly Lys Ile Gly
                    245                 250                 255

Thr Asp Ile Gln Asp Asn Lys Cys Ser Trp Val Ile Asn Lys Ala Leu
                260                 265                 270

Glu Leu Ala Ser Ala Glu Gln Arg Lys Thr Leu Asp Glu Asn Tyr Gly
            275                 280                 285

Lys Lys Asp Ser Val Ala Glu Ala Lys Cys Lys Lys Ile Phe Asn Asp
    290                 295                 300

Leu Lys Ile Glu Gln Leu Tyr His Glu Tyr Glu Glu Ser Ile Ala Lys
305                 310                 315                 320

Asp Leu Lys Ala Lys Ile Ser Gln Val Asp Glu Ser Arg Gly Phe Lys
                    325                 330                 335

Ala Asp Val Leu Thr Ala Phe Leu Asn Lys Val Tyr Lys Arg Ser Lys
                340                 345                 350

Leu

<210> SEQ ID NO 3
<211> LENGTH: 555
<212> TYPE: PRT
<213> ORGANISM: Citrus lemon

<400> SEQUENCE: 3

Met Arg Arg Ser Ala Asn Tyr Gln Pro Ser Ile Trp Asp His Asp Phe
 1               5                  10                  15

Leu Gln Ser Leu Asn Ser Asn Tyr Thr Asp Glu Ala Tyr Lys Arg Arg
                20                  25                  30

Ala Glu Glu Leu Arg Gly Lys Val Lys Ile Ala Ile Lys Asp Val Ile
            35                  40                  45

Glu Pro Leu Asp Gln Leu Glu Leu Ile Asp Asn Leu Gln Arg Leu Gly
    50                  55                  60
```

```
Leu Ala His Arg Phe Glu Thr Glu Ile Arg Asn Ile Leu Asn Asn Ile
 65                  70                  75                  80

Tyr Asn Asn Asn Lys Asp Tyr Asn Trp Arg Lys Glu Asn Leu Tyr Ala
             85                  90                  95

Thr Ser Leu Glu Phe Arg Leu Leu Arg Gln His Gly Tyr Pro Val Ser
            100                 105                 110

Gln Glu Val Phe Asn Gly Phe Lys Asp Asp Gln Gly Gly Phe Ile Cys
        115                 120                 125

Asp Asp Phe Lys Gly Ile Leu Ser Leu His Glu Ala Ser Tyr Tyr Ser
130                 135                 140

Leu Glu Gly Glu Ser Ile Met Glu Glu Ala Trp Gln Phe Thr Ser Lys
145                 150                 155                 160

His Leu Lys Glu Val Met Ile Ser Lys Asn Met Glu Glu Asp Val Phe
                165                 170                 175

Val Ala Glu Gln Ala Lys Arg Ala Leu Glu Leu Pro Leu His Trp Lys
            180                 185                 190

Val Pro Met Leu Glu Ala Arg Trp Phe Ile His Ile Tyr Glu Arg Arg
        195                 200                 205

Glu Asp Lys Asn His Leu Leu Leu Glu Leu Ala Lys Met Glu Phe Asn
210                 215                 220

Thr Leu Gln Ala Ile Tyr Gln Glu Glu Leu Lys Glu Ile Ser Gly Trp
225                 230                 235                 240

Trp Lys Asp Thr Gly Leu Gly Glu Lys Leu Ser Phe Ala Arg Asn Arg
                245                 250                 255

Leu Val Ala Ser Phe Leu Trp Ser Met Gly Ile Ala Phe Glu Pro Gln
            260                 265                 270

Phe Ala Tyr Cys Arg Arg Val Leu Thr Ile Ser Ile Ala Leu Ile Thr
        275                 280                 285

Val Ile Asp Asp Ile Tyr Asp Val Tyr Gly Thr Leu Asp Glu Leu Glu
290                 295                 300

Ile Phe Thr Asp Ala Val Glu Arg Trp Asp Ile Asn Tyr Ala Leu Lys
305                 310                 315                 320

His Leu Pro Gly Tyr Met Lys Met Cys Phe Leu Ala Leu Tyr Asn Phe
                325                 330                 335

Val Asn Glu Phe Ala Tyr Tyr Val Leu Lys Gln Gln Asp Phe Asp Leu
            340                 345                 350

Leu Leu Ser Ile Lys Asn Ala Trp Leu Gly Leu Ile Gln Ala Tyr Leu
        355                 360                 365

Val Glu Ala Lys Trp Tyr His Ser Lys Tyr Thr Pro Lys Leu Glu Glu
370                 375                 380

Tyr Leu Glu Asn Gly Leu Val Ser Ile Thr Gly Pro Leu Ile Ile Thr
385                 390                 395                 400

Ile Ser Tyr Leu Ser Gly Thr Asn Pro Ile Ile Lys Lys Glu Leu Glu
                405                 410                 415

Phe Leu Glu Ser Asn Pro Asp Ile Val His Trp Ser Ser Lys Ile Phe
            420                 425                 430

Arg Leu Gln Asp Asp Leu Gly Thr Ser Ser Asp Glu Ile Gln Arg Gly
        435                 440                 445

Asp Val Pro Lys Ser Ile Gln Cys Tyr Met His Glu Thr Gly Ala Ser
450                 455                 460

Glu Glu Val Ala Arg Gln His Ile Lys Asp Met Met Arg Gln Met Trp
465                 470                 475                 480

Lys Lys Val Asn Ala Tyr Thr Ala Asp Lys Asp Ser Pro Leu Thr Gly
```

```
                        485                 490                 495
Thr Thr Thr Glu Phe Leu Leu Asn Leu Val Arg Met Ser His Phe Met
                500                 505                 510

Tyr Leu His Gly Asp Gly His Gly Val Gln Asn Gln Glu Thr Ile Asp
                515                 520                 525

Val Gly Phe Thr Leu Leu Phe Gln Pro Ile Pro Leu Glu Asp Lys His
            530                 535                 540

Met Ala Phe Thr Ala Ser Pro Gly Thr Lys Gly
545                 550                 555

<210> SEQ ID NO 4
<211> LENGTH: 558
<212> TYPE: PRT
<213> ORGANISM: Citrus lemon

<400> SEQUENCE: 4

Met Arg Arg Ser Ala Asn Tyr Gln Pro Ser Ile Trp Asp His Asp Phe
1               5                   10                  15

Leu Gln Ser Leu Asn Ser Asn Tyr Thr Asp Glu Ala Tyr Lys Arg Arg
                20                  25                  30

Ala Glu Glu Leu Arg Gly Lys Val Lys Ile Ala Ile Lys Asp Val Ile
            35                  40                  45

Glu Pro Leu Asp Gln Leu Glu Leu Ile Asp Asn Leu Gln Arg Leu Gly
    50                  55                  60

Leu Ala His Arg Phe Glu Thr Glu Ile Arg Asn Ile Leu Asn Asn Ile
65                  70                  75                  80

Tyr Asn Asn Asn Lys Asp Tyr Asn Trp Arg Lys Glu Asn Leu Tyr Ala
                85                  90                  95

Thr Ser Leu Glu Phe Arg Leu Leu Arg Gln His Gly Tyr Pro Val Ser
                100                 105                 110

Gln Glu Val Phe Asn Gly Phe Lys Asp Asp Gln Gly Gly Phe Ile Cys
            115                 120                 125

Asp Asp Phe Lys Gly Ile Leu Ser Leu His Glu Ala Ser Tyr Tyr Ser
    130                 135                 140

Leu Glu Gly Glu Ser Ile Met Glu Glu Ala Trp Gln Phe Thr Ser Lys
145                 150                 155                 160

His Leu Lys Glu Val Met Ile Ser Lys Asn Met Glu Glu Asp Val Phe
                165                 170                 175

Val Ala Glu Gln Ala Lys Arg Ala Leu Glu Leu Pro Leu His Trp Lys
            180                 185                 190

Val Pro Met Leu Glu Ala Arg Trp Phe Ile His Ile Tyr Glu Arg Arg
    195                 200                 205

Glu Asp Lys Asn His Leu Leu Leu Glu Leu Ala Lys Met Glu Phe Asn
    210                 215                 220

Thr Leu Gln Ala Ile Tyr Gln Glu Glu Leu Lys Glu Ile Ser Gly Trp
225                 230                 235                 240

Trp Lys Asp Thr Gly Leu Gly Glu Lys Leu Ser Phe Ala Arg Asn Arg
                245                 250                 255

Leu Val Ala Ser Phe Leu Trp Ser Met Gly Ile Ala Phe Glu Pro Gln
            260                 265                 270

Phe Ala Tyr Cys Arg Arg Val Leu Thr Ile Ser Ile Ala Leu Ile Thr
    275                 280                 285

Val Ile Asp Asp Ile Tyr Asp Val Tyr Gly Thr Leu Asp Glu Leu Glu
    290                 295                 300
```

-continued

Ile Phe Thr Asp Ala Val Glu Arg Trp Asp Ile Asn Tyr Ala Leu Lys
305                 310                 315                 320

His Leu Pro Gly Tyr Met Lys Met Cys Phe Leu Ala Leu Tyr Asn Phe
            325                 330                 335

Val Asn Glu Phe Ala Tyr Tyr Val Leu Lys Gln Gln Asp Phe Asp Leu
        340                 345                 350

Leu Leu Ser Ile Lys Asn Ala Trp Leu Gly Leu Ile Gln Ala Tyr Leu
    355                 360                 365

Val Glu Ala Lys Trp Tyr His Ser Lys Tyr Thr Pro Lys Leu Glu Glu
370                 375                 380

Tyr Leu Glu Asn Gly Leu Val Ser Ile Thr Gly Pro Leu Ile Ile Thr
385                 390                 395                 400

Ile Ser Tyr Leu Ser Gly Thr Asn Pro Ile Ile Lys Lys Glu Leu Glu
                405                 410                 415

Phe Leu Glu Ser Asn Pro Asp Ile Val His Trp Ser Ser Lys Ile Phe
            420                 425                 430

Arg Leu Gln Asp Asp Leu Gly Thr Ser Ser Asp Glu Ile Gln Arg Gly
        435                 440                 445

Asp Val Pro Lys Ser Ile Gln Cys Tyr Met His Glu Thr Gly Ala Ser
    450                 455                 460

Glu Glu Val Ala Arg Gln His Ile Lys Asp Met Met Arg Gln Met Trp
465                 470                 475                 480

Lys Lys Val Asn Ala Tyr Thr Ala Asp Lys Asp Ser Pro Leu Thr Gly
                485                 490                 495

Thr Thr Thr Glu Phe Leu Leu Asn Leu Val Arg Met Ser His Phe Met
            500                 505                 510

Tyr Leu His Gly Asp Gly His Gly Val Gln Asn Gln Glu Thr Ile Asp
        515                 520                 525

Val Gly Phe Thr Leu Leu Phe Gln Pro Ile Pro Leu Glu Asp Lys His
    530                 535                 540

Met Ala Phe Thr Ala Ser Pro Gly Thr Lys Gly Ser Lys Leu
545                 550                 555

<210> SEQ ID NO 5
<211> LENGTH: 582
<212> TYPE: PRT
<213> ORGANISM: Solanum elaeagnifolium

<400> SEQUENCE: 5

Met Cys Ser Gln His Ser Thr Lys Pro Phe Ser His Ser Pro Asn Ile
1               5                   10                  15

Ser Thr Asn Leu Ile Leu Ser Ser Asp Gly Ser Asn Pro Thr Arg Arg
            20                  25                  30

Ser Gly Asn Tyr Asp Pro Thr Lys Trp Asp Tyr Glu Tyr Ile Gln Ser
        35                  40                  45

Ala Asn Asn His Tyr Thr Gly Glu Lys Tyr Met Lys Arg Phe Asn Glu
    50                  55                  60

Leu Lys Ala Lys Ile Lys Lys Glu Leu Met Met Val His Glu Glu Ser
65                  70                  75                  80

Gln Glu Leu Asp Lys Leu Glu Leu Ile Asp Asn Leu Glu Arg Leu Gly
                85                  90                  95

Val Ser Tyr His Phe Lys Asp Glu Ile Met Gln Ile Leu Arg Ser Ile
            100                 105                 110

Asn Asp Gln Ser Asn Ile Ala Ala Thr Ser Ala Asp Ser Leu Tyr Tyr
        115                 120                 125

```
Thr Ala Leu Lys Phe Arg Ile Leu Arg Gln His Gly Phe Tyr Ile Ser
    130                 135                 140

Gln Asp Ile Leu Asn Asp Phe Lys Asp Glu Lys Gly Asn Phe Lys Gln
145                 150                 155                 160

Ser Leu Cys Glu Asp Ile Glu Gly Leu Gln Leu Tyr Glu Ala Ser
            165                 170                 175

Phe Leu Ser Thr Asp Ser Glu Thr Ser Ser Leu Leu Glu Ser Ala Asn
            180                 185                 190

Thr Phe Ala Thr Ser Arg Leu Arg Lys Tyr Leu Asp Asn Leu Asn Gly
        195                 200                 205

Asp Val Asn Glu Asn Trp Arg Val Glu Leu Val Arg His Ala Leu Glu
    210                 215                 220

Leu Pro Ser His Cys Met Leu Leu Arg Val Glu Thr Arg Trp Tyr Ile
225                 230                 235                 240

Asn Met Tyr Glu Lys Ile Pro Asn Ala Asp Pro Leu Leu Glu Phe
            245                 250                 255

Ala Lys Leu Asp Phe Asn Ile Val Gln Ala Thr His Gln Gln Glu Leu
            260                 265                 270

Arg Asn Leu Ser Arg Trp Trp Lys Glu Ser Trp Leu Ala Glu Lys Leu
        275                 280                 285

Ser Phe Ser Arg Asp Arg Ile Val Glu Ser Phe Leu Trp Ile Ala Gly
    290                 295                 300

Met Met Phe Glu Pro Gln Arg Asn Glu Leu Ser Arg Thr Leu Leu Thr
305                 310                 315                 320

Lys Val Thr Ala Ile Ala Thr Ile Ile Asp Asp Ile Tyr Asp Val Tyr
                325                 330                 335

Gly Thr Leu Asp Glu Leu Glu Ile Phe Thr Gln Ala Val Glu Arg Met
            340                 345                 350

Glu Val Lys Ala Met Asp Glu Leu Pro Asp Tyr Met Lys Val Cys Tyr
        355                 360                 365

Leu Thr Leu Ile Asn Asn Thr Asn Glu Val Ala Tyr Glu Val Leu Lys
370                 375                 380

Glu Gln Gly Ile Asn Val Thr Pro Tyr Leu Thr Lys Ala Trp Thr Asp
385                 390                 395                 400

Leu Cys Lys Ala Tyr Leu Gln Glu Ala Arg Trp Tyr Tyr Ser Gly Tyr
            405                 410                 415

Thr Pro Ser Met Glu Glu Tyr Met Glu Asn Ala Trp Val Ser Val Gly
            420                 425                 430

Ser Pro Val Met Val Val Asn Ala Phe Phe Leu Val Thr Asn Pro Ile
        435                 440                 445

Thr Lys Glu Ala Leu Glu His Leu Phe Leu Asn Lys Tyr Thr Glu Ile
    450                 455                 460

Ile Arg Trp Ser Ala Ala Ile Ile Arg Leu Thr Asp Asp Leu Ala Thr
465                 470                 475                 480

Ser Ser Asn Glu Met Glu Arg Gly Asp Val Ser Lys Ser Ile Gln Cys
            485                 490                 495

Tyr Met Lys Glu Lys Gly Ala Thr Glu Glu Ala Arg Lys His Ile
            500                 505                 510

Asn Phe Met Ile Arg Asp Ala Trp Lys Arg Ile Asn Thr Ala Gln Arg
        515                 520                 525

Asp Asn Pro Leu Phe Cys Glu Glu Phe Ile Ser Cys Gly Met Asn Ile
    530                 535                 540
```

```
Ala Arg Thr Gly Gln Thr Ile Tyr Gln His Gly Asp Gly Val Gly Ile
545                 550                 555                 560

Gln Asn Tyr Glu Ile Gln Asn Arg Ile Tyr Lys Leu Phe Phe Asp Pro
            565                 570                 575

Ile Ala Val Ser Ile Pro
            580

<210> SEQ ID NO 6
<211> LENGTH: 582
<212> TYPE: PRT
<213> ORGANISM: Solanum elaeagnifolium

<400> SEQUENCE: 6

Met Cys Ser Gln His Ser Thr Lys Pro Phe Ser His Ser Pro Asn Ile
1               5                   10                  15

Ser Thr Asn Leu Ile Leu Ser Ser Asp Gly Ser Asn Pro Thr Arg Arg
            20                  25                  30

Ser Gly Asn Tyr Asp Pro Thr Lys Trp Asp Tyr Glu Tyr Ile Gln Ser
        35                  40                  45

Ala Asn Asn His Tyr Thr Gly Glu Lys Tyr Met Lys Arg Phe Asn Glu
    50                  55                  60

Leu Lys Ala Lys Ile Lys Glu Leu Met Met Val His Glu Glu Ser
65                  70                  75                  80

Gln Glu Leu Asp Lys Leu Glu Leu Ile Asp Asn Leu Glu Arg Leu Gly
                85                  90                  95

Val Ser Tyr His Phe Lys Asp Glu Ile Met Gln Ile Leu Arg Ser Ile
            100                 105                 110

Asn Asp Gln Ser Asn Ile Ala Ala Thr Ser Ala Asp Ser Leu Tyr Tyr
        115                 120                 125

Thr Ala Leu Lys Phe Arg Ile Leu Arg Gln His Gly Phe Tyr Ile Ser
    130                 135                 140

Gln Asp Ile Leu Asn Asp Phe Lys Asp Glu Lys Gly Asn Phe Lys Gln
145                 150                 155                 160

Ser Leu Cys Glu Asp Ile Glu Gly Leu Leu Gln Leu Tyr Glu Ala Ser
                165                 170                 175

Phe Leu Ser Thr Asp Ser Glu Thr Ser Ser Leu Leu Glu Ser Ala Asn
            180                 185                 190

Thr Phe Ala Thr Ser Arg Leu Arg Lys Tyr Leu Asp Asn Leu Asn Gly
        195                 200                 205

Asp Val Asn Glu Asn Trp Arg Val Glu Leu Val Arg His Ala Leu Glu
    210                 215                 220

Leu Pro Ser His Cys Met Leu Leu Arg Val Glu Thr Arg Trp Tyr Ile
225                 230                 235                 240

Asn Met Tyr Glu Lys Ile Pro Asn Ala Asp Pro Leu Leu Leu Glu Phe
                245                 250                 255

Ala Lys Leu Asp Phe Asn Ile Val Gln Ala Thr His Gln Gln Glu Leu
            260                 265                 270

Arg Asn Leu Ser Arg Trp Trp Lys Glu Ser Trp Leu Ala Glu Lys Leu
        275                 280                 285

Ser Phe Ser Arg Asp Arg Ile Val Glu Ser Phe Leu Trp Ile Ala Gly
    290                 295                 300

Met Met Phe Glu Pro Gln Arg Asn Glu Leu Ser Arg Thr Leu Leu Thr
305                 310                 315                 320

Lys Val Thr Ala Ile Ala Thr Ile Ile Asp Asp Ile Tyr Asp Val Tyr
                325                 330                 335
```

```
Gly Thr Leu Asp Glu Leu Glu Ile Phe Thr Gln Ala Val Glu Arg Met
                340                 345                 350

Glu Val Lys Ala Met Asp Glu Leu Pro Asp Tyr Met Lys Val Cys Tyr
            355                 360                 365

Leu Thr Leu Ile Asn Asn Thr Asn Glu Val Ala Tyr Glu Val Leu Lys
        370                 375                 380

Glu Gln Gly Ile Asn Val Thr Pro Tyr Leu Thr Lys Ala Trp Thr Asp
385                 390                 395                 400

Leu Cys Lys Ala Tyr Leu Gln Glu Ala Arg Trp Tyr Tyr Ser Gly Tyr
                405                 410                 415

Thr Pro Ser Met Glu Glu Tyr Met Glu Asn Ala Trp Val Ser Val Gly
            420                 425                 430

Ser Pro Val Met Val Val Asn Ala Phe Phe Leu Val Thr Asn Pro Ile
        435                 440                 445

Thr Lys Glu Ala Leu Glu His Leu Phe Leu Asn Lys Tyr Thr Glu Ile
    450                 455                 460

Ile Arg Trp Ser Ala Ala Ile Ile Arg Leu Thr Asp Asp Leu Ala Thr
465                 470                 475                 480

Ser Ser Asn Glu Met Glu Arg Gly Asp Val Ser Lys Ser Ile Gln Cys
                485                 490                 495

Tyr Met Lys Glu Lys Gly Ala Thr Glu Glu Ala Arg Lys His Ile
            500                 505                 510

Asn Phe Met Ile Arg Asp Ala Trp Lys Arg Ile Asn Thr Ala Gln Arg
        515                 520                 525

Asp Asn Pro Leu Phe Cys Glu Glu Phe Ile Ser Cys Gly Met Asn Ile
    530                 535                 540

Ala Arg Thr Gly Gln Thr Ile Tyr Gln His Gly Asp Gly Val Gly Ile
545                 550                 555                 560

Gln Asn Tyr Glu Ile Gln Asn Arg Ile Tyr Lys Leu Phe Phe Asp Pro
                565                 570                 575

Ile Ala Val Ser Ile Pro
            580

<210> SEQ ID NO 7
<211> LENGTH: 578
<212> TYPE: PRT
<213> ORGANISM: Pinus taeda

<400> SEQUENCE: 7

Met Ser Ser Thr Thr Ser Val Ser Asn Glu Asp Gly Val Pro Arg Arg
1               5                   10                  15

Ile Ala Gly His His Ser Asn Leu Trp Asp Asp Ser Ile Ala Ser
            20                  25                  30

Leu Ser Thr Ser Tyr Glu Ala Pro Ser Tyr Arg Lys Arg Ala Asp Lys
        35                  40                  45

Leu Ile Gly Glu Val Lys Asn Ile Phe Asp Leu Met Ser Val Glu Asp
    50                  55                  60

Gly Val Phe Thr Ser Pro Leu Ser Asp Leu His His Arg Leu Trp Met
65                  70                  75                  80

Val Asp Ser Val Glu Arg Leu Gly Ile Asp Arg His Phe Lys Asp Glu
                85                  90                  95

Ile Asn Ser Ala Leu Asp His Val Tyr Ser Tyr Trp Thr Glu Lys Gly
            100                 105                 110

Ile Gly Arg Gly Arg Glu Ser Gly Val Thr Asp Leu Asn Ser Thr Ala
```

```
            115                 120                 125
Leu Gly Leu Arg Thr Leu Arg Leu His Gly Tyr Thr Val Ser Ser His
            130                 135                 140
Val Leu Asp His Phe Lys Asn Glu Lys Gly Gln Phe Thr Cys Ser Ala
145                 150                 155                 160
Ile Gln Thr Glu Gly Glu Ile Arg Asp Val Leu Asn Leu Phe Arg Ala
                165                 170                 175
Ser Leu Ile Ala Phe Pro Gly Glu Lys Ile Met Glu Ala Ala Glu Ile
                180                 185                 190
Phe Ser Thr Met Tyr Leu Lys Asp Ala Leu Gln Lys Ile Pro Pro Ser
                195                 200                 205
Gly Leu Ser Gln Glu Ile Glu Tyr Leu Leu Glu Phe Gly Trp His Thr
                210                 215                 220
Asn Leu Pro Arg Met Glu Thr Arg Met Tyr Ile Asp Val Phe Gly Glu
225                 230                 235                 240
Asp Thr Thr Phe Glu Thr Pro Tyr Leu Ile Arg Glu Lys Leu Leu Glu
                245                 250                 255
Leu Ala Lys Leu Glu Phe Asn Ile Phe His Ser Leu Val Lys Arg Glu
                260                 265                 270
Leu Gln Ser Leu Ser Arg Trp Trp Lys Asp Tyr Gly Phe Pro Glu Ile
                275                 280                 285
Thr Phe Ser Arg His Arg His Val Glu Tyr Tyr Thr Leu Ala Ala Cys
                290                 295                 300
Ile Ala Asn Asp Pro Lys His Ser Ala Phe Arg Leu Gly Phe Gly Lys
305                 310                 315                 320
Ile Ser His Met Ile Thr Ile Leu Asp Asp Ile Tyr Asp Thr Phe Gly
                    325                 330                 335
Thr Met Glu Glu Leu Lys Leu Leu Thr Ala Ala Phe Lys Arg Trp Asp
                340                 345                 350
Pro Ser Ser Ile Glu Cys Leu Pro Asp Tyr Met Lys Gly Val Tyr Met
                355                 360                 365
Ala Val Tyr Asp Asn Ile Asn Glu Met Ala Arg Glu Ala Gln Lys Ile
                370                 375                 380
Gln Gly Trp Asp Thr Val Ser Tyr Ala Arg Lys Ser Trp Glu Ala Phe
385                 390                 395                 400
Ile Gly Ala Tyr Ile Gln Glu Ala Lys Trp Ile Ser Ser Gly Tyr Leu
                    405                 410                 415
Pro Thr Phe Asp Glu Tyr Leu Glu Asn Gly Lys Val Ser Phe Gly Ser
                420                 425                 430
Arg Ile Thr Thr Leu Glu Pro Met Leu Thr Leu Gly Phe Pro Leu Pro
                435                 440                 445
Pro Arg Ile Leu Gln Glu Ile Asp Phe Pro Ser Lys Phe Asn Asp Leu
                450                 455                 460
Ile Cys Ala Ile Leu Arg Leu Lys Gly Asp Thr Gln Cys Tyr Lys Ala
465                 470                 475                 480
Asp Arg Ala Arg Gly Glu Glu Ala Ser Ala Val Ser Cys Tyr Met Lys
                485                 490                 495
Asp His Pro Gly Ile Thr Glu Glu Asp Ala Val Asn Gln Val Asn Ala
                500                 505                 510
Met Val Asp Asn Leu Thr Lys Glu Leu Asn Trp Glu Leu Leu Arg Pro
                515                 520                 525
Asp Ser Gly Val Pro Ile Ser Tyr Lys Lys Val Ala Phe Asp Ile Cys
                530                 535                 540
```

```
Arg Val Phe His Tyr Gly Tyr Lys Tyr Arg Asp Gly Phe Ser Val Ala
545                 550                 555                 560

Ser Ile Glu Ile Lys Asn Leu Val Thr Arg Thr Val Val Glu Thr Val
                565                 570                 575

Pro Leu

<210> SEQ ID NO 8
<211> LENGTH: 581
<212> TYPE: PRT
<213> ORGANISM: Pinus taeda

<400> SEQUENCE: 8

Met Ser Ser Thr Thr Ser Val Ser Asn Glu Asp Gly Val Pro Arg Arg
1               5                   10                  15

Ile Ala Gly His His Ser Asn Leu Trp Asp Asp Ser Ile Ala Ser
            20                  25                  30

Leu Ser Thr Ser Tyr Glu Ala Pro Ser Tyr Arg Lys Arg Ala Asp Lys
            35                  40                  45

Leu Ile Gly Glu Val Lys Asn Ile Phe Asp Leu Met Ser Val Glu Asp
    50                  55                  60

Gly Val Phe Thr Ser Pro Leu Ser Asp Leu His His Arg Leu Trp Met
65                  70                  75                  80

Val Asp Ser Val Glu Arg Leu Gly Ile Asp Arg His Phe Lys Asp Glu
                85                  90                  95

Ile Asn Ser Ala Leu Asp His Val Tyr Ser Tyr Trp Thr Glu Lys Gly
            100                 105                 110

Ile Gly Arg Gly Arg Glu Ser Gly Val Thr Asp Leu Asn Ser Thr Ala
        115                 120                 125

Leu Gly Leu Arg Thr Leu Arg Leu His Gly Tyr Thr Val Ser Ser His
    130                 135                 140

Val Leu Asp His Phe Lys Asn Glu Lys Gly Gln Phe Thr Cys Ser Ala
145                 150                 155                 160

Ile Gln Thr Glu Gly Glu Ile Arg Asp Val Leu Asn Leu Phe Arg Ala
                165                 170                 175

Ser Leu Ile Ala Phe Pro Gly Glu Lys Ile Met Glu Ala Ala Glu Ile
            180                 185                 190

Phe Ser Thr Met Tyr Leu Lys Asp Ala Leu Gln Lys Ile Pro Pro Ser
        195                 200                 205

Gly Leu Ser Gln Glu Ile Glu Tyr Leu Leu Glu Phe Gly Trp His Thr
    210                 215                 220

Asn Leu Pro Arg Met Glu Thr Arg Met Tyr Ile Asp Val Phe Gly Glu
225                 230                 235                 240

Asp Thr Thr Phe Glu Thr Pro Tyr Leu Ile Arg Glu Lys Leu Leu Glu
                245                 250                 255

Leu Ala Lys Leu Glu Phe Asn Ile Phe His Ser Leu Val Lys Arg Glu
            260                 265                 270

Leu Gln Ser Leu Ser Arg Trp Trp Lys Asp Tyr Gly Phe Pro Glu Ile
        275                 280                 285

Thr Phe Ser Arg His Arg His Val Glu Tyr Tyr Thr Leu Ala Ala Cys
    290                 295                 300

Ile Ala Asn Asp Pro Lys His Ser Ala Phe Arg Leu Gly Phe Gly Lys
305                 310                 315                 320

Ile Ser His Met Ile Thr Ile Leu Asp Asp Ile Tyr Asp Thr Phe Gly
                325                 330                 335
```

```
Thr Met Glu Glu Leu Lys Leu Leu Thr Ala Ala Phe Lys Arg Trp Asp
            340                 345                 350

Pro Ser Ser Ile Glu Cys Leu Pro Asp Tyr Met Lys Gly Val Tyr Met
        355                 360                 365

Ala Val Tyr Asp Asn Ile Asn Glu Met Ala Arg Glu Ala Gln Lys Ile
370                 375                 380

Gln Gly Trp Asp Thr Val Ser Tyr Ala Arg Lys Ser Trp Glu Ala Phe
385                 390                 395                 400

Ile Gly Ala Tyr Ile Gln Glu Ala Lys Trp Ile Ser Ser Gly Tyr Leu
                405                 410                 415

Pro Thr Phe Asp Glu Tyr Leu Glu Asn Gly Lys Val Ser Phe Gly Ser
            420                 425                 430

Arg Ile Thr Thr Leu Glu Pro Met Leu Thr Leu Gly Phe Pro Leu Pro
        435                 440                 445

Pro Arg Ile Leu Gln Glu Ile Asp Phe Pro Ser Lys Phe Asn Asp Leu
    450                 455                 460

Ile Cys Ala Ile Leu Arg Leu Lys Gly Asp Thr Gln Cys Tyr Lys Ala
465                 470                 475                 480

Asp Arg Ala Arg Gly Glu Glu Ala Ser Ala Val Ser Cys Tyr Met Lys
                485                 490                 495

Asp His Pro Gly Ile Thr Glu Glu Asp Ala Val Asn Gln Val Asn Ala
            500                 505                 510

Met Val Asp Asn Leu Thr Lys Glu Leu Asn Trp Glu Leu Leu Arg Pro
        515                 520                 525

Asp Ser Gly Val Pro Ile Ser Tyr Lys Lys Val Ala Phe Asp Ile Cys
    530                 535                 540

Arg Val Phe His Tyr Gly Tyr Lys Tyr Arg Asp Gly Phe Ser Val Ala
545                 550                 555                 560

Ser Ile Glu Ile Lys Asn Leu Val Thr Arg Thr Val Val Glu Thr Val
                565                 570                 575

Pro Leu Ser Lys Leu
            580

<210> SEQ ID NO 9
<211> LENGTH: 540
<212> TYPE: PRT
<213> ORGANISM: Salvia pomifera

<400> SEQUENCE: 9

Met Arg Arg Ser Gly Asp Tyr Gln Pro Ser Leu Trp Asp Phe Asn Tyr
1               5                   10                  15

Ile Gln Ser Leu Asn Thr Pro Tyr Lys Glu Gln Arg Tyr Val Asn Arg
            20                  25                  30

Gln Ala Glu Leu Ile Met Gln Val Arg Met Leu Leu Lys Val Lys Met
        35                  40                  45

Glu Ala Ile Gln Gln Leu Glu Leu Ile Asp Asp Leu Gln Tyr Leu Gly
    50                  55                  60

Leu Ser Tyr Phe Phe Pro Asp Glu Ile Lys Gln Ile Leu Ser Ser Ile
65                  70                  75                  80

His Asn Glu His Arg Tyr Phe His Asn Asn Asp Leu Tyr Leu Thr Ala
                85                  90                  95

Leu Gly Phe Arg Ile Leu Arg Gln His Gly Phe Asn Val Ser Glu Asp
            100                 105                 110

Val Phe Asp Cys Phe Lys Thr Glu Lys Cys Ser Asp Phe Asn Ala Asn
```

```
                 115                 120                 125
Leu Ala Gln Asp Thr Lys Gly Met Leu Gln Leu Tyr Glu Ala Ser Phe
        130                 135                 140

Leu Leu Arg Glu Gly Glu Asp Thr Leu Glu Leu Ala Arg Arg Phe Ser
145                 150                 155                 160

Thr Arg Ser Leu Arg Glu Lys Leu Asp Glu Asp Gly Asp Glu Ile Asp
                165                 170                 175

Glu Asp Leu Ser Ser Trp Ile Arg His Ser Leu Asp Leu Pro Leu His
            180                 185                 190

Trp Arg Ile Gln Gly Leu Glu Ala Arg Trp Phe Leu Asp Ala Tyr Ala
        195                 200                 205

Arg Arg Pro Asp Met Asn Pro Leu Ile Phe Lys Leu Ala Lys Leu Asn
    210                 215                 220

Phe Asn Ile Val Gln Ala Thr Tyr Gln Glu Leu Lys Asp Val Ser
225                 230                 235                 240

Arg Trp Trp Asn Ser Ser Cys Leu Ala Glu Lys Leu Pro Phe Val Arg
                245                 250                 255

Asp Arg Ile Val Glu Cys Phe Phe Trp Ala Ile Gly Ala Phe Glu Pro
            260                 265                 270

His Gln Tyr Ser Tyr Gln Arg Lys Met Ala Ala Ile Ile Thr Phe
        275                 280                 285

Val Thr Ile Ile Asp Asp Val Tyr Asp Val Tyr Gly Thr Leu Glu Glu
    290                 295                 300

Leu Glu Leu Phe Thr Asp Met Ile Arg Arg Trp Asp Asn Ile Ser Ile
305                 310                 315                 320

Ser Gln Leu Pro Tyr Tyr Met Gln Val Cys Tyr Leu Ala Leu Tyr Asn
                325                 330                 335

Phe Val Ser Glu Arg Ala Tyr Asp Ile Leu Lys Asp Gln His Phe Asn
            340                 345                 350

Ser Ile Pro Tyr Leu Gln Arg Ser Trp Val Ser Leu Val Glu Gly Tyr
        355                 360                 365

Leu Lys Glu Ala Tyr Trp Tyr Tyr Asn Gly Tyr Lys Pro Ser Leu Glu
    370                 375                 380

Glu Tyr Leu Asn Asn Ala Lys Ile Ser Ile Ser Ala Pro Thr Ile Ile
385                 390                 395                 400

Ser Gln Leu Tyr Phe Thr Leu Ala Asn Ser Thr Asp Glu Thr Val Ile
                405                 410                 415

Glu Ser Leu Tyr Glu Tyr His Asn Ile Leu Tyr Leu Ser Gly Thr Ile
            420                 425                 430

Leu Arg Leu Ala Asp Asp Leu Gly Thr Ser Gln His Glu Leu Glu Arg
        435                 440                 445

Gly Asp Val Pro Lys Ala Ile Gln Cys Tyr Met Lys Asp Thr Asn Ala
    450                 455                 460

Ser Glu Arg Glu Ala Val Glu His Val Lys Phe Leu Ile Arg Glu Thr
465                 470                 475                 480

Trp Lys Glu Met Asn Thr Val Thr Thr Ala Ser Asp Cys Pro Phe Thr
                485                 490                 495

Asp Asp Leu Val Ala Val Ala Thr Asn Leu Ala Arg Ala Ala Gln Phe
            500                 505                 510

Ile Tyr Leu Asp Gly Asp Gly Ile Gly Val Gln His Ser Glu Ile His
        515                 520                 525

Gln Gln Met Gly Gly Leu Leu Phe Gln Pro Tyr Val
    530                 535                 540
```

<210> SEQ ID NO 10
<211> LENGTH: 543
<212> TYPE: PRT
<213> ORGANISM: Salvia pomifera

<400> SEQUENCE: 10

```
Met Arg Arg Ser Gly Asp Tyr Gln Pro Ser Leu Trp Asp Phe Asn Tyr
1               5                   10                  15

Ile Gln Ser Leu Asn Thr Pro Tyr Lys Glu Gln Arg Tyr Val Asn Arg
            20                  25                  30

Gln Ala Glu Leu Ile Met Gln Val Arg Met Leu Leu Lys Val Lys Met
        35                  40                  45

Glu Ala Ile Gln Gln Leu Glu Leu Ile Asp Asp Leu Gln Tyr Leu Gly
    50                  55                  60

Leu Ser Tyr Phe Phe Pro Asp Glu Ile Lys Gln Ile Leu Ser Ser Ile
65                  70                  75                  80

His Asn Glu His Arg Tyr Phe His Asn Asn Asp Leu Tyr Leu Thr Ala
                85                  90                  95

Leu Gly Phe Arg Ile Leu Arg Gln His Gly Phe Asn Val Ser Glu Asp
            100                 105                 110

Val Phe Asp Cys Phe Lys Thr Glu Lys Cys Ser Asp Phe Asn Ala Asn
        115                 120                 125

Leu Ala Gln Asp Thr Lys Gly Met Leu Gln Leu Tyr Glu Ala Ser Phe
    130                 135                 140

Leu Leu Arg Glu Gly Glu Asp Thr Leu Glu Leu Ala Arg Arg Phe Ser
145                 150                 155                 160

Thr Arg Ser Leu Arg Glu Lys Leu Asp Glu Asp Gly Asp Glu Ile Asp
                165                 170                 175

Glu Asp Leu Ser Ser Trp Ile Arg His Ser Leu Asp Leu Pro Leu His
            180                 185                 190

Trp Arg Ile Gln Gly Leu Glu Ala Arg Trp Phe Leu Asp Ala Tyr Ala
        195                 200                 205

Arg Arg Pro Asp Met Asn Pro Leu Ile Phe Lys Leu Ala Lys Leu Asn
    210                 215                 220

Phe Asn Ile Val Gln Ala Thr Tyr Gln Glu Glu Leu Lys Asp Val Ser
225                 230                 235                 240

Arg Trp Trp Asn Ser Ser Cys Leu Ala Glu Lys Leu Pro Phe Val Arg
                245                 250                 255

Asp Arg Ile Val Glu Cys Phe Phe Trp Ala Ile Gly Ala Phe Glu Pro
            260                 265                 270

His Gln Tyr Ser Tyr Gln Arg Lys Met Ala Ala Ile Ile Thr Phe
        275                 280                 285

Val Thr Ile Ile Asp Asp Val Tyr Asp Val Tyr Gly Thr Leu Glu Glu
    290                 295                 300

Leu Glu Leu Phe Thr Asp Met Ile Arg Arg Trp Asp Asn Ile Ser Ile
305                 310                 315                 320

Ser Gln Leu Pro Tyr Tyr Met Gln Val Cys Tyr Leu Ala Leu Tyr Asn
                325                 330                 335

Phe Val Ser Glu Arg Ala Tyr Asp Ile Leu Lys Asp Gln His Phe Asn
            340                 345                 350

Ser Ile Pro Tyr Leu Gln Arg Ser Trp Val Ser Leu Val Glu Gly Tyr
        355                 360                 365

Leu Lys Glu Ala Tyr Trp Tyr Tyr Asn Gly Tyr Lys Pro Ser Leu Glu
```

```
            370                 375                 380
Glu Tyr Leu Asn Asn Ala Lys Ile Ser Ile Ser Ala Pro Thr Ile Ile
385                 390                 395                 400

Ser Gln Leu Tyr Phe Thr Leu Ala Asn Ser Thr Asp Glu Thr Val Ile
                    405                 410                 415

Glu Ser Leu Tyr Glu Tyr His Asn Ile Leu Tyr Leu Ser Gly Thr Ile
                420                 425                 430

Leu Arg Leu Ala Asp Asp Leu Gly Thr Ser Gln His Glu Leu Glu Arg
            435                 440                 445

Gly Asp Val Pro Lys Ala Ile Gln Cys Tyr Met Lys Asp Thr Asn Ala
        450                 455                 460

Ser Glu Arg Glu Ala Val Glu His Val Lys Phe Leu Ile Arg Glu Thr
465                 470                 475                 480

Trp Lys Glu Met Asn Thr Val Thr Ala Ser Asp Cys Pro Phe Thr
                    485                 490                 495

Asp Asp Leu Val Ala Val Ala Thr Asn Leu Ala Arg Ala Ala Gln Phe
                500                 505                 510

Ile Tyr Leu Asp Gly Asp Gly Ile Gly Val Gln His Ser Glu Ile His
            515                 520                 525

Gln Gln Met Gly Gly Leu Leu Phe Gln Pro Tyr Val Ser Lys Leu
        530                 535                 540

<210> SEQ ID NO 11
<211> LENGTH: 534
<212> TYPE: PRT
<213> ORGANISM: Ocimum basilicum

<400> SEQUENCE: 11

Met Ser Ala Cys Thr Pro Leu Ala Ser Ala Met Pro Leu Ser Ser Thr
1               5                   10                  15

Pro Leu Ile Asn Gly Asp Asn Ser Gln Arg Lys Asn Thr Arg Gln His
            20                  25                  30

Met Glu Glu Ser Ser Ser Lys Arg Arg Glu Tyr Leu Leu Glu Glu Thr
        35                  40                  45

Thr Arg Lys Leu Gln Arg Asn Asp Thr Glu Ser Val Glu Lys Leu Lys
50                  55                  60

Leu Ile Asp Asn Ile Gln Gln Leu Gly Ile Gly Tyr Tyr Phe Glu Asp
65                  70                  75                  80

Ala Ile Asn Ala Val Leu Arg Ser Pro Phe Ser Thr Gly Glu Glu Asp
                85                  90                  95

Leu Phe Thr Ala Ala Leu Arg Phe Arg Leu Leu Arg His Asn Gly Ile
            100                 105                 110

Glu Ile Ser Pro Glu Ile Phe Leu Lys Phe Lys Asp Glu Arg Gly Lys
        115                 120                 125

Phe Asp Glu Ser Asp Thr Leu Gly Leu Leu Ser Leu Tyr Glu Ala Ser
130                 135                 140

Asn Leu Gly Val Ala Gly Glu Glu Ile Leu Glu Glu Ala Met Glu Phe
145                 150                 155                 160

Ala Glu Ala Arg Leu Arg Arg Ser Leu Ser Glu Pro Ala Ala Pro Leu
                165                 170                 175

His Gly Glu Val Ala Gln Ala Leu Asp Val Pro Arg His Leu Arg Met
            180                 185                 190

Ala Arg Leu Glu Ala Arg Arg Phe Ile Glu Gln Tyr Gly Lys Gln Ser
        195                 200                 205
```

```
Asp His Asp Gly Asp Leu Leu Glu Leu Ala Ile Leu Asp Tyr Asn Gln
    210                 215                 220

Val Gln Ala Gln His Gln Ser Glu Leu Thr Glu Ile Ile Arg Trp Trp
225                 230                 235                 240

Lys Glu Leu Gly Leu Val Asp Lys Leu Ser Phe Gly Arg Asp Arg Pro
                245                 250                 255

Leu Glu Cys Phe Leu Trp Thr Val Gly Leu Leu Pro Glu Pro Lys Tyr
            260                 265                 270

Ser Ser Val Arg Ile Glu Leu Ala Lys Ala Ile Ser Ile Leu Leu Val
            275                 280                 285

Ile Asp Asp Ile Phe Asp Thr Tyr Gly Glu Met Asp Asp Leu Ile Leu
    290                 295                 300

Phe Thr Asp Ala Ile Arg Arg Trp Asp Leu Glu Ala Met Glu Gly Leu
305                 310                 315                 320

Pro Glu Tyr Met Lys Ile Cys Tyr Met Ala Leu Tyr Asn Thr Thr Asn
                325                 330                 335

Glu Val Cys Tyr Lys Val Leu Arg Asp Thr Gly Arg Ile Val Leu Leu
            340                 345                 350

Asn Leu Lys Ser Thr Trp Ile Asp Met Ile Glu Gly Phe Met Glu Glu
            355                 360                 365

Ala Lys Trp Phe Asn Gly Gly Ser Ala Pro Lys Leu Glu Glu Tyr Ile
    370                 375                 380

Glu Asn Gly Val Ser Thr Ala Gly Ala Tyr Met Ala Phe Ala His Ile
385                 390                 395                 400

Phe Phe Leu Ile Gly Glu Gly Val Thr His Gln Asn Ser Gln Leu Phe
                405                 410                 415

Thr Gln Lys Pro Tyr Pro Lys Val Phe Ser Ala Ala Gly Arg Ile Leu
            420                 425                 430

Arg Leu Trp Asp Asp Leu Gly Thr Ala Lys Glu Glu Gln Glu Arg Gly
            435                 440                 445

Asp Leu Ala Ser Cys Val Gln Leu Phe Met Lys Glu Lys Ser Leu Thr
    450                 455                 460

Glu Glu Glu Ala Arg Ser Arg Ile Leu Glu Glu Ile Lys Gly Leu Trp
465                 470                 475                 480

Arg Asp Leu Asn Gly Glu Leu Val Tyr Asn Lys Asn Leu Pro Leu Ser
                485                 490                 495

Ile Ile Lys Val Ala Leu Asn Met Ala Arg Ala Ser Gln Val Val Tyr
            500                 505                 510

Lys His Asp Gln Asp Thr Tyr Phe Ser Ser Val Asp Asn Tyr Val Asp
            515                 520                 525

Ala Leu Phe Phe Thr Gln
    530

<210> SEQ ID NO 12
<211> LENGTH: 537
<212> TYPE: PRT
<213> ORGANISM: Ocimum basilicum

<400> SEQUENCE: 12

Met Ser Ala Cys Thr Pro Leu Ser Ala Met Pro Leu Ser Ser Thr
1               5                   10                  15

Pro Leu Ile Asn Gly Asp Asn Ser Gln Arg Lys Asn Thr Arg Gln His
                20                  25                  30

Met Glu Glu Ser Ser Ser Lys Arg Arg Glu Tyr Leu Leu Glu Glu Thr
            35                  40                  45
```

-continued

Thr Arg Lys Leu Gln Arg Asn Asp Thr Glu Ser Val Glu Lys Leu Lys
     50                  55                  60

Leu Ile Asp Asn Ile Gln Gln Leu Gly Ile Gly Tyr Tyr Phe Glu Asp
 65                  70                  75                  80

Ala Ile Asn Ala Val Leu Arg Ser Pro Phe Ser Thr Gly Glu Glu Asp
                 85                  90                  95

Leu Phe Thr Ala Ala Leu Arg Phe Arg Leu Leu Arg His Asn Gly Ile
             100                 105                 110

Glu Ile Ser Pro Glu Ile Phe Leu Lys Phe Lys Asp Glu Arg Gly Lys
         115                 120                 125

Phe Asp Glu Ser Asp Thr Leu Gly Leu Leu Ser Leu Tyr Glu Ala Ser
130                 135                 140

Asn Leu Gly Val Ala Gly Glu Glu Ile Leu Glu Glu Ala Met Glu Phe
145                 150                 155                 160

Ala Glu Ala Arg Leu Arg Arg Ser Leu Ser Glu Pro Ala Ala Pro Leu
                165                 170                 175

His Gly Glu Val Ala Gln Ala Leu Asp Val Pro Arg His Leu Arg Met
            180                 185                 190

Ala Arg Leu Glu Ala Arg Arg Phe Ile Glu Gln Tyr Gly Lys Gln Ser
        195                 200                 205

Asp His Asp Gly Asp Leu Leu Glu Leu Ala Ile Leu Asp Tyr Asn Gln
    210                 215                 220

Val Gln Ala Gln His Gln Ser Glu Leu Thr Glu Ile Ile Arg Trp Trp
225                 230                 235                 240

Lys Glu Leu Gly Leu Val Asp Lys Leu Ser Phe Gly Arg Asp Arg Pro
                245                 250                 255

Leu Glu Cys Phe Leu Trp Thr Val Gly Leu Leu Pro Glu Pro Lys Tyr
            260                 265                 270

Ser Ser Val Arg Ile Glu Leu Ala Lys Ala Ile Ser Ile Leu Leu Val
        275                 280                 285

Ile Asp Asp Ile Phe Asp Thr Tyr Gly Glu Met Asp Asp Leu Ile Leu
    290                 295                 300

Phe Thr Asp Ala Ile Arg Arg Trp Asp Leu Glu Ala Met Glu Gly Leu
305                 310                 315                 320

Pro Glu Tyr Met Lys Ile Cys Tyr Met Ala Leu Tyr Asn Thr Thr Asn
                325                 330                 335

Glu Val Cys Tyr Lys Val Leu Arg Asp Thr Gly Arg Ile Val Leu Leu
            340                 345                 350

Asn Leu Lys Ser Thr Trp Ile Asp Met Ile Glu Gly Phe Met Glu Glu
        355                 360                 365

Ala Lys Trp Phe Asn Gly Gly Ser Ala Pro Lys Leu Glu Glu Tyr Ile
    370                 375                 380

Glu Asn Gly Val Ser Thr Ala Gly Ala Tyr Met Ala Phe Ala His Ile
385                 390                 395                 400

Phe Phe Leu Ile Gly Glu Gly Val Thr His Gln Asn Ser Gln Leu Phe
                405                 410                 415

Thr Gln Lys Pro Tyr Pro Lys Val Phe Ser Ala Ala Gly Arg Ile Leu
            420                 425                 430

Arg Leu Trp Asp Asp Leu Gly Thr Ala Lys Glu Glu Gln Glu Arg Gly
        435                 440                 445

Asp Leu Ala Ser Cys Val Gln Leu Phe Met Lys Glu Lys Ser Leu Thr
    450                 455                 460

Glu Glu Glu Ala Arg Ser Arg Ile Leu Glu Glu Ile Lys Gly Leu Trp
465                 470                 475                 480

Arg Asp Leu Asn Gly Glu Leu Val Tyr Asn Lys Asn Leu Pro Leu Ser
                485                 490                 495

Ile Ile Lys Val Ala Leu Asn Met Ala Arg Ala Ser Gln Val Val Tyr
            500                 505                 510

Lys His Asp Gln Asp Thr Tyr Phe Ser Ser Val Asp Asn Tyr Val Asp
        515                 520                 525

Ala Leu Phe Phe Thr Gln Ser Lys Leu
        530                 535

<210> SEQ ID NO 13
<211> LENGTH: 323
<212> TYPE: PRT
<213> ORGANISM: C sativa

<400> SEQUENCE: 13

Met Ser Ala Gly Ser Asp Gln Ile Glu Gly Ser Pro His His Glu Ser
1               5                   10                  15

Asp Asn Ser Ile Ala Thr Lys Ile Leu Asn Phe Gly His Thr Cys Trp
            20                  25                  30

Lys Leu Gln Arg Pro Tyr Val Val Lys Gly Met Ile Ser Ile Ala Cys
        35                  40                  45

Gly Leu Phe Gly Arg Glu Leu Phe Asn Asn Arg His Leu Phe Ser Trp
50                  55                  60

Gly Leu Met Trp Lys Ala Phe Phe Ala Leu Val Pro Ile Leu Ser Phe
65                  70                  75                  80

Asn Phe Phe Ala Ala Ile Met Asn Gln Ile Tyr Asp Val Asp Ile Asp
                85                  90                  95

Arg Ile Asn Lys Pro Asp Leu Pro Leu Val Ser Gly Glu Met Ser Ile
            100                 105                 110

Glu Thr Ala Trp Ile Leu Ser Ile Ile Val Ala Leu Thr Gly Leu Ile
        115                 120                 125

Val Thr Ile Lys Leu Lys Ser Ala Pro Leu Phe Val Phe Ile Tyr Ile
    130                 135                 140

Phe Gly Ile Phe Ala Gly Phe Ala Tyr Ser Val Pro Pro Ile Arg Trp
145                 150                 155                 160

Lys Gln Tyr Pro Phe Thr Asn Phe Leu Ile Thr Ile Ser Ser His Val
                165                 170                 175

Gly Leu Ala Phe Thr Ser Tyr Ser Ala Thr Thr Ser Ala Leu Gly Leu
            180                 185                 190

Pro Phe Val Trp Arg Pro Ala Phe Ser Phe Ile Ile Ala Phe Met Thr
        195                 200                 205

Val Met Gly Met Thr Ile Ala Phe Ala Lys Asp Ile Ser Asp Ile Glu
    210                 215                 220

Gly Asp Ala Lys Tyr Gly Val Ser Thr Val Ala Thr Lys Leu Gly Ala
225                 230                 235                 240

Arg Asn Met Thr Phe Val Val Ser Gly Val Leu Leu Leu Asn Tyr Leu
                245                 250                 255

Val Ser Ile Ser Ile Gly Ile Ile Trp Pro Gln Val Phe Lys Ser Asn
            260                 265                 270

Ile Met Ile Leu Ser His Ala Ile Leu Ala Phe Cys Leu Ile Phe Gln
        275                 280                 285

Thr Arg Glu Leu Ala Leu Ala Asn Tyr Ala Ser Ala Pro Ser Arg Gln
    290                 295                 300

```
Phe Phe Glu Phe Ile Trp Leu Leu Tyr Tyr Ala Glu Tyr Phe Val Tyr
305                 310                 315                 320

Val Phe Ile
```

<210> SEQ ID NO 14
<211> LENGTH: 326
<212> TYPE: PRT
<213> ORGANISM: C.sativa

<400> SEQUENCE: 14

```
Met Ser Ala Gly Ser Asp Gln Ile Glu Gly Ser Pro His His Glu Ser
1               5                   10                  15

Asp Asn Ser Ile Ala Thr Lys Ile Leu Asn Phe Gly His Thr Cys Trp
                20                  25                  30

Lys Leu Gln Arg Pro Tyr Val Val Lys Gly Met Ile Ser Ile Ala Cys
            35                  40                  45

Gly Leu Phe Gly Arg Glu Leu Phe Asn Asn Arg His Leu Phe Ser Trp
    50                  55                  60

Gly Leu Met Trp Lys Ala Phe Phe Ala Leu Val Pro Ile Leu Ser Phe
65                  70                  75                  80

Asn Phe Phe Ala Ala Ile Met Asn Gln Ile Tyr Asp Val Asp Ile Asp
                85                  90                  95

Arg Ile Asn Lys Pro Asp Leu Pro Leu Val Ser Gly Glu Met Ser Ile
            100                 105                 110

Glu Thr Ala Trp Ile Leu Ser Ile Val Ala Leu Thr Gly Leu Ile
    115                 120                 125

Val Thr Ile Lys Leu Lys Ser Ala Pro Leu Phe Val Phe Ile Tyr Ile
130                 135                 140

Phe Gly Ile Phe Ala Gly Phe Ala Tyr Ser Val Pro Pro Ile Arg Trp
145                 150                 155                 160

Lys Gln Tyr Pro Phe Thr Asn Phe Leu Ile Thr Ile Ser Ser His Val
                165                 170                 175

Gly Leu Ala Phe Thr Ser Tyr Ser Ala Thr Thr Ser Ala Leu Gly Leu
            180                 185                 190

Pro Phe Val Trp Arg Pro Ala Phe Ser Phe Ile Ile Ala Phe Met Thr
    195                 200                 205

Val Met Gly Met Thr Ile Ala Phe Ala Lys Asp Ile Ser Asp Ile Glu
210                 215                 220

Gly Asp Ala Lys Tyr Gly Val Ser Thr Val Ala Thr Lys Leu Gly Ala
225                 230                 235                 240

Arg Asn Met Thr Phe Val Val Ser Gly Val Leu Leu Leu Asn Tyr Leu
                245                 250                 255

Val Ser Ile Ser Ile Gly Ile Ile Trp Pro Gln Val Phe Lys Ser Asn
            260                 265                 270

Ile Met Ile Leu Ser His Ala Ile Leu Ala Phe Cys Leu Ile Phe Gln
    275                 280                 285

Thr Arg Glu Leu Ala Leu Ala Asn Tyr Ala Ser Ala Pro Ser Arg Gln
290                 295                 300

Phe Phe Glu Phe Ile Trp Leu Leu Tyr Tyr Ala Glu Tyr Phe Val Tyr
305                 310                 315                 320

Val Phe Ile Ser Lys Leu
                325
```

<210> SEQ ID NO 15

<211> LENGTH: 920
<212> TYPE: PRT
<213> ORGANISM: Artificial
<220> FEATURE:
<223> OTHER INFORMATION: the fusion protein between having a GPP
   synthase domain (Erg20pN127W) and a ter-pene synthase domain
   (ClLimS) linked by a 5xGS polypeptide and targeted to the
   pe-roxisome by a C-terminal PTS1

<400> SEQUENCE: 15

Met Ala Ser Glu Lys Glu Ile Arg Arg Glu Arg Phe Leu Asn Val Phe
1               5                   10                  15

Pro Lys Leu Val Glu Glu Leu Asn Ala Ser Leu Leu Ala Tyr Gly Met
            20                  25                  30

Pro Lys Glu Ala Cys Asp Trp Tyr Ala His Ser Leu Asn Tyr Asn Thr
        35                  40                  45

Pro Gly Gly Lys Leu Asn Arg Gly Leu Ser Val Val Asp Thr Tyr Ala
    50                  55                  60

Ile Leu Ser Asn Lys Thr Val Glu Gln Leu Gly Gln Glu Glu Tyr Glu
65                  70                  75                  80

Lys Val Ala Ile Leu Gly Trp Cys Ile Glu Leu Leu Gln Ala Tyr Phe
                85                  90                  95

Leu Val Ala Asp Asp Met Met Asp Lys Ser Ile Thr Arg Arg Gly Gln
            100                 105                 110

Pro Cys Trp Tyr Lys Val Pro Glu Val Gly Glu Ile Ala Ile Trp Asp
        115                 120                 125

Ala Phe Met Leu Glu Ala Ala Ile Tyr Lys Leu Leu Lys Ser His Phe
    130                 135                 140

Arg Asn Glu Lys Tyr Tyr Ile Asp Ile Thr Glu Leu Phe His Glu Val
145                 150                 155                 160

Thr Phe Gln Thr Glu Leu Gly Gln Leu Met Asp Leu Ile Thr Ala Pro
                165                 170                 175

Glu Asp Lys Val Asp Leu Ser Lys Phe Ser Leu Lys Lys His Ser Phe
            180                 185                 190

Ile Val Thr Phe Lys Thr Ala Tyr Tyr Ser Phe Tyr Leu Pro Val Ala
        195                 200                 205

Leu Ala Met Tyr Val Ala Gly Ile Thr Asp Glu Lys Asp Leu Lys Gln
    210                 215                 220

Ala Arg Asp Val Leu Ile Pro Leu Gly Glu Tyr Phe Gln Ile Gln Asp
225                 230                 235                 240

Asp Tyr Leu Asp Cys Phe Gly Thr Pro Glu Gln Ile Gly Lys Ile Gly
                245                 250                 255

Thr Asp Ile Gln Asp Asn Lys Cys Ser Trp Val Ile Asn Lys Ala Leu
            260                 265                 270

Glu Leu Ala Ser Ala Glu Gln Arg Lys Thr Leu Asp Glu Asn Tyr Gly
        275                 280                 285

Lys Lys Asp Ser Val Ala Glu Ala Lys Cys Lys Lys Ile Phe Asn Asp
    290                 295                 300

Leu Lys Ile Glu Gln Leu Tyr His Glu Tyr Glu Glu Ser Ile Ala Lys
305                 310                 315                 320

Asp Leu Lys Ala Lys Ile Ser Gln Val Asp Glu Ser Arg Gly Phe Lys
                325                 330                 335

Ala Asp Val Leu Thr Ala Phe Leu Asn Lys Val Tyr Lys Arg Ser Lys
            340                 345                 350

Gly Ser Gly Ser Gly Ser Gly Ser Gly Ser Met Arg Arg Ser Ala Asn
        355                 360                 365

-continued

Tyr Gln Pro Ser Ile Trp Asp His Asp Phe Leu Gln Ser Leu Asn Ser
    370                 375                 380

Asn Tyr Thr Asp Glu Ala Tyr Lys Arg Arg Ala Glu Glu Leu Arg Gly
385                 390                 395                 400

Lys Val Lys Ile Ala Ile Lys Asp Val Ile Glu Pro Leu Asp Gln Leu
                405                 410                 415

Glu Leu Ile Asp Asn Leu Gln Arg Leu Gly Leu Ala His Arg Phe Glu
            420                 425                 430

Thr Glu Ile Arg Asn Ile Leu Asn Asn Ile Tyr Asn Asn Asn Lys Asp
                435                 440                 445

Tyr Asn Trp Arg Lys Glu Asn Leu Tyr Ala Thr Ser Leu Glu Phe Arg
450                 455                 460

Leu Leu Arg Gln His Gly Tyr Pro Val Ser Gln Glu Val Phe Asn Gly
465                 470                 475                 480

Phe Lys Asp Asp Gln Gly Gly Phe Ile Cys Asp Asp Phe Lys Gly Ile
                485                 490                 495

Leu Ser Leu His Glu Ala Ser Tyr Tyr Ser Leu Glu Gly Glu Ser Ile
                500                 505                 510

Met Glu Glu Ala Trp Gln Phe Thr Ser Lys His Leu Lys Glu Val Met
            515                 520                 525

Ile Ser Lys Asn Met Glu Glu Asp Val Phe Val Ala Glu Gln Ala Lys
530                 535                 540

Arg Ala Leu Glu Leu Pro Leu His Trp Lys Val Pro Met Leu Glu Ala
545                 550                 555                 560

Arg Trp Phe Ile His Ile Tyr Glu Arg Arg Glu Asp Lys Asn His Leu
                565                 570                 575

Leu Leu Glu Leu Ala Lys Met Glu Phe Asn Thr Leu Gln Ala Ile Tyr
            580                 585                 590

Gln Glu Glu Leu Lys Glu Ile Ser Gly Trp Trp Lys Asp Thr Gly Leu
                595                 600                 605

Gly Glu Lys Leu Ser Phe Ala Arg Asn Arg Leu Val Ala Ser Phe Leu
610                 615                 620

Trp Ser Met Gly Ile Ala Phe Glu Pro Gln Phe Ala Tyr Cys Arg Arg
625                 630                 635                 640

Val Leu Thr Ile Ser Ile Ala Leu Ile Thr Val Ile Asp Asp Ile Tyr
                645                 650                 655

Asp Val Tyr Gly Thr Leu Asp Glu Leu Glu Ile Phe Thr Asp Ala Val
                660                 665                 670

Glu Arg Trp Asp Ile Asn Tyr Ala Leu Lys His Leu Pro Gly Tyr Met
            675                 680                 685

Lys Met Cys Phe Leu Ala Leu Tyr Asn Phe Val Asn Glu Phe Ala Tyr
690                 695                 700

Tyr Val Leu Lys Gln Gln Asp Phe Asp Leu Leu Leu Ser Ile Lys Asn
705                 710                 715                 720

Ala Trp Leu Gly Leu Ile Gln Ala Tyr Leu Val Glu Ala Lys Trp Tyr
                725                 730                 735

His Ser Lys Tyr Thr Pro Lys Leu Glu Glu Tyr Leu Glu Asn Gly Leu
                740                 745                 750

Val Ser Ile Thr Gly Pro Leu Ile Ile Thr Ile Ser Tyr Leu Ser Gly
                755                 760                 765

Thr Asn Pro Ile Ile Lys Lys Glu Leu Glu Phe Leu Glu Ser Asn Pro
770                 775                 780

```
Asp Ile Val His Trp Ser Ser Lys Ile Phe Arg Leu Gln Asp Asp Leu
785                 790                 795                 800

Gly Thr Ser Ser Asp Glu Ile Gln Arg Gly Asp Val Pro Lys Ser Ile
            805                 810                 815

Gln Cys Tyr Met His Glu Thr Gly Ala Ser Glu Val Ala Arg Gln
        820                 825                 830

His Ile Lys Asp Met Met Arg Gln Met Trp Lys Lys Val Asn Ala Tyr
        835                 840                 845

Thr Ala Asp Lys Asp Ser Pro Leu Thr Gly Thr Thr Glu Phe Leu
    850                 855                 860

Leu Asn Leu Val Arg Met Ser His Phe Met Tyr Leu His Gly Asp Gly
865                 870                 875                 880

His Gly Val Gln Asn Gln Glu Thr Ile Asp Val Gly Phe Thr Leu Leu
                885                 890                 895

Phe Gln Pro Ile Pro Leu Glu Asp Lys His Met Ala Phe Thr Ala Ser
                900                 905                 910

Pro Gly Thr Lys Gly Ser Lys Leu
            915                 920
```

<210> SEQ ID NO 16
<211> LENGTH: 919
<212> TYPE: PRT
<213> ORGANISM: Artificial
<220> FEATURE:
<223> OTHER INFORMATION: the fusion protein between having a terpene
      synthase domain (ClLimS) and a GPP syn-thase domain (Erg20pN127W)
      linked by a 5xGS polypeptide and targeted to the peroxi-some by a
      C-terminal PTS1

<400> SEQUENCE: 16

```
Met Arg Arg Ser Ala Asn Tyr Gln Pro Ser Ile Trp Asp His Asp Phe
1               5                   10                  15

Leu Gln Ser Leu Asn Ser Asn Tyr Thr Asp Glu Ala Tyr Lys Arg Arg
            20                  25                  30

Ala Glu Glu Leu Arg Gly Lys Val Lys Ile Ala Ile Lys Asp Val Ile
        35                  40                  45

Glu Pro Leu Asp Gln Leu Glu Leu Ile Asp Asn Leu Gln Arg Leu Gly
    50                  55                  60

Leu Ala His Arg Phe Glu Thr Glu Ile Arg Asn Ile Leu Asn Asn Ile
65                  70                  75                  80

Tyr Asn Asn Asn Lys Asp Tyr Asn Trp Arg Lys Glu Asn Leu Tyr Ala
                85                  90                  95

Thr Ser Leu Glu Phe Arg Leu Leu Arg Gln His Gly Tyr Pro Val Ser
            100                 105                 110

Gln Glu Val Phe Asn Gly Phe Lys Asp Asp Gln Gly Gly Phe Ile Cys
        115                 120                 125

Asp Asp Phe Lys Gly Ile Leu Ser Leu His Glu Ala Ser Tyr Tyr Ser
130                 135                 140

Leu Glu Gly Glu Ser Ile Met Glu Glu Ala Trp Gln Phe Thr Ser Lys
145                 150                 155                 160

His Leu Lys Glu Val Met Ile Ser Lys Asn Met Glu Glu Asp Val Phe
                165                 170                 175

Val Ala Glu Gln Ala Lys Arg Ala Leu Glu Leu Pro Leu His Trp Lys
            180                 185                 190

Val Pro Met Leu Glu Ala Arg Trp Phe Ile His Ile Tyr Glu Arg Arg
        195                 200                 205
```

```
Glu Asp Lys Asn His Leu Leu Leu Glu Leu Ala Lys Met Glu Phe Asn
210                 215                 220

Thr Leu Gln Ala Ile Tyr Gln Glu Leu Lys Glu Ile Ser Gly Trp
225                 230                 235                 240

Trp Lys Asp Thr Gly Leu Gly Glu Lys Leu Ser Phe Ala Arg Asn Arg
                245                 250                 255

Leu Val Ala Ser Phe Leu Trp Ser Met Gly Ile Ala Phe Glu Pro Gln
                260                 265                 270

Phe Ala Tyr Cys Arg Arg Val Leu Thr Ile Ser Ile Ala Leu Ile Thr
                275                 280                 285

Val Ile Asp Asp Ile Tyr Asp Val Tyr Gly Thr Leu Asp Glu Leu Glu
290                 295                 300

Ile Phe Thr Asp Ala Val Glu Arg Trp Asp Ile Asn Tyr Ala Leu Lys
305                 310                 315                 320

His Leu Pro Gly Tyr Met Lys Met Cys Phe Leu Ala Leu Tyr Asn Phe
                325                 330                 335

Val Asn Glu Phe Ala Tyr Tyr Val Leu Lys Gln Gln Asp Phe Asp Leu
                340                 345                 350

Leu Leu Ser Ile Lys Asn Ala Trp Leu Gly Leu Ile Gln Ala Tyr Leu
                355                 360                 365

Val Glu Ala Lys Trp Tyr His Ser Lys Tyr Thr Pro Lys Leu Glu Glu
370                 375                 380

Tyr Leu Glu Asn Gly Leu Val Ser Ile Thr Gly Pro Leu Ile Ile Thr
385                 390                 395                 400

Ile Ser Tyr Leu Ser Gly Thr Asn Pro Ile Ile Lys Lys Glu Leu Glu
                405                 410                 415

Phe Leu Glu Ser Asn Pro Asp Ile Val His Trp Ser Ser Lys Ile Phe
                420                 425                 430

Arg Leu Gln Asp Asp Leu Gly Thr Ser Ser Asp Glu Ile Gln Arg Gly
                435                 440                 445

Asp Val Pro Lys Ser Ile Gln Cys Tyr Met His Glu Thr Gly Ala Ser
                450                 455                 460

Glu Glu Val Ala Arg Gln His Ile Lys Asp Met Met Arg Gln Met Trp
465                 470                 475                 480

Lys Lys Val Asn Ala Tyr Thr Ala Asp Lys Asp Ser Pro Leu Thr Gly
                485                 490                 495

Thr Thr Thr Glu Phe Leu Leu Asn Leu Val Arg Met Ser His Phe Met
                500                 505                 510

Tyr Leu His Gly Asp Gly His Gly Val Gln Asn Gln Glu Thr Ile Asp
                515                 520                 525

Val Gly Phe Thr Leu Leu Phe Gln Pro Ile Pro Leu Glu Asp Lys His
530                 535                 540

Met Ala Phe Thr Ala Ser Pro Gly Thr Lys Gly Gly Ser Gly Ser Gly
545                 550                 555                 560

Ser Gly Ser Gly Ser Lys Met Ala Ser Glu Lys Glu Ile Arg Arg Glu
                565                 570                 575

Arg Phe Leu Asn Val Phe Pro Lys Leu Val Glu Glu Leu Asn Ala Ser
                580                 585                 590

Leu Leu Ala Tyr Gly Met Pro Lys Glu Ala Cys Asp Trp Tyr Ala His
                595                 600                 605

Ser Leu Asn Tyr Asn Thr Pro Gly Gly Lys Leu Asn Arg Gly Leu Ser
                610                 615                 620

Val Val Asp Thr Tyr Ala Ile Leu Ser Asn Lys Thr Val Glu Gln Leu
```

Gly Gln Glu Glu Tyr Glu Lys Val Ala Ile Leu Gly Trp Cys Ile Glu
625                 630                 635                 640
                645                 650                 655

Leu Leu Gln Ala Tyr Phe Leu Val Ala Asp Asp Met Met Asp Lys Ser
                660                 665                 670

Ile Thr Arg Arg Gly Gln Pro Cys Trp Tyr Lys Val Pro Glu Val Gly
                675                 680                 685

Glu Ile Ala Ile Trp Asp Ala Phe Met Leu Glu Ala Ala Ile Tyr Lys
                690                 695                 700

Leu Leu Lys Ser His Phe Arg Asn Glu Lys Tyr Tyr Ile Asp Ile Thr
705                 710                 715                 720

Glu Leu Phe His Glu Val Thr Phe Gln Thr Glu Leu Gly Gln Leu Met
                725                 730                 735

Asp Leu Ile Thr Ala Pro Glu Asp Lys Val Asp Leu Ser Lys Phe Ser
                740                 745                 750

Leu Lys Lys His Ser Phe Ile Val Thr Phe Lys Thr Ala Tyr Tyr Ser
                755                 760                 765

Phe Tyr Leu Pro Val Ala Leu Ala Met Tyr Val Ala Gly Ile Thr Asp
                770                 775                 780

Glu Lys Asp Leu Lys Gln Ala Arg Asp Val Leu Ile Pro Leu Gly Glu
785                 790                 795                 800

Tyr Phe Gln Ile Gln Asp Asp Tyr Leu Asp Cys Phe Gly Thr Pro Glu
                805                 810                 815

Gln Ile Gly Lys Ile Gly Thr Asp Ile Gln Asp Asn Lys Cys Ser Trp
                820                 825                 830

Val Ile Asn Lys Ala Leu Glu Leu Ala Ser Ala Glu Gln Arg Lys Thr
                835                 840                 845

Leu Asp Glu Asn Tyr Gly Lys Lys Asp Ser Val Ala Glu Ala Lys Cys
                850                 855                 860

Lys Lys Ile Phe Asn Asp Leu Lys Ile Glu Gln Leu Tyr His Glu Tyr
865                 870                 875                 880

Glu Glu Ser Ile Ala Lys Asp Leu Lys Ala Lys Ile Ser Gln Val Asp
                885                 890                 895

Glu Ser Arg Gly Phe Lys Ala Asp Val Leu Thr Ala Phe Leu Asn Lys
                900                 905                 910

Val Tyr Lys Arg Ser Lys Leu
                915

<210> SEQ ID NO 17
<211> LENGTH: 493
<212> TYPE: PRT
<213> ORGANISM: Catharanthous roseus

<400> SEQUENCE: 17

Met Asp Tyr Leu Thr Ile Ile Leu Thr Leu Leu Phe Ala Leu Thr Leu
1               5                   10                  15

Tyr Glu Ala Phe Ser Tyr Leu Ser Arg Arg Thr Lys Asn Leu Pro Pro
                20                  25                  30

Gly Pro Ser Pro Leu Pro Phe Ile Gly Ser Leu His Leu Leu Gly Asp
                35                  40                  45

Gln Pro His Lys Ser Leu Ala Lys Leu Ser Lys Lys His Gly Pro Ile
                50                  55                  60

Met Ser Leu Lys Leu Gly Gln Ile Thr Thr Ile Val Ile Ser Ser Ser
65                  70                  75                  80

```
Thr Met Ala Lys Glu Val Leu Gln Lys Gln Asp Leu Ala Phe Ser Ser
                85                  90                  95

Arg Ser Val Pro Asn Ala Leu His Ala His Asn Gln Phe Lys Phe Ser
            100                 105                 110

Val Val Trp Leu Pro Val Ala Ser Arg Trp Arg Ser Leu Arg Lys Val
        115                 120                 125

Leu Asn Ser Asn Ile Phe Ser Gly Asn Arg Leu Asp Ala Asn Gln His
    130                 135                 140

Leu Arg Thr Arg Lys Val Gln Glu Leu Ile Ala Tyr Cys Arg Lys Asn
145                 150                 155                 160

Ser Gln Ser Gly Glu Ala Val Asp Val Gly Arg Ala Ala Phe Arg Thr
                165                 170                 175

Ser Leu Asn Leu Leu Ser Asn Leu Ile Phe Ser Lys Asp Leu Thr Asp
            180                 185                 190

Pro Tyr Ser Asp Ser Ala Lys Glu Phe Lys Asp Leu Val Trp Asn Ile
        195                 200                 205

Met Val Glu Ala Gly Lys Pro Asn Leu Val Asp Phe Phe Pro Leu Leu
    210                 215                 220

Glu Lys Val Asp Pro Gln Gly Ile Arg His Arg Met Thr Ile His Phe
225                 230                 235                 240

Gly Glu Val Leu Lys Leu Phe Gly Gly Leu Val Asn Glu Arg Leu Glu
                245                 250                 255

Gln Arg Arg Ser Lys Gly Glu Lys Asn Asp Val Leu Asp Val Leu Leu
            260                 265                 270

Thr Thr Ser Gln Glu Ser Pro Glu Glu Ile Asp Arg Thr His Ile Glu
        275                 280                 285

Arg Met Cys Leu Asp Leu Phe Val Ala Gly Thr Asp Thr Thr Ser Ser
    290                 295                 300

Thr Leu Glu Trp Ala Met Ser Glu Met Leu Lys Asn Pro Asp Lys Met
305                 310                 315                 320

Lys Lys Thr Gln Asp Glu Leu Ala Gln Val Ile Gly Arg Gly Lys Thr
                325                 330                 335

Ile Glu Glu Ser Asp Ile Asn Arg Leu Pro Tyr Leu Arg Cys Val Met
            340                 345                 350

Lys Glu Thr Leu Arg Ile His Pro Pro Val Pro Phe Leu Ile Pro Arg
        355                 360                 365

Lys Val Glu Gln Ser Val Glu Val Cys Gly Tyr Asn Val Pro Lys Gly
    370                 375                 380

Ser Gln Val Leu Val Asn Ala Trp Ala Ile Gly Arg Asp Glu Thr Val
385                 390                 395                 400

Trp Asp Asp Ala Leu Ala Phe Lys Pro Glu Arg Phe Met Glu Ser Glu
                405                 410                 415

Leu Asp Ile Arg Gly Arg Asp Phe Glu Leu Ile Pro Phe Gly Ala Gly
            420                 425                 430

Arg Arg Ile Cys Pro Gly Leu Pro Leu Ala Leu Arg Thr Val Pro Leu
        435                 440                 445

Met Leu Gly Ser Leu Leu Asn Ser Phe Asn Trp Lys Leu Glu Gly Gly
    450                 455                 460

Met Ala Pro Lys Asp Leu Asp Met Glu Glu Lys Phe Gly Ile Thr Leu
465                 470                 475                 480

Gln Lys Ala His Pro Leu Arg Ala Val Pro Ser Thr Leu
                485                 490
```

<210> SEQ ID NO 18
<211> LENGTH: 714
<212> TYPE: PRT
<213> ORGANISM: Catharanthous roseus

<400> SEQUENCE: 18

| Met | Asp | Ser | Ser | Ser | Glu | Lys | Leu | Ser | Pro | Phe | Glu | Leu | Met | Ser | Ala |
|-----|-----|-----|-----|-----|-----|-----|-----|-----|-----|-----|-----|-----|-----|-----|-----|
| 1   |     |     |     | 5   |     |     |     |     | 10  |     |     |     |     | 15  |     |

| Ile | Leu | Lys | Gly | Ala | Lys | Leu | Asp | Gly | Ser | Asn | Ser | Ser | Asp | Ser | Gly |
|     |     |     | 20  |     |     |     |     | 25  |     |     |     |     | 30  |     |     |

| Val | Ala | Val | Ser | Pro | Ala | Val | Met | Ala | Met | Leu | Leu | Glu | Asn | Lys | Glu |
|     |     | 35  |     |     |     |     | 40  |     |     |     |     | 45  |     |     |     |

| Leu | Val | Met | Ile | Leu | Thr | Thr | Ser | Val | Ala | Val | Leu | Ile | Gly | Cys | Val |
| 50  |     |     |     |     | 55  |     |     |     |     | 60  |     |     |     |     |     |

| Val | Val | Leu | Ile | Trp | Arg | Arg | Ser | Ser | Gly | Ser | Gly | Lys | Lys | Val | Val |
| 65  |     |     |     |     | 70  |     |     |     |     | 75  |     |     |     |     | 80  |

| Glu | Pro | Pro | Lys | Leu | Ile | Val | Pro | Lys | Ser | Val | Val | Glu | Pro | Glu | Glu |
|     |     |     |     | 85  |     |     |     |     | 90  |     |     |     |     | 95  |     |

| Ile | Asp | Glu | Gly | Lys | Lys | Lys | Phe | Thr | Ile | Phe | Phe | Gly | Thr | Gln | Thr |
|     |     |     |     | 100 |     |     |     |     | 105 |     |     |     |     | 110 |     |

| Gly | Thr | Ala | Glu | Gly | Phe | Ala | Lys | Ala | Leu | Ala | Glu | Glu | Ala | Lys | Ala |
|     |     |     |     | 115 |     |     |     |     | 120 |     |     |     |     | 125 |     |

| Arg | Tyr | Glu | Lys | Ala | Val | Ile | Lys | Val | Ile | Asp | Ile | Asp | Asp | Tyr | Ala |
|     | 130 |     |     |     |     | 135 |     |     |     |     | 140 |     |     |     |     |

| Ala | Asp | Asp | Glu | Glu | Tyr | Glu | Glu | Lys | Phe | Arg | Lys | Glu | Thr | Leu | Ala |
| 145 |     |     |     |     | 150 |     |     |     |     | 155 |     |     |     |     | 160 |

| Phe | Phe | Ile | Leu | Ala | Thr | Tyr | Gly | Asp | Gly | Glu | Pro | Thr | Asp | Asn | Ala |
|     |     |     |     | 165 |     |     |     |     | 170 |     |     |     |     | 175 |     |

| Ala | Arg | Phe | Tyr | Lys | Trp | Phe | Val | Glu | Gly | Asn | Asp | Arg | Gly | Asp | Trp |
|     |     |     | 180 |     |     |     |     | 185 |     |     |     |     | 190 |     |     |

| Leu | Lys | Asn | Leu | Gln | Tyr | Gly | Val | Phe | Gly | Leu | Gly | Asn | Arg | Gln | Tyr |
|     |     |     | 195 |     |     |     |     | 200 |     |     |     |     | 205 |     |     |

| Glu | His | Phe | Asn | Lys | Ile | Ala | Lys | Val | Val | Asp | Glu | Lys | Val | Ala | Glu |
|     | 210 |     |     |     |     | 215 |     |     |     |     | 220 |     |     |     |     |

| Gln | Gly | Gly | Lys | Arg | Ile | Val | Pro | Leu | Val | Leu | Gly | Asp | Asp | Asp | Gln |
| 225 |     |     |     |     | 230 |     |     |     |     | 235 |     |     |     |     | 240 |

| Cys | Ile | Glu | Asp | Asp | Phe | Ala | Ala | Trp | Arg | Glu | Asn | Val | Trp | Pro | Glu |
|     |     |     |     | 245 |     |     |     |     | 250 |     |     |     |     | 255 |     |

| Leu | Asp | Asn | Leu | Leu | Arg | Asp | Glu | Asp | Asp | Thr | Thr | Val | Ser | Thr | Thr |
|     |     |     | 260 |     |     |     |     | 265 |     |     |     |     | 270 |     |     |

| Tyr | Thr | Ala | Ala | Ile | Pro | Glu | Tyr | Arg | Val | Val | Phe | Pro | Asp | Lys | Ser |
|     |     | 275 |     |     |     |     | 280 |     |     |     |     | 285 |     |     |     |

| Asp | Ser | Leu | Ile | Ser | Glu | Ala | Asn | Gly | His | Ala | Asn | Gly | Tyr | Ala | Asn |
|     | 290 |     |     |     |     | 295 |     |     |     |     | 300 |     |     |     |     |

| Gly | Asn | Thr | Val | Tyr | Asp | Ala | Gln | His | Pro | Cys | Arg | Ser | Asn | Val | Ala |
| 305 |     |     |     |     | 310 |     |     |     |     | 315 |     |     |     |     | 320 |

| Val | Arg | Lys | Glu | Leu | His | Thr | Pro | Ala | Ser | Asp | Arg | Ser | Cys | Thr | His |
|     |     |     |     | 325 |     |     |     |     | 330 |     |     |     |     | 335 |     |

| Leu | Asp | Phe | Asp | Ile | Ala | Gly | Thr | Gly | Leu | Ser | Tyr | Gly | Thr | Gly | Asp |
|     |     |     | 340 |     |     |     |     | 345 |     |     |     |     | 350 |     |     |

| His | Val | Gly | Val | Tyr | Cys | Asp | Asn | Leu | Ser | Glu | Thr | Val | Glu | Glu | Ala |
|     |     | 355 |     |     |     |     | 360 |     |     |     |     | 365 |     |     |     |

| Glu | Arg | Leu | Leu | Asn | Leu | Pro | Pro | Glu | Thr | Tyr | Phe | Ser | Leu | His | Ala |
|     | 370 |     |     |     |     | 375 |     |     |     |     | 380 |     |     |     |     |

-continued

Asp Lys Glu Asp Gly Thr Pro Leu Ala Gly Ser Ser Leu Pro Pro Pro
385                 390                 395                 400

Phe Pro Pro Cys Thr Leu Arg Thr Ala Leu Thr Arg Tyr Ala Asp Leu
            405                 410                 415

Leu Asn Thr Pro Lys Lys Ser Ala Leu Leu Ala Leu Ala Ala Tyr Ala
        420                 425                 430

Ser Asp Pro Asn Glu Ala Asp Arg Leu Lys Tyr Leu Ala Ser Pro Ala
    435                 440                 445

Gly Lys Asp Glu Tyr Ala Gln Ser Leu Val Ala Asn Gln Arg Ser Leu
450                 455                 460

Leu Glu Val Met Ala Glu Phe Pro Ser Ala Lys Pro Pro Leu Gly Val
465                 470                 475                 480

Phe Phe Ala Ala Ile Ala Pro Arg Leu Gln Pro Arg Phe Tyr Ser Ile
            485                 490                 495

Ser Ser Ser Pro Arg Met Ala Pro Ser Arg Ile His Val Thr Cys Ala
        500                 505                 510

Leu Val Tyr Glu Lys Thr Pro Gly Gly Arg Ile His Lys Gly Val Cys
    515                 520                 525

Ser Thr Trp Met Lys Asn Ala Ile Pro Leu Glu Glu Ser Arg Asp Cys
530                 535                 540

Ser Trp Ala Pro Ile Phe Val Arg Gln Ser Asn Phe Lys Leu Pro Ala
545                 550                 555                 560

Asp Pro Lys Val Pro Val Ile Met Ile Gly Pro Gly Thr Gly Leu Ala
            565                 570                 575

Pro Phe Arg Gly Phe Leu Gln Glu Arg Leu Ala Leu Lys Glu Glu Gly
        580                 585                 590

Ala Glu Leu Gly Thr Ala Val Phe Phe Phe Gly Cys Arg Asn Arg Lys
    595                 600                 605

Met Asp Tyr Ile Tyr Glu Asp Glu Leu Asn His Phe Leu Glu Ile Gly
610                 615                 620

Ala Leu Ser Glu Leu Leu Val Ala Phe Ser Arg Glu Gly Pro Thr Lys
625                 630                 635                 640

Gln Tyr Val Gln His Lys Met Ala Glu Lys Ala Ser Asp Ile Trp Arg
            645                 650                 655

Met Ile Ser Asp Gly Ala Tyr Val Tyr Val Cys Gly Asp Ala Lys Gly
        660                 665                 670

Met Ala Arg Asp Val His Arg Thr Leu His Thr Ile Ala Gln Glu Gln
    675                 680                 685

Gly Ser Met Asp Ser Thr Gln Ala Glu Gly Phe Val Lys Asn Leu Gln
690                 695                 700

Met Thr Gly Arg Tyr Leu Arg Asp Val Trp
705                 710

<210> SEQ ID NO 19
<211> LENGTH: 323
<212> TYPE: PRT
<213> ORGANISM: Aspergillus terreus

<400> SEQUENCE: 19

Met Ser Leu Val Ser Gly Pro Gly Arg Ala Thr Gly Ala His Ala Asp
1               5                   10                  15

Gln Glu Leu Cys Val Gln Lys His Val Glu Tyr Ile Lys Asn Leu Asp
            20                  25                  30

Ser Arg Arg Asp Glu Leu Glu Tyr Trp Leu Thr Glu His Leu Arg Leu
        35                  40                  45

Asn Gly Val Tyr Trp Gly Leu Thr Ala Leu Cys Leu Leu Gly His Pro
            50                  55                  60

Glu Ala Leu Pro Arg Glu Asp Thr Ile Asn Phe Val Leu Ser Cys Gln
 65                  70                  75                  80

Arg Glu Asn Gly Gly Phe Ala Ala Pro Gly His Asp Ala His Met
                85                  90                  95

Leu Tyr Thr Val Ser Ala Val Gln Ile Leu Val Thr Leu Asp Ala Val
                100                 105                 110

Asp Glu Leu Glu Lys Arg Gly Leu Gly Gly Lys Glu Lys Val Gly Ser
            115                 120                 125

Phe Ile Ala Gly Leu Gln Asp Lys Asp Thr Gly Ser Phe Met Gly Asp
130                 135                 140

Glu Trp Gly Glu Leu Asp Thr Arg Phe Leu Tyr Gly Ala Phe Asn Ala
145                 150                 155                 160

Leu Ser Leu Leu Gly Leu Leu Asp Thr Ile Asp Val Pro Lys Ala Val
                165                 170                 175

Ser Tyr Ile Gln Lys Cys Glu Asn Leu Asp Gly Ala Tyr Gly Ile Arg
            180                 185                 190

Pro Gly Ala Glu Ser His Ala Gly Gln Val Phe Thr Cys Val Ala Ala
            195                 200                 205

Leu Ala Ile Ala Gly Arg Leu Asp Leu Val Asn Lys Asp Arg Leu Gly
210                 215                 220

Gly Trp Leu Ser Glu Arg Gln Leu Glu Asn Gly Gly Phe Asn Gly Arg
225                 230                 235                 240

Pro Glu Lys Leu Glu Asp Ala Cys Tyr Ser Trp Trp Val Gly Ser Ser
                245                 250                 255

Leu Ala Met Ile Asp Lys Leu His Trp Ile Asp Gly Lys Lys Leu Ala
            260                 265                 270

Ser Phe Ile Leu Arg Cys Gln Asp Pro Glu Ala Gly Gly Phe Ser Asp
            275                 280                 285

Arg Pro Gly Asn Met Val Asp Val Phe His Thr His Phe Ala Ile Ala
            290                 295                 300

Gly Leu Ser Leu Leu Asn Lys Phe Thr Ser Arg Glu Arg Ala Gln Val
305                 310                 315                 320

Asp Glu Cys

<210> SEQ ID NO 20
<211> LENGTH: 472
<212> TYPE: PRT
<213> ORGANISM: Neosartorya fumigata

<400> SEQUENCE: 20

Met Ser Ile Gly Ala Glu Ile Asp Ser Leu Val Pro Ala Pro Pro Gly
1               5                   10                  15

Leu Asn Gly Thr Ala Ala Gly Tyr Pro Ala Lys Thr Gln Lys Glu Leu
            20                  25                  30

Ser Asn Gly Asp Phe Asp Ala His Asp Gly Leu Ser Leu Ala Gln Leu
        35                  40                  45

Thr Pro Tyr Asp Val Leu Thr Ala Ala Leu Pro Leu Pro Ala Pro Ala
    50                  55                  60

Ser Ser Thr Gly Phe Trp Trp Arg Glu Thr Gly Pro Val Met Ser Lys
65                  70                  75                  80

Leu Leu Ala Lys Ala Asn Tyr Pro Leu Tyr Thr His Tyr Lys Tyr Leu
                85                  90                  95

```
Met Leu Tyr His Thr His Ile Leu Pro Leu Gly Pro Arg Pro Pro
                100                 105                 110

Leu Glu Asn Ser Thr His Pro Ser Pro Ser Asn Ala Pro Trp Arg Ser
            115                 120                 125

Phe Leu Thr Asp Asp Phe Thr Pro Leu Glu Pro Ser Trp Asn Val Asn
130                 135                 140

Gly Asn Ser Glu Ala Gln Ser Thr Ile Arg Leu Gly Ile Glu Pro Ile
145                 150                 155                 160

Gly Phe Glu Ala Gly Ala Ala Asp Pro Phe Asn Gln Ala Ala Val
                165                 170                 175

Thr Gln Phe Met His Ser Tyr Glu Ala Thr Glu Val Gly Ala Thr Leu
                180                 185                 190

Thr Leu Phe Glu His Phe Arg Asn Asp Met Phe Val Gly Pro Glu Thr
                195                 200                 205

Tyr Ala Ala Leu Arg Ala Lys Ile Pro Glu Gly Glu His Thr Thr Gln
                210                 215                 220

Ser Phe Leu Ala Phe Asp Leu Asp Ala Gly Arg Val Thr Thr Lys Ala
225                 230                 235                 240

Tyr Phe Phe Pro Ile Leu Met Ser Leu Lys Thr Gly Gln Ser Thr Thr
                245                 250                 255

Lys Val Val Ser Asp Ser Ile Leu His Leu Ala Leu Lys Ser Glu Val
                260                 265                 270

Trp Gly Val Gln Thr Ile Ala Ala Met Ser Val Met Glu Ala Trp Ile
                275                 280                 285

Gly Ser Tyr Gly Gly Ala Ala Lys Thr Glu Met Ile Ser Val Asp Cys
                290                 295                 300

Val Asn Glu Ala Asp Ser Arg Ile Lys Ile Tyr Val Arg Met Pro His
305                 310                 315                 320

Thr Ser Leu Arg Lys Val Lys Glu Ala Tyr Cys Leu Gly Gly Arg Leu
                325                 330                 335

Thr Asp Glu Asn Thr Lys Glu Gly Leu Lys Leu Leu Asp Glu Leu Trp
                340                 345                 350

Arg Thr Val Phe Gly Ile Asp Asp Glu Asp Ala Glu Leu Pro Gln Asn
                355                 360                 365

Ser His Arg Thr Ala Gly Thr Ile Phe Asn Phe Glu Leu Arg Pro Gly
                370                 375                 380

Lys Trp Phe Pro Glu Pro Lys Val Tyr Leu Pro Val Arg His Tyr Cys
385                 390                 395                 400

Glu Ser Asp Met Gln Ile Ala Ser Arg Leu Gln Thr Phe Phe Gly Arg
                405                 410                 415

Leu Gly Trp His Asn Met Glu Lys Asp Tyr Cys Lys His Leu Glu Asp
                420                 425                 430

Leu Phe Pro His His Pro Leu Ser Ser Thr Gly Thr His Thr Phe
                435                 440                 445

Leu Ser Phe Ser Tyr Lys Lys Gln Lys Gly Val Tyr Met Thr Met Tyr
                450                 455                 460

Tyr Asn Leu Arg Val Tyr Ser Thr
465                 470

<210> SEQ ID NO 21
<211> LENGTH: 401
<212> TYPE: PRT
<213> ORGANISM: Artemisia capillaris
```

<400> SEQUENCE: 21

| | | | | | | | | | | | | | | |
|---|---|---|---|---|---|---|---|---|---|---|---|---|---|---|
| Met | Ala | Ser | Leu | Thr | Val | Gly | Ser | Leu | Cys | Lys | Pro | Thr | Ser | Asn | Gly |
| 1 | | | | 5 | | | | | 10 | | | | | 15 | |
| Leu | Ser | Ile | Leu | Val | Thr | Ser | Ser | Ser | Leu | Ser | Thr | Gly | Ala | His | |
| | | | 20 | | | | | 25 | | | | | 30 | | |
| Ala | Ser | Asn | Phe | Leu | Arg | Ile | Ser | Lys | Val | Glu | Asn | Val | Ser | Ala | |
| | | 35 | | | | | 40 | | | | | 45 | | | |
| Gln | Phe | Gln | Arg | Arg | Gly | Tyr | Lys | Asn | His | Phe | Gly | Gln | Ser | Leu | His |
| | 50 | | | | | 55 | | | | | 60 | | | | |
| Glu | Pro | Leu | Ser | Leu | Gln | Lys | Met | Asp | Glu | Glu | Lys | Phe | Lys | Leu | Asn |
| 65 | | | | | 70 | | | | | 75 | | | | | 80 |
| Ala | Ala | Ser | Thr | Asn | Asn | Pro | Gln | Phe | Asp | Ala | Thr | His | Asp | Leu | Val |
| | | | | 85 | | | | | 90 | | | | | 95 | |
| Lys | Pro | Thr | Glu | Ser | Val | Ile | Ser | Phe | Leu | Glu | Val | Leu | Phe | Arg | Phe |
| | | | 100 | | | | | 105 | | | | | 110 | | |
| Ile | Arg | Pro | Tyr | Ala | Ala | Val | Gly | Thr | Val | Leu | Cys | Ile | Ala | Ser | Met |
| | | 115 | | | | | 120 | | | | | 125 | | | |
| Ser | Leu | Leu | Thr | Val | Glu | Lys | Leu | Ser | Asp | Phe | Ser | Pro | Leu | Phe | Phe |
| | 130 | | | | | 135 | | | | | 140 | | | | |
| Met | Lys | Val | Leu | Gln | Ala | Leu | Val | Gly | Ala | Met | Phe | Met | Gln | Met | Trp |
| 145 | | | | | 150 | | | | | 155 | | | | | 160 |
| Val | Cys | Gly | Ile | Asn | Gln | Ile | Cys | Asp | Ile | Glu | Leu | Asp | Lys | Ile | Asn |
| | | | | 165 | | | | | 170 | | | | | 175 | |
| Lys | Pro | Ser | Leu | Pro | Leu | Ala | Ser | Gly | Glu | Leu | Ser | Met | Thr | Thr | Ala |
| | | | 180 | | | | | 185 | | | | | 190 | | |
| Ile | Thr | Val | Ser | Ala | Leu | Ser | Ala | Ile | Met | Ser | Phe | Ser | Ile | Gly | Trp |
| | | 195 | | | | | 200 | | | | | 205 | | | |
| Ile | Ala | Ser | Pro | Ala | Leu | Phe | Trp | Gly | Phe | Val | Gly | Trp | Phe | Val | Val |
| | 210 | | | | | 215 | | | | | 220 | | | | |
| Gly | Thr | Ala | Tyr | Ser | Ala | Asn | Leu | Pro | Trp | Leu | Arg | Trp | Lys | Arg | Phe |
| 225 | | | | | 230 | | | | | 235 | | | | | 240 |
| Pro | Leu | Thr | Ser | Ala | Phe | Tyr | Met | Leu | Cys | Ser | Arg | Ala | Leu | Val | Val |
| | | | | 245 | | | | | 250 | | | | | 255 | |
| Pro | Ile | Gly | Tyr | Tyr | Leu | His | Met | Gln | Lys | Ser | Ile | His | Gly | Gly | Ser |
| | | | 260 | | | | | 265 | | | | | 270 | | |
| Ala | Leu | Leu | Ser | Arg | Pro | Ile | Leu | Phe | Ala | Val | Gly | Met | Leu | Ser | Ala |
| | | 275 | | | | | 280 | | | | | 285 | | | |
| Phe | Cys | Ile | Ser | Thr | Ile | Phe | Phe | Lys | Asp | Ile | Pro | Asp | Ile | Glu | Gly |
| | 290 | | | | | 295 | | | | | 300 | | | | |
| Asp | Arg | Met | His | Gly | Ile | Lys | Ser | Leu | Ala | Ile | Thr | Leu | Gly | Glu | Lys |
| 305 | | | | | 310 | | | | | 315 | | | | | 320 |
| Arg | Thr | Phe | Trp | Met | Cys | Ile | Trp | Ile | Leu | Glu | Ile | Ala | Tyr | Val | Ala |
| | | | | 325 | | | | | 330 | | | | | 335 | |
| Ala | Ala | Phe | Phe | Gly | Ala | Thr | Ser | Pro | Ile | Thr | Trp | Ser | Lys | Tyr | Ile |
| | | | 340 | | | | | 345 | | | | | 350 | | |
| Thr | Val | Ile | Ser | His | Leu | Ala | Met | Ala | Leu | Ala | Leu | Trp | Thr | Arg | Ala |
| | | 355 | | | | | 360 | | | | | 365 | | | |
| Lys | Ser | Thr | Asp | Val | Lys | Asn | Lys | Asp | Ala | Val | Gln | Ser | Met | Tyr | Tyr |
| | 370 | | | | | 375 | | | | | 380 | | | | |
| Phe | Leu | Trp | Gln | Leu | Phe | Phe | Ala | Glu | Tyr | Gly | Leu | Ile | Ala | Leu | Val |
| 385 | | | | | 390 | | | | | 395 | | | | | 400 |
| Arg | | | | | | | | | | | | | | | |

<210> SEQ ID NO 22
<211> LENGTH: 541
<212> TYPE: PRT
<213> ORGANISM: Mentha citrata

<400> SEQUENCE: 22

```
Met Ala Thr Arg Arg Ser Gly Asn Tyr His Pro Ser Val Trp Asp Phe
 1               5                  10                  15

Asp Phe Ile Gln Ser Leu Asp Thr Asp His Tyr Lys Glu Glu Lys Gln
             20                  25                  30

Leu Glu Arg Glu Glu Glu Leu Ile Met Glu Val Lys Lys Leu Leu Gly
         35                  40                  45

Ala Lys Met Glu Ala Thr Lys Gln Leu Glu Leu Ile Asp Asp Leu Gln
 50                  55                  60

Asn Leu Gly Leu Ser Tyr Phe Phe Arg Asp Glu Ile Lys Asn Ile Leu
 65                  70                  75                  80

Asn Ser Ile Tyr Lys Ile Phe Gln Asn Asn Ser Thr Lys Val Gly
                 85                  90                  95

Asp Leu His Phe Thr Ser Leu Gly Phe Arg Leu Leu Arg Gln His Gly
                100                 105                 110

Phe Asn Val Ser Gln Gly Val Phe Asp Cys Phe Lys Asn Glu His Gly
            115                 120                 125

Ser Asp Phe Glu Lys Thr Leu Ile Gly Glu Asp Thr Lys Gly Val Leu
130                 135                 140

Gln Leu Tyr Glu Ala Ser Phe Leu Leu Arg Glu Gly Glu Asp Thr Leu
145                 150                 155                 160

Glu Val Ala Arg Lys Phe Ser Thr Glu Phe Leu Glu Glu Lys Leu Lys
                165                 170                 175

Ala Gly Ile Asp Gly Asp Asn Leu Ser Ser Ser Ile Gly His Ser Leu
            180                 185                 190

Glu Ile Pro Leu His Trp Arg Ile Gln Arg Leu Glu Gly Arg Trp Phe
        195                 200                 205

Leu Asp Ala Tyr Ser Arg Arg Lys Asp Met Asn Pro Ile Ile Phe Glu
210                 215                 220

Leu Ala Lys Leu Asp Phe Asn Ile Ile Gln Ala Thr Gln Gln Glu Glu
225                 230                 235                 240

Leu Lys Asp Leu Ser Arg Trp Trp Asn Asp Ser Ser Leu Pro Gln Lys
                245                 250                 255

Leu Pro Phe Val Arg Asp Arg Leu Val Glu Ser Tyr Tyr Trp Ala Leu
            260                 265                 270

Gly Leu Phe Glu Ala His Lys Phe Gly Tyr Glu Arg Lys Thr Ala Ala
        275                 280                 285

Lys Ile Ile Thr Leu Ile Thr Ala Leu Asp Asp Val Tyr Asp Ile Tyr
290                 295                 300

Gly Thr Leu Asp Glu Leu Gln Leu Phe Thr His Val Ile Arg Arg Trp
305                 310                 315                 320

Asp Thr Glu Ser Ala Thr Gln Leu Pro Tyr Tyr Leu Gln Leu Phe Tyr
                325                 330                 335

Phe Val Leu Tyr Asn Phe Val Ser Glu Val Ala Tyr His Ile Leu Lys
            340                 345                 350

Glu Glu Gly Phe Ile Ser Ile Pro Phe Leu His Arg Ala Trp Val Asp
        355                 360                 365

Leu Val Glu Gly Tyr Leu Gln Glu Ala Lys Trp Tyr Tyr Thr Lys Tyr
370                 375                 380
```

Thr Pro Thr Met Glu Glu Tyr Leu Asn Tyr Ala Ser Ile Thr Ile Gly
385                 390                 395                 400

Ala Pro Ala Val Ile Ser Gln Ile Tyr Phe Met Leu Ala Lys Ser Lys
            405                 410                 415

Glu Lys Pro Val Ile Glu Ser Phe Tyr Glu Tyr Asp Glu Ile Ile Arg
            420                 425                 430

Leu Ser Gly Met Leu Val Arg Leu Pro Asp Asp Leu Gly Thr Leu Pro
            435                 440                 445

Phe Glu Met Lys Arg Gly Asp Val Ala Lys Ser Ile Gln Ile Tyr Met
450                 455                 460

Lys Glu Gln Asn Ala Thr Arg Glu Glu Ala Glu His Val Arg Phe
465                 470                 475                 480

Met Ile Arg Glu Ala Trp Lys Glu Met Asn Thr Thr Met Ala Ala Asn
            485                 490                 495

Ser Asp Leu Arg Gly Asp Val Val Met Ala Ala Asn Leu Gly Arg
            500                 505                 510

Asp Ala Gln Phe Met Tyr Leu Asp Gly Asp Gly Asn His Ser Gln Leu
            515                 520                 525

Gln His Arg Ile Ala Asn Leu Leu Phe Lys Pro Tyr Val
530                 535                 540

<210> SEQ ID NO 23
<211> LENGTH: 544
<212> TYPE: PRT
<213> ORGANISM: Mentha citrata

<400> SEQUENCE: 23

Met Ala Thr Arg Arg Ser Gly Asn Tyr His Pro Ser Val Trp Asp Phe
1               5                   10                  15

Asp Phe Ile Gln Ser Leu Asp Thr Asp His Tyr Lys Glu Glu Lys Gln
            20                  25                  30

Leu Glu Arg Glu Glu Leu Ile Met Glu Val Lys Lys Leu Leu Gly
        35                  40                  45

Ala Lys Met Glu Ala Thr Lys Gln Leu Glu Leu Ile Asp Asp Leu Gln
50                  55                  60

Asn Leu Gly Leu Ser Tyr Phe Phe Arg Asp Glu Ile Lys Asn Ile Leu
65                  70                  75                  80

Asn Ser Ile Tyr Lys Ile Phe Gln Asn Asn Ser Thr Lys Val Gly
                85                  90                  95

Asp Leu His Phe Thr Ser Leu Gly Phe Arg Leu Leu Arg Gln His Gly
            100                 105                 110

Phe Asn Val Ser Gln Gly Val Phe Asp Cys Phe Lys Asn Glu His Gly
        115                 120                 125

Ser Asp Phe Glu Lys Thr Leu Ile Gly Glu Asp Thr Lys Gly Val Leu
130                 135                 140

Gln Leu Tyr Glu Ala Ser Phe Leu Leu Arg Glu Gly Glu Asp Thr Leu
145                 150                 155                 160

Glu Val Ala Arg Lys Phe Ser Thr Glu Phe Leu Glu Glu Lys Leu Lys
            165                 170                 175

Ala Gly Ile Asp Gly Asp Asn Leu Ser Ser Ile Gly His Ser Leu
                180                 185                 190

Glu Ile Pro Leu His Trp Arg Ile Gln Arg Leu Glu Glu Arg Trp Phe
        195                 200                 205

Leu Asp Ala Tyr Ser Arg Arg Lys Asp Met Asn Pro Ile Ile Phe Glu

```
                        210                 215                 220
Leu Ala Lys Leu Asp Phe Asn Ile Ile Gln Ala Thr Gln Gln Glu Glu
225                 230                 235                 240

Leu Lys Asp Leu Ser Arg Trp Trp Asn Asp Ser Ser Leu Pro Gln Lys
                245                 250                 255

Leu Pro Phe Val Arg Asp Arg Leu Val Glu Ser Tyr Tyr Trp Ala Leu
                260                 265                 270

Gly Leu Phe Glu Ala His Lys Phe Gly Tyr Glu Arg Lys Thr Ala Ala
            275                 280                 285

Lys Ile Ile Thr Leu Ile Thr Ala Leu Asp Asp Val Tyr Asp Ile Tyr
        290                 295                 300

Gly Thr Leu Asp Glu Leu Gln Leu Phe Thr His Val Ile Arg Arg Trp
305                 310                 315                 320

Asp Thr Glu Ser Ala Thr Gln Leu Pro Tyr Tyr Leu Gln Leu Phe Tyr
                325                 330                 335

Phe Val Leu Tyr Asn Phe Val Ser Glu Val Ala Tyr His Ile Leu Lys
                340                 345                 350

Glu Glu Gly Phe Ile Ser Ile Pro Phe Leu His Arg Ala Trp Val Asp
            355                 360                 365

Leu Val Glu Gly Tyr Leu Gln Glu Ala Lys Trp Tyr Tyr Thr Lys Tyr
        370                 375                 380

Thr Pro Thr Met Glu Glu Tyr Leu Asn Tyr Ala Ser Ile Thr Ile Gly
385                 390                 395                 400

Ala Pro Ala Val Ile Ser Gln Ile Tyr Phe Met Leu Ala Lys Ser Lys
                405                 410                 415

Glu Lys Pro Val Ile Glu Ser Phe Tyr Glu Tyr Asp Glu Ile Ile Arg
                420                 425                 430

Leu Ser Gly Met Leu Val Arg Leu Pro Asp Asp Leu Gly Thr Leu Pro
            435                 440                 445

Phe Glu Met Lys Arg Gly Asp Val Ala Lys Ser Ile Gln Ile Tyr Met
        450                 455                 460

Lys Glu Gln Asn Ala Thr Arg Glu Glu Ala Glu His Val Arg Phe
465                 470                 475                 480

Met Ile Arg Glu Ala Trp Lys Glu Met Asn Thr Met Ala Ala Asn
                485                 490                 495

Ser Asp Leu Arg Gly Asp Val Val Met Ala Ala Ala Asn Leu Gly Arg
                500                 505                 510

Asp Ala Gln Phe Met Tyr Leu Asp Gly Asp Gly Asn His Ser Gln Leu
            515                 520                 525

Gln His Arg Ile Ala Asn Leu Leu Phe Lys Pro Tyr Val Ser Lys Leu
        530                 535                 540

<210> SEQ ID NO 24
<211> LENGTH: 544
<212> TYPE: PRT
<213> ORGANISM: Mentha spicata

<400> SEQUENCE: 24

Met Glu Arg Arg Ser Gly Asn Tyr Asn Pro Ser Arg Trp Asp Val Asn
1               5                   10                  15

Phe Ile Gln Ser Leu Leu Ser Asp Tyr Lys Glu Asp Lys His Val Ile
                20                  25                  30

Arg Ala Ser Glu Leu Val Thr Leu Val Lys Met Glu Leu Glu Lys Glu
            35                  40                  45
```

```
Thr Asp Gln Ile Arg Gln Leu Glu Leu Ile Asp Asp Leu Gln Arg Met
    50              55                  60

Gly Leu Ser Asp His Phe Gln Asn Glu Phe Lys Glu Ile Leu Ser Ser
65              70                  75                  80

Ile Tyr Leu Asp His His Tyr Lys Asn Pro Phe Pro Lys Glu Glu
                85                  90                  95

Arg Asp Leu Tyr Ser Thr Ser Leu Ala Phe Arg Leu Leu Arg Glu His
            100                 105                 110

Gly Phe Gln Val Ala Gln Glu Val Phe Asp Ser Phe Lys Asn Glu Glu
        115                 120                 125

Gly Glu Phe Lys Glu Ser Leu Ser Asp Asp Thr Arg Gly Leu Leu Gln
    130                 135                 140

Leu Tyr Glu Ala Ser Phe Leu Leu Thr Glu Gly Glu Thr Thr Leu Glu
145                 150                 155                 160

Ser Ala Arg Glu Phe Ala Thr Lys Phe Leu Glu Glu Lys Val Asn Glu
                165                 170                 175

Gly Gly Val Asp Gly Asp Leu Leu Thr Arg Ile Ala Tyr Ser Leu Asp
            180                 185                 190

Ile Pro Leu His Trp Arg Ile Lys Arg Pro Asn Ala Pro Val Trp Ile
        195                 200                 205

Glu Trp Tyr Arg Lys Arg Pro Asp Met Asn Pro Val Val Leu Glu Leu
    210                 215                 220

Ala Ile Leu Asp Leu Asn Ile Val Gln Ala Gln Phe Gln Glu Glu Leu
225                 230                 235                 240

Lys Glu Ser Phe Arg Trp Trp Arg Asn Thr Gly Phe Val Glu Lys Leu
                245                 250                 255

Pro Phe Ala Arg Asp Arg Leu Val Glu Cys Tyr Phe Trp Asn Thr Gly
            260                 265                 270

Ile Ile Glu Pro Arg Gln His Ala Ser Ala Arg Ile Met Met Gly Lys
        275                 280                 285

Val Asn Ala Leu Ile Thr Val Ile Asp Asp Ile Tyr Asp Val Tyr Gly
    290                 295                 300

Thr Leu Glu Glu Leu Glu Gln Phe Thr Asp Leu Ile Arg Arg Trp Asp
305                 310                 315                 320

Ile Asn Ser Ile Asp Gln Leu Pro Asp Tyr Met Gln Leu Cys Phe Leu
                325                 330                 335

Ala Leu Asn Asn Phe Val Asp Asp Thr Ser Tyr Asp Val Met Lys Glu
            340                 345                 350

Lys Gly Val Asn Val Ile Pro Tyr Leu Arg Gln Ser Trp Val Asp Leu
        355                 360                 365

Ala Asp Lys Tyr Met Val Glu Ala Arg Trp Phe Tyr Gly His Lys
    370                 375                 380

Pro Ser Leu Glu Glu Tyr Leu Glu Asn Ser Trp Gln Ser Ile Ser Gly
385                 390                 395                 400

Pro Cys Met Leu Thr His Ile Phe Phe Arg Val Thr Asp Ser Phe Thr
                405                 410                 415

Lys Glu Thr Val Asp Ser Leu Tyr Lys Tyr His Asp Leu Val Arg Trp
            420                 425                 430

Ser Ser Phe Val Leu Arg Leu Ala Asp Asp Leu Gly Thr Ser Val Glu
        435                 440                 445

Glu Val Ser Arg Gly Asp Val Pro Lys Ser Leu Gln Cys Tyr Met Ser
    450                 455                 460

Asp Tyr Asn Ala Ser Glu Ala Glu Ala Arg Lys His Val Lys Trp Leu
```

-continued

```
            465                 470                 475                 480
Ile Ala Glu Val Trp Lys Lys Met Asn Ala Glu Arg Val Ser Lys Asp
                    485                 490                 495

Ser Pro Phe Gly Lys Asp Phe Ile Gly Cys Ala Val Asp Leu Gly Arg
                500                 505                 510

Met Ala Gln Leu Met Tyr His Asn Gly Asp Gly His Gly Thr Gln His
            515                 520                 525

Pro Ile Ile His Gln Gln Met Thr Arg Thr Leu Phe Glu Pro Phe Ala
        530                 535                 540

<210> SEQ ID NO 25
<211> LENGTH: 547
<212> TYPE: PRT
<213> ORGANISM: Mentha spicata

<400> SEQUENCE: 25

Met Glu Arg Arg Ser Gly Asn Tyr Asn Pro Ser Arg Trp Asp Val Asn
1               5                   10                  15

Phe Ile Gln Ser Leu Leu Ser Asp Tyr Lys Glu Asp Lys His Val Ile
                20                  25                  30

Arg Ala Ser Glu Leu Val Thr Leu Val Lys Met Glu Leu Glu Lys Glu
            35                  40                  45

Thr Asp Gln Ile Arg Gln Leu Glu Leu Ile Asp Asp Leu Gln Arg Met
        50                  55                  60

Gly Leu Ser Asp His Phe Gln Asn Glu Phe Lys Glu Ile Leu Ser Ser
65              70                  75                  80

Ile Tyr Leu Asp His His Tyr Tyr Lys Asn Pro Phe Pro Lys Glu Glu
                85                  90                  95

Arg Asp Leu Tyr Ser Thr Ser Leu Ala Phe Arg Leu Leu Arg Glu His
            100                 105                 110

Gly Phe Gln Val Ala Gln Glu Val Phe Asp Ser Phe Lys Asn Glu Glu
        115                 120                 125

Gly Glu Phe Lys Glu Ser Leu Ser Asp Asp Thr Arg Gly Leu Leu Gln
    130                 135                 140

Leu Tyr Glu Ala Ser Phe Leu Leu Thr Glu Gly Glu Thr Thr Leu Glu
145                 150                 155                 160

Ser Ala Arg Glu Phe Ala Thr Lys Phe Leu Glu Glu Lys Val Asn Glu
                165                 170                 175

Gly Gly Val Asp Gly Asp Leu Leu Thr Arg Ile Ala Tyr Ser Leu Asp
            180                 185                 190

Ile Pro Leu His Trp Arg Ile Lys Arg Pro Asn Ala Pro Val Trp Ile
        195                 200                 205

Glu Trp Tyr Arg Lys Arg Pro Asp Met Asn Pro Val Val Leu Glu Leu
    210                 215                 220

Ala Ile Leu Asp Leu Asn Ile Val Gln Ala Gln Phe Gln Glu Glu Leu
225                 230                 235                 240

Lys Glu Ser Phe Arg Trp Trp Arg Asn Thr Gly Phe Val Glu Lys Leu
                245                 250                 255

Pro Phe Ala Arg Asp Arg Leu Val Glu Cys Tyr Phe Trp Asn Thr Gly
            260                 265                 270

Ile Ile Glu Pro Arg Gln His Ala Ser Ala Arg Ile Met Met Gly Lys
        275                 280                 285

Val Asn Ala Leu Ile Thr Val Ile Asp Asp Ile Tyr Asp Val Tyr Gly
    290                 295                 300
```

```
Thr Leu Glu Glu Leu Glu Gln Phe Thr Asp Leu Ile Arg Arg Trp Asp
305                 310                 315                 320

Ile Asn Ser Ile Asp Gln Leu Pro Asp Tyr Met Gln Leu Cys Phe Leu
            325                 330                 335

Ala Leu Asn Asn Phe Val Asp Asp Thr Ser Tyr Asp Val Met Lys Glu
        340                 345                 350

Lys Gly Val Asn Val Ile Pro Tyr Leu Arg Gln Ser Trp Val Asp Leu
    355                 360                 365

Ala Asp Lys Tyr Met Val Glu Ala Arg Trp Phe Tyr Gly Gly His Lys
370                 375                 380

Pro Ser Leu Glu Glu Tyr Leu Glu Asn Ser Trp Gln Ser Ile Ser Gly
385                 390                 395                 400

Pro Cys Met Leu Thr His Ile Phe Phe Arg Val Thr Asp Ser Phe Thr
            405                 410                 415

Lys Glu Thr Val Asp Ser Leu Tyr Lys Tyr His Asp Leu Val Arg Trp
        420                 425                 430

Ser Ser Phe Val Leu Arg Leu Ala Asp Asp Leu Gly Thr Ser Val Glu
    435                 440                 445

Glu Val Ser Arg Gly Asp Val Pro Lys Ser Leu Gln Cys Tyr Met Ser
450                 455                 460

Asp Tyr Asn Ala Ser Glu Ala Glu Ala Arg Lys His Val Lys Trp Leu
465                 470                 475                 480

Ile Ala Glu Val Trp Lys Lys Met Asn Ala Arg Val Ser Lys Asp
            485                 490                 495

Ser Pro Phe Gly Lys Asp Phe Ile Gly Cys Ala Val Asp Leu Gly Arg
            500                 505                 510

Met Ala Gln Leu Met Tyr His Asn Gly Asp Gly His Gly Thr Gln His
        515                 520                 525

Pro Ile Ile His Gln Gln Met Thr Arg Thr Leu Phe Glu Pro Phe Ala
530                 535                 540

Ser Lys Leu
545

<210> SEQ ID NO 26
<211> LENGTH: 569
<212> TYPE: PRT
<213> ORGANISM: Ocimum basilicum

<400> SEQUENCE: 26

Met Ser Ser Thr Arg Arg Pro Ser Cys Pro Leu Gln Leu Asp Val
1               5                   10                  15

Glu Pro Arg Arg Ser Gly Asn Tyr Gln Pro Ser Ala Trp Asp Phe Asn
            20                  25                  30

Tyr Ile Gln Ser Leu Asn Asn His Ser Lys Glu Glu Arg His Leu
        35                  40                  45

Glu Arg Lys Ala Lys Leu Ile Glu Glu Val Lys Met Leu Leu Glu Gln
    50                  55                  60

Glu Met Ala Ala Val Gln Gln Leu Glu Leu Ile Glu Asp Leu Lys Asn
65                  70                  75                  80

Leu Gly Leu Ser Tyr Leu Phe Gln Asp Glu Ile Lys Ile Ile Leu Asn
                85                  90                  95

Ser Ile Tyr Asn His His Lys Cys Phe His Asn Asn His Glu Gln Cys
            100                 105                 110

Ile His Val Asn Ser Asp Leu Tyr Phe Val Ala Leu Gly Phe Arg Leu
        115                 120                 125
```

Phe Arg Gln His Gly Phe Lys Val Ser Gln Glu Val Phe Asp Cys Phe
        130                 135                 140

Lys Asn Glu Glu Gly Ser Asp Phe Ser Ala Asn Leu Ala Asp Asp Thr
145                 150                 155                 160

Lys Gly Leu Leu Gln Leu Tyr Glu Ala Ser Tyr Leu Val Thr Glu Asp
                    165                 170                 175

Glu Asp Thr Leu Glu Met Ala Arg Gln Phe Ser Thr Lys Ile Leu Gln
                180                 185                 190

Lys Lys Val Glu Glu Lys Met Ile Glu Lys Glu Asn Leu Leu Ser Trp
            195                 200                 205

Thr Leu His Ser Leu Glu Leu Pro Leu His Trp Arg Ile Gln Arg Leu
    210                 215                 220

Glu Ala Lys Trp Phe Leu Asp Ala Tyr Ala Ser Arg Pro Asp Met Asn
225                 230                 235                 240

Pro Ile Ile Phe Glu Leu Ala Lys Leu Glu Phe Asn Ile Ala Gln Ala
                245                 250                 255

Leu Gln Gln Glu Leu Lys Asp Leu Ser Arg Trp Trp Asn Asp Thr
                260                 265                 270

Gly Ile Ala Glu Lys Leu Pro Phe Ala Arg Asp Arg Ile Val Glu Ser
            275                 280                 285

His Tyr Trp Ala Ile Gly Thr Leu Glu Pro Tyr Gln Tyr Arg Tyr Gln
    290                 295                 300

Arg Ser Leu Ile Ala Lys Ile Ile Ala Leu Thr Thr Val Val Asp Asp
305                 310                 315                 320

Val Tyr Asp Val Tyr Gly Thr Leu Asp Glu Leu Gln Leu Phe Thr Asp
                325                 330                 335

Ala Ile Arg Arg Trp Asp Ile Glu Ser Ile Asn Gln Leu Pro Ser Tyr
                340                 345                 350

Met Gln Leu Cys Tyr Leu Ala Ile Tyr Asn Phe Val Ser Glu Leu Ala
            355                 360                 365

Tyr Asp Ile Phe Arg Asp Lys Gly Phe Asn Ser Leu Pro Tyr Leu His
    370                 375                 380

Lys Ser Trp Leu Asp Leu Val Glu Ala Tyr Phe Val Glu Ala Lys Trp
385                 390                 395                 400

Phe His Asp Gly Tyr Thr Pro Thr Leu Glu Glu Tyr Leu Asn Asn Ser
                405                 410                 415

Lys Ile Thr Ile Ile Cys Pro Ala Ile Val Ser Glu Ile Tyr Phe Ala
                420                 425                 430

Phe Ala Asn Ser Ile Asp Lys Thr Glu Val Glu Ser Ile Tyr Lys Tyr
            435                 440                 445

His Asp Ile Leu Tyr Leu Ser Gly Met Leu Ala Arg Leu Pro Asp Asp
    450                 455                 460

Leu Gly Thr Ser Ser Phe Glu Met Lys Arg Gly Asp Val Ala Lys Ala
465                 470                 475                 480

Ile Gln Cys Tyr Met Lys Glu His Asn Ala Ser Glu Glu Glu Ala Arg
                485                 490                 495

Glu His Ile Arg Phe Leu Met Arg Glu Ala Trp Lys His Met Asn Thr
                500                 505                 510

Ala Ala Ala Ala Asp Asp Cys Pro Phe Glu Ser Asp Leu Val Val Gly
            515                 520                 525

Ala Ala Ser Leu Gly Arg Val Ala Asn Phe Val Tyr Val Glu Gly Asp
    530                 535                 540

```
Gly Phe Gly Val Gln His Ser Lys Ile His Gln Gln Met Ala Glu Leu
545                 550                 555                 560

Leu Phe Tyr Pro Tyr Gln Ser Lys Leu
                565

<210> SEQ ID NO 27
<211> LENGTH: 496
<212> TYPE: PRT
<213> ORGANISM: Mentha spicata

<400> SEQUENCE: 27

Met Glu Leu Gln Ile Ser Ser Ala Ile Ile Leu Val Ala Thr Phe
1               5                   10                  15

Val Ala Ser Leu Leu Ile Lys Gln Trp Arg Lys Ser Glu Ser Arg Gln
                20                  25                  30

Asn Leu Pro Pro Gly Pro Pro Lys Leu Pro Leu Val Gly His Leu His
            35                  40                  45

Leu Leu Trp Gly Lys Leu Pro Gln His Ala Met Ala Asp Met Ala Lys
    50                  55                  60

Lys Tyr Gly Pro Val Thr His Val Gln Leu Gly Glu Val Phe Ser Val
65                  70                  75                  80

Val Leu Ser Ser Arg Glu Ala Thr Lys Glu Ala Met Lys Leu Leu Asp
                85                  90                  95

Pro Ala Cys Ala Asp Arg Phe Glu Ser Ile Gly Thr Arg Ile Met Trp
            100                 105                 110

Tyr Asp Asn Asp Asp Ile Ile Phe Ser Pro Tyr Ser Asp His Trp Arg
        115                 120                 125

Gln Met Arg Lys Ile Cys Val Ser Glu Leu Leu Ser Ala Arg Asn Val
130                 135                 140

Arg Ser Phe Gly Phe Ile Arg Gln Asp Glu Met Ser Arg Leu Leu Arg
145                 150                 155                 160

His Leu Gln Ser Ser Ala Gly Glu Thr Val Asp Met Thr Glu Arg Ile
                165                 170                 175

Ala Thr Leu Thr Cys Ser Ile Ile Cys Arg Ala Ala Phe Gly Ala Ile
            180                 185                 190

Ile Asn Asp His Glu Glu Leu Val Glu Leu Val Lys Asp Ser Leu Ser
        195                 200                 205

Met Ala Ser Gly Phe Glu Leu Ala Asp Leu Phe Pro Ser Ser Lys Leu
210                 215                 220

Leu Asn Leu Leu Cys Trp Asn Lys Ser Lys Leu Trp Arg Met Arg Arg
225                 230                 235                 240

Arg Val Asp Thr Ile Leu Glu Ala Ile Val Asp Glu His Lys Leu Lys
                245                 250                 255

Lys Ser Gly Glu Phe Gly Gly Glu Asp Ile Ile Asp Val Leu Phe Arg
            260                 265                 270

Met Gln Lys Asp Ser Gln Ile Lys Val Pro Ile Thr Thr Asn Ala Ile
        275                 280                 285

Lys Ala Phe Ile Phe Asp Thr Phe Ser Ala Gly Thr Glu Thr Ser Ser
290                 295                 300

Thr Thr Thr Leu Trp Val Met Ala Glu Leu Met Arg Asn Pro Ala Val
305                 310                 315                 320

Met Ala Lys Ala Gln Ala Glu Val Arg Ala Ala Leu Lys Gly Lys Thr
                325                 330                 335

Ser Val Asp Val Asp Asp Val Gln Glu Leu Lys Tyr Met Lys Ser Val
            340                 345                 350
```

```
Val Lys Glu Thr Met Arg Met His Pro Pro Ile Pro Leu Ile Pro Arg
            355                 360                 365

Ser Cys Arg Glu Glu Cys Glu Val Asn Gly Tyr Lys Ile Pro Asn Lys
    370                 375                 380

Ala Arg Ile Met Ile Asn Val Trp Ser Met Gly Arg Asn Pro Leu Tyr
385                 390                 395                 400

Trp Glu Lys Pro Glu Thr Phe Trp Pro Glu Arg Phe Asp Gln Val Ser
                405                 410                 415

Arg Asp Phe Met Gly Ser Asp Phe Glu Phe Ile Pro Phe Gly Ala Gly
                420                 425                 430

Arg Arg Ile Cys Pro Gly Leu Asn Phe Gly Leu Ala Asn Val Glu Val
                435                 440                 445

Pro Leu Ala Gln Leu Leu Tyr His Phe Asp Trp Lys Leu Ala Glu Gly
                450                 455                 460

Met Lys Pro Ser Asp Met Asp Met Ser Glu Ala Glu Gly Leu Thr Gly
465                 470                 475                 480

Ile Arg Lys Asn Asn Leu Leu Val Pro Thr Leu Tyr Lys Ser Pro
                485                 490                 495

<210> SEQ ID NO 28
<211> LENGTH: 717
<212> TYPE: PRT
<213> ORGANISM: Taxus cuspidata

<400> SEQUENCE: 28

Met Gln Ala Asn Ser Asn Thr Val Glu Gly Ala Ser Gln Gly Lys Ser
1               5                   10                  15

Leu Leu Asp Ile Ser Arg Leu Asp His Ile Phe Ala Leu Leu Leu Asn
                20                  25                  30

Gly Lys Gly Gly Asp Leu Gly Ala Met Thr Gly Ser Ala Leu Ile Leu
            35                  40                  45

Thr Glu Asn Ser Gln Asn Leu Met Ile Leu Thr Thr Ala Leu Ala Val
    50                  55                  60

Leu Val Ala Cys Val Phe Phe Phe Val Trp Arg Arg Gly Gly Ser Asp
65                  70                  75                  80

Thr Gln Lys Pro Ala Val Arg Pro Thr Pro Leu Val Lys Glu Glu Asp
                85                  90                  95

Glu Glu Glu Glu Asp Asp Ser Ala Lys Lys Val Thr Ile Phe Phe
                100                 105                 110

Gly Thr Gln Thr Gly Thr Ala Glu Gly Phe Ala Lys Ala Leu Ala Glu
            115                 120                 125

Glu Ala Lys Ala Arg Tyr Glu Lys Ala Val Phe Lys Val Val Asp Leu
    130                 135                 140

Asp Asn Tyr Ala Ala Asp Asp Glu Gln Tyr Glu Glu Lys Leu Lys Lys
145                 150                 155                 160

Glu Lys Leu Ala Phe Phe Met Leu Ala Thr Tyr Gly Asp Gly Glu Pro
                165                 170                 175

Thr Asp Asn Ala Ala Arg Phe Tyr Lys Trp Phe Leu Glu Gly Lys Glu
                180                 185                 190

Arg Glu Pro Trp Leu Ser Asp Leu Thr Tyr Gly Val Phe Gly Leu Gly
            195                 200                 205

Asn Arg Gln Tyr Glu His Phe Asn Lys Val Ala Lys Ala Val Asp Glu
    210                 215                 220

Val Leu Ile Glu Gln Gly Ala Lys Arg Leu Val Pro Val Gly Leu Gly
```

```
            225                 230                 235                 240
Asp Asp Asp Gln Cys Ile Glu Asp Asp Phe Thr Ala Trp Arg Glu Gln
                    245                 250                 255

Val Trp Pro Glu Leu Asp Gln Leu Leu Arg Asp Glu Asp Asp Glu Pro
                    260                 265                 270

Thr Ser Ala Thr Pro Tyr Thr Ala Ile Pro Glu Tyr Arg Val Glu
                275                 280                 285

Ile Tyr Asp Ser Val Val Ser Val Tyr Glu Thr His Ala Leu Lys
        290                 295                 300

Gln Asn Gly Gln Ala Val Tyr Asp Ile His His Pro Cys Arg Ser Asn
305                 310                 315                 320

Val Ala Val Arg Arg Glu Leu His Thr Pro Leu Ser Asp Arg Ser Cys
                    325                 330                 335

Ile His Leu Glu Phe Asp Ile Ser Asp Thr Gly Leu Ile Tyr Glu Thr
                340                 345                 350

Gly Asp His Val Gly Val His Thr Glu Asn Ser Ile Glu Thr Val Glu
            355                 360                 365

Glu Ala Ala Lys Leu Leu Gly Tyr Gln Leu Asp Thr Ile Phe Ser Val
370                 375                 380

His Gly Asp Lys Glu Asp Gly Thr Pro Leu Gly Gly Ser Ser Leu Pro
385                 390                 395                 400

Pro Pro Phe Pro Gly Pro Cys Thr Leu Arg Thr Ala Leu Ala Arg Tyr
                405                 410                 415

Ala Asp Leu Leu Asn Pro Pro Arg Lys Ala Ala Phe Leu Ala Leu Ala
                420                 425                 430

Ala His Ala Ser Asp Pro Ala Glu Ala Glu Arg Leu Lys Phe Leu Ser
        435                 440                 445

Ser Pro Ala Gly Lys Asp Glu Tyr Ser Gln Trp Val Thr Ala Ser Gln
    450                 455                 460

Arg Ser Leu Leu Glu Ile Met Ala Glu Phe Pro Ser Ala Lys Pro Pro
465                 470                 475                 480

Leu Gly Val Phe Phe Ala Ala Ile Ala Pro Arg Leu Gln Pro Arg Tyr
                485                 490                 495

Tyr Ser Ile Ser Ser Ser Pro Arg Phe Ala Pro Ser Arg Ile His Val
            500                 505                 510

Thr Cys Ala Leu Val Tyr Gly Pro Ser Pro Thr Gly Arg Ile His Lys
        515                 520                 525

Gly Val Cys Ser Asn Trp Met Lys Asn Ser Leu Pro Ser Glu Glu Thr
    530                 535                 540

His Asp Cys Ser Trp Ala Pro Val Phe Val Arg Gln Ser Asn Phe Lys
545                 550                 555                 560

Leu Pro Ala Asp Ser Thr Thr Pro Ile Val Met Val Gly Pro Gly Thr
                565                 570                 575

Gly Phe Ala Pro Phe Arg Gly Phe Leu Gln Glu Arg Ala Lys Leu Gln
                580                 585                 590

Glu Ala Gly Glu Lys Leu Gly Pro Ala Val Leu Phe Phe Gly Cys Arg
            595                 600                 605

Asn Arg Gln Met Asp Tyr Ile Tyr Glu Asp Glu Leu Lys Gly Tyr Val
            610                 615                 620

Glu Lys Gly Ile Leu Thr Asn Leu Ile Val Ala Phe Ser Arg Glu Gly
625                 630                 635                 640

Ala Thr Lys Glu Tyr Val Gln His Lys Met Leu Glu Lys Ala Ser Asp
            645                 650                 655
```

```
Thr Trp Ser Leu Ile Ala Gln Gly Gly Tyr Leu Tyr Val Cys Gly Asp
                660                 665                 670

Ala Lys Gly Met Ala Arg Asp Val His Arg Thr Leu His Thr Ile Val
            675                 680                 685

Gln Glu Gln Glu Ser Val Asp Ser Ser Lys Ala Glu Phe Leu Val Lys
690                 695                 700

Lys Leu Gln Met Asp Gly Arg Tyr Leu Arg Asp Ile Trp
705                 710                 715

<210> SEQ ID NO 29
<211> LENGTH: 334
<212> TYPE: PRT
<213> ORGANISM: Cannabis sativa

<400> SEQUENCE: 29

Met Ser Gln Arg Leu Gln Ser Ile Lys Asp His Leu Ser Ala Gly Ser
1               5                   10                  15

Asp Gln Ile Glu Gly Ser Pro His His Glu Ser Asp Asn Ser Ile Ala
            20                  25                  30

Thr Lys Ile Leu Asn Phe Gly His Thr Cys Trp Lys Leu Gln Arg Pro
        35                  40                  45

Tyr Val Val Lys Gly Met Ile Ser Ile Ala Cys Gly Leu Phe Gly Arg
    50                  55                  60

Glu Leu Phe Asn Asn Arg His Leu Phe Ser Trp Gly Leu Met Trp Lys
65                  70                  75                  80

Ala Phe Phe Ala Leu Val Pro Ile Leu Ser Phe Asn Phe Phe Ala Ala
                85                  90                  95

Ile Met Asn Gln Ile Tyr Asp Val Asp Ile Asp Arg Ile Asn Lys Pro
            100                 105                 110

Asp Leu Pro Leu Val Ser Gly Glu Met Ser Ile Glu Thr Ala Trp Ile
        115                 120                 125

Leu Ser Ile Ile Val Ala Leu Thr Gly Leu Ile Val Thr Ile Lys Leu
    130                 135                 140

Lys Ser Ala Pro Leu Phe Val Phe Ile Tyr Ile Phe Gly Ile Phe Ala
145                 150                 155                 160

Gly Phe Ala Tyr Ser Val Pro Pro Ile Arg Trp Lys Gln Tyr Pro Phe
                165                 170                 175

Thr Asn Phe Leu Ile Thr Ile Ser Ser His Val Gly Leu Ala Phe Thr
            180                 185                 190

Ser Tyr Ser Ala Thr Thr Ser Ala Leu Gly Leu Pro Phe Val Trp Arg
        195                 200                 205

Pro Ala Phe Ser Phe Ile Ile Ala Phe Met Thr Val Met Gly Met Thr
    210                 215                 220

Ile Ala Phe Ala Lys Asp Ile Ser Asp Ile Glu Gly Asp Ala Lys Tyr
225                 230                 235                 240

Gly Val Ser Thr Val Ala Thr Lys Leu Gly Ala Arg Asn Met Thr Phe
                245                 250                 255

Val Val Ser Gly Val Leu Leu Leu Asn Tyr Leu Val Ser Ile Ser Ile
            260                 265                 270

Gly Ile Ile Trp Pro Gln Val Phe Lys Ser Asn Ile Met Ile Leu Ser
        275                 280                 285

His Ala Ile Leu Ala Phe Cys Leu Ile Phe Gln Thr Arg Glu Leu Ala
    290                 295                 300

Leu Ala Asn Tyr Ala Ser Ala Pro Ser Arg Gln Phe Phe Glu Phe Ile
```

```
                305                 310                 315                 320
Trp Leu Leu Tyr Tyr Ala Glu Tyr Phe Val Tyr Val Phe Ile
                        325                 330
```